US012634164B2

(12) United States Patent
Lee

(10) Patent No.: US 12,634,164 B2
(45) Date of Patent: May 19, 2026

(54) METHOD, DEVICE, COMPUTER PROGRAM, AND RECORDING MEDIUM FOR AUDIO PROCESSING IN WIRELESS COMMUNICATION SYSTEM

(71) Applicant: INTELLECTUAL DISCOVERY CO., LTD., Seoul (KR)

(72) Inventor: Jeaho Lee, Cheongju-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 527 days.

(21) Appl. No.: 17/638,551

(22) PCT Filed: Aug. 28, 2020

(86) PCT No.: PCT/KR2020/011546
§ 371 (c)(1),
(2) Date: Feb. 25, 2022

(87) PCT Pub. No.: WO2021/040457
PCT Pub. Date: Mar. 4, 2021

(65) Prior Publication Data
US 2022/0321368 A1      Oct. 6, 2022

(30) Foreign Application Priority Data
Aug. 29, 2019      (KR) ........................ 10-2019-0106244

(51) Int. Cl.
*H04L 12/18*          (2006.01)
*H04L 65/611*        (2022.01)
(Continued)

(52) U.S. Cl.
CPC ........ *H04L 12/189* (2013.01); *H04L 12/1881* (2013.01); *H04L 65/611* (2022.05); *H04L 65/75* (2022.05); *H04W 72/30* (2023.01)

(58) Field of Classification Search
CPC ............. H04W 72/30; H04W 4/00–06; H04W 4/30–80; H04W 4/08; H04W 4/12; H04L 12/189; H04L 12/188
(Continued)

(56) References Cited

U.S. PATENT DOCUMENTS

| | | | |
|---|---|---|---|
| 2008/0153461 A1* | 6/2008 | Chan ..................... | H04W 72/30 707/E17.11 |
| 2010/0179987 A1* | 7/2010 | Sebastian ................ | H04L 47/70 709/224 |

(Continued)

FOREIGN PATENT DOCUMENTS

| | | |
|---|---|---|
| EP | 2 156 439 B1 | 11/2016 |
| KR | 10-2019-0013062 A | 2/2019 |

(Continued)

OTHER PUBLICATIONS

International Search Report of PCT/KR2020/011546 dated Nov. 27, 2020 [PCT/ISA/210].

(Continued)

*Primary Examiner* — San Htun
(74) *Attorney, Agent, or Firm* — Sughrue Mion, PLLC

(57) ABSTRACT
The present disclosure relates to a method, a device, a computer program, and a recording medium for audio processing in a wireless communication system. A method for transmitting metadata related to broadcast audio data in a Wireless communication system according to one embodiment of the present disclosure comprises the steps of: transmitting a first pointer packet including one or more pieces of metadata in a first channel, and transmitting an audio packet including one or more pieces of broadcast audio data related to the one or more pieces of metadata on a second channel indicated by the first pointer packet, wherein each of the one or more pieces of metadata may
(Continued)

(a)          (b)

include information indicating a characteristic of one piece of broadcast audio data related to said piece of metadata.

13 Claims, 37 Drawing Sheets

(51) Int. Cl.
H04L 65/75 (2022.01)
H04W 72/30 (2023.01)

(58) Field of Classification Search
USPC ......................................................... 370/312
See application file for complete search history.

(56) References Cited

U.S. PATENT DOCUMENTS

| | | | | |
|---|---|---|---|---|
| 2011/0041154 | A1* | 2/2011 | Olson .................... | H04H 60/58 |
| | | | | 725/54 |
| 2016/0094994 | A1* | 3/2016 | Kirkby ................. | G11B 27/031 |
| | | | | 380/270 |
| 2016/0173556 | A1* | 6/2016 | Park ................... | H04N 21/8547 |
| | | | | 709/219 |
| 2016/0173960 | A1* | 6/2016 | Snibbe ............... | H04N 21/2343 |
| | | | | 386/285 |
| 2016/0381399 | A1* | 12/2016 | Brondijk .............. | H04N 21/235 |
| | | | | 725/116 |
| 2018/0137317 | A1* | 5/2018 | Lee .................... | G06K 7/10722 |
| 2018/0139497 | A1 | 5/2018 | Lu et al. | |
| 2019/0132371 | A1* | 5/2019 | Bhat ................... | G06F 3/04842 |
| 2021/0400096 | A1* | 12/2021 | Lee .................... | H04L 65/1094 |
| 2022/0039179 | A1* | 2/2022 | Chen ................... | H04R 1/1016 |

FOREIGN PATENT DOCUMENTS

| | | |
|---|---|---|
| KR | 10-1981026 B1 | 5/2019 |
| WO | 2016/179072 A1 | 11/2016 |

OTHER PUBLICATIONS

Notice of Decision of Refusal issued by the Korean Patent Office on Apr. 14, 2026 in Korean Patent Application No. 10-2022-7005423.
Decision to Decline Amendment issued by the Korean Patent Office on Apr. 14, 2026 in Korean Patent Application No. 10-2022-7005423.
Bluetooth Core Specification Version 5.0, vol. 0 dated Dec. 6, 2016, pp. 1-2822.
Martin Woolley, Exploring Bluetooth Core 5.0: What's new in advertising, Feb. 27, 2017, pp. 1-7.

* cited by examiner (a)                                    (b)

| LENGTH | METADATA |
|---|---|

(b)

| LENGTH | UUID/TYPE | METADATA |
|---|---|---|

METHOD, DEVICE, COMPUTER PROGRAM, AND RECORDING MEDIUM FOR AUDIO PROCESSING IN WIRELESS COMMUNICATION SYSTEM

CROSS REFERENCE TO RELATED APPLICATIONS

This application is a National Stage of International Application No. PCT/KR2020/011546, filed Aug. 28, 2020, claiming priority to Korean Patent Application No. 10-2019-0106244, filed Aug. 29, 2019.

TECHNICAL FIELD

The present disclosure relates to a method, an apparatus, a computer program, and a recording medium thereof for audio processing in a wireless communication system.

BACKGROUND

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

The Bluetooth standard includes various profiles. For example, the Hands-Free Profile (HFP) defines what is necessary for one device to function as an audio gateway (AG) such as a smartphone and another device to function as a hands-free device such as a headset. In addition, A2DP (Advance Audio Distribution Profile) defines what is necessary for one device to function as an audio source such as a music player and another device to function as an audio sink such as a speaker.

As the spread of wireless devices increases recently, the demand for transmitting and receiving audio data in various topologies of many-to-many or M-to-N connection types is increasing. For example, streaming services that require a 5.1 channel environment are emerging, and it is being discussed to support a 5.1 channel environment using a plurality of Bluetooth portable speakers, breaking away from the limitations of a conventional 5.1 channel dedicated wired speaker. However, since the conventional Bluetooth audio technology was mainly developed in consideration of a use case of a one-to-one connection between two devices, it is not suitable for supporting audio data transmission/reception between multiple devices and delay is a big problem. In addition, as the number of Bluetooth audio devices increases, there is a problem in that power consumption for searching for peripheral devices increases.

In addition, a method of accumulating talk time when a user makes a call across multiple devices, a method for providing metadata indicating characteristics of one or more audio data, a method for controlling devices belonging to a group or a method for providing a profile or service interlocking controller is required, but there is no specific protocol for this yet.

DISCLOSURE

Technical Problem

A technical problem of the present disclosure is to provide a method and an apparatus for transferring and calculating a call duration over across multiple devices.

An additional technical problem of the present disclosure is to provide a method and apparatus for providing metadata indicating characteristics of one or more audio data before or together with audio data.

An additional technical problem of the present disclosure is to provide a lock request and response method and apparatus for controlling devices for a group.

An additional technical problem of the present disclosure is to provide a method and apparatus for dynamically changing a controller according to a profile or service.

The technical problems to be achieved in the present disclosure are not limited to the technical problems mentioned above, and other technical problems not mentioned will be clearly understood by those of ordinary skill in the art to which the present disclosure belongs from the following description.

Technical Solution

A method for transmitting a metadata associated with a broadcast audio data in a wireless communication system according to an aspect of the present disclosure may include: transmitting a first pointer packet including at least one metadata on a first channel; and transmitting an audio packet including at least one broadcast audio data associated with the at least one metadata on a second channel indicated by the first pointer packet, and each of the at least one metadata may include information indicating a characteristic of one broadcast audio data associated with the each of the at least one metadata.

A method of receiving a metadata associated with a broadcast audio data in a wireless communication system according to an additional aspect of the present disclosure may include receiving a first pointer packet including at least one metadata on a first channel; and receiving an audio packet including at least one broadcast audio data associated with the at least one metadata on a second channel indicated by the first pointer packet, and each of the at least one metadata may include information indicating a characteristic of one broadcast audio data associated with the each of the at least one metadata.

A device for transmitting a metadata associated with a broadcast audio data in a wireless communication system according to an additional aspect of the present disclosure may include a transceiver for performing signal transmission and reception with another device; and a processor for controlling the transceiver and the device, and the processor may be configured to: transmit, through the transceiver, a first pointer packet including at least one metadata on a first channel; and transmit, through the transceiver, an audio packet including at least one broadcast audio data associated with the at least one metadata on a second channel indicated by the first pointer packet, and each of the at least one metadata may include information indicating a characteristic of one broadcast audio data associated with the each of the metadata.

A device for receiving a metadata associated with a broadcast audio data in a wireless communication system according to an additional embodiment of the present disclosure may include a transceiver for performing signal transmission and reception with another device; and a processor for controlling the transceiver and the device, and the processor may be configured to: receive, through the transceiver, a first pointer packet including at least one metadata on a first channel; and receive, through the transceiver, an audio packet including at least one broadcast audio data associated with the at least one metadata on a second channel indicated by the first pointer packet, and each of the at least one metadata may include information indicating a characteristic of one broadcast audio data associated with the each of the metadata.

The features briefly summarized above with respect to the present disclosure are merely exemplary aspects of the detailed description of the present disclosure that follows, and do not limit the scope of the present disclosure.

Technical Effects

According to the present disclosure, a method and an apparatus for calculating and transferring a call duration across multiple devices may be provided.

According to the present disclosure, a method and an apparatus for providing metadata indicating characteristics for one or more audio data prior to or together with audio data may be provided.

According to the present disclosure, a lock request and response method and apparatus for controlling devices for a group may be provided.

According to the present disclosure, a method and an apparatus for changing a controller dynamically according to a profile and service.

The technical effects of the present disclosure are not limited to the above-described effects, and other effects not mentioned herein may be understood to those skilled in the art from the following description.

BRIEF DESCRIPTION OF DRAWINGS

FIG. 3 is a diagram illustrating examples of 5.1 channel surround system hardware to which the present disclosure is applicable.

FIG. 14 to FIG. 16 are diagrams illustrating a message exchange process between a server and a client to which the present disclosure is applicable.

4

Figure 18:
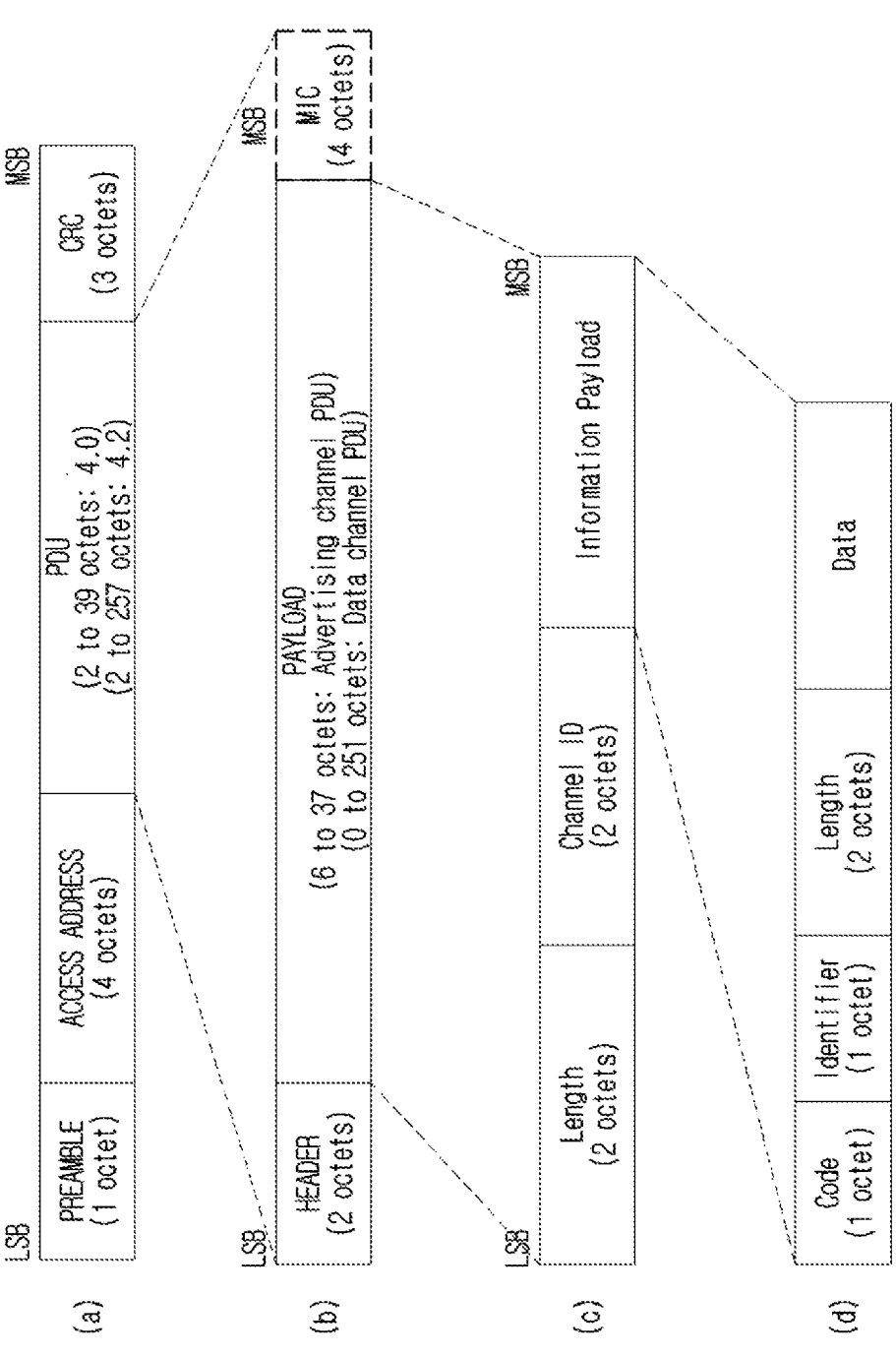

FIG. 18 is a diagram illustrating a packet format for each layer to which the present disclosure is applicable.

Figure 19:
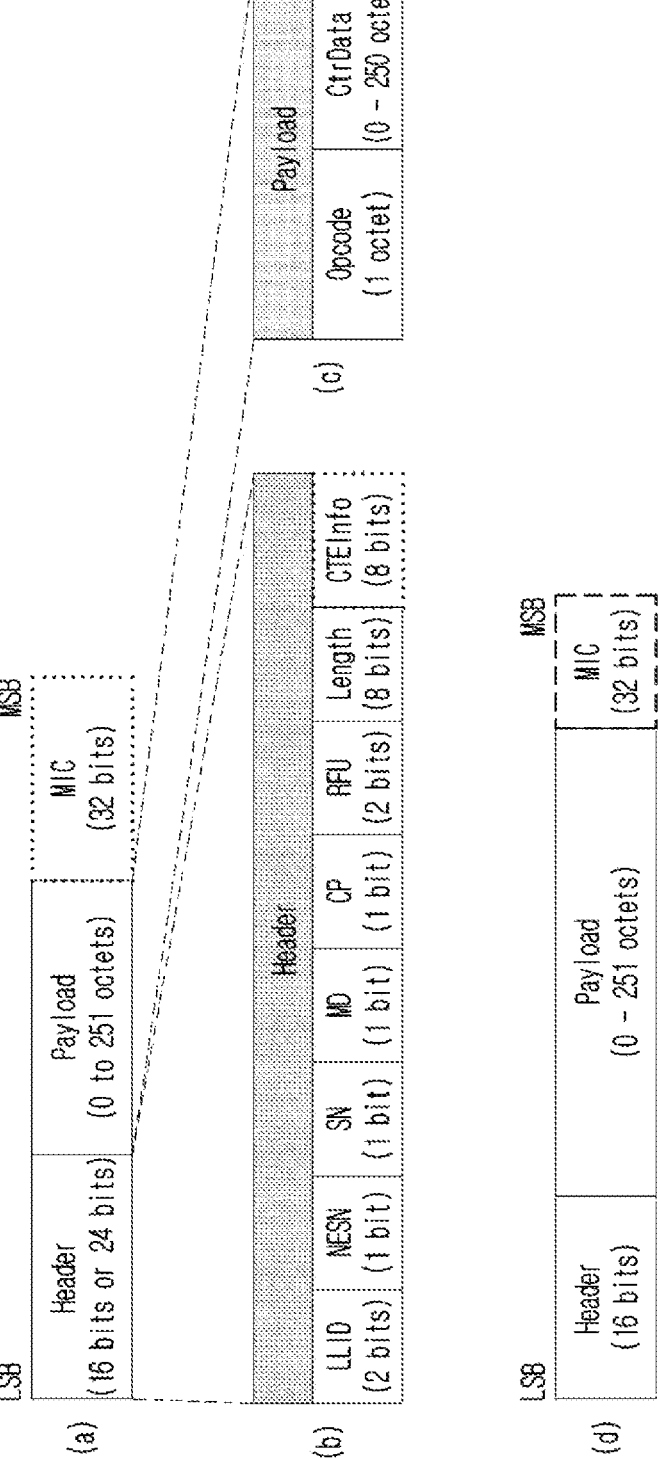

FIG. 19 is a diagram illustrating examples of a data unit format to which the present disclosure is applicable.

Figure 20:
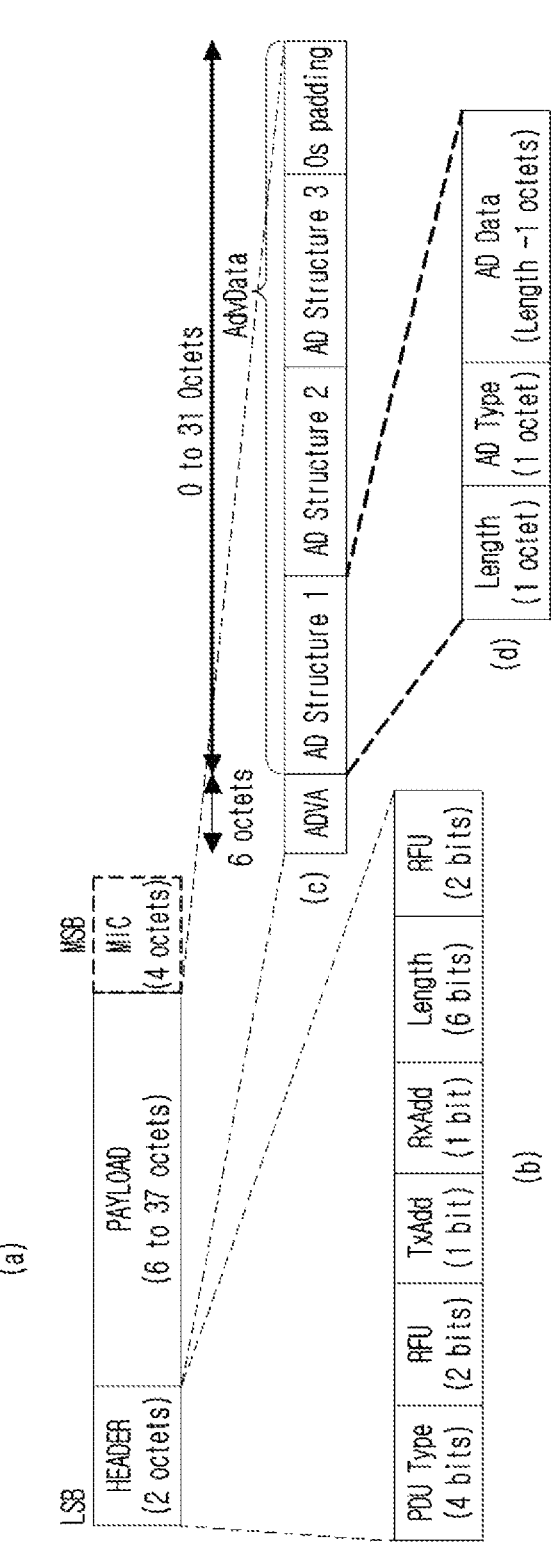

FIG. 20 is a diagram illustrating examples of an advertisement unit format to which the present disclosure is applicable.

Figure 21:
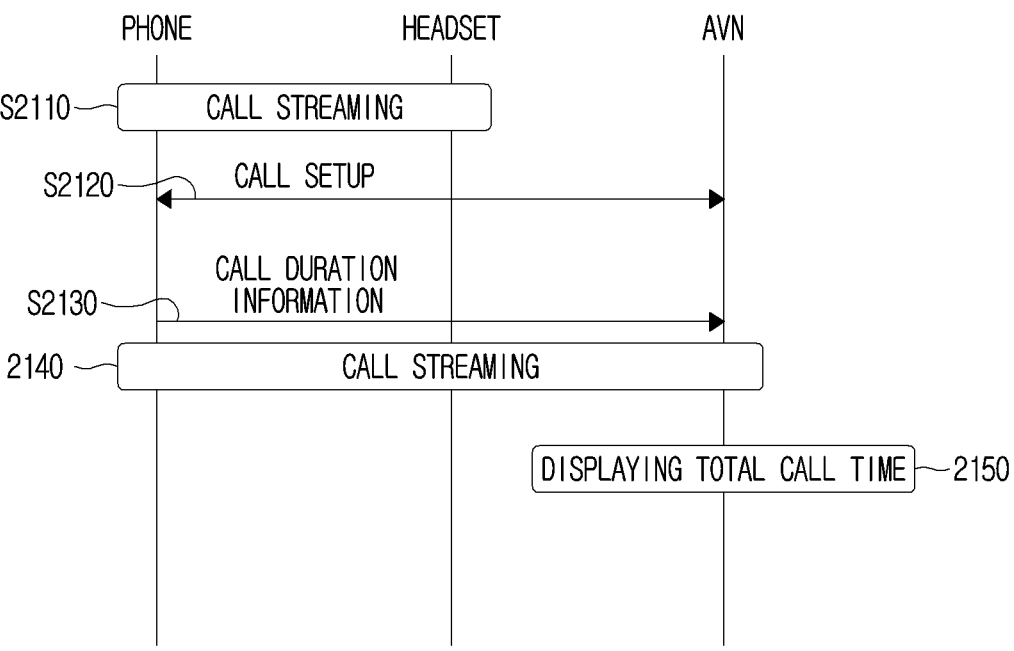

FIG. 21 is a diagram illustrating an example of call duration transfer to which the present disclosure is applicable.

Figure 22:
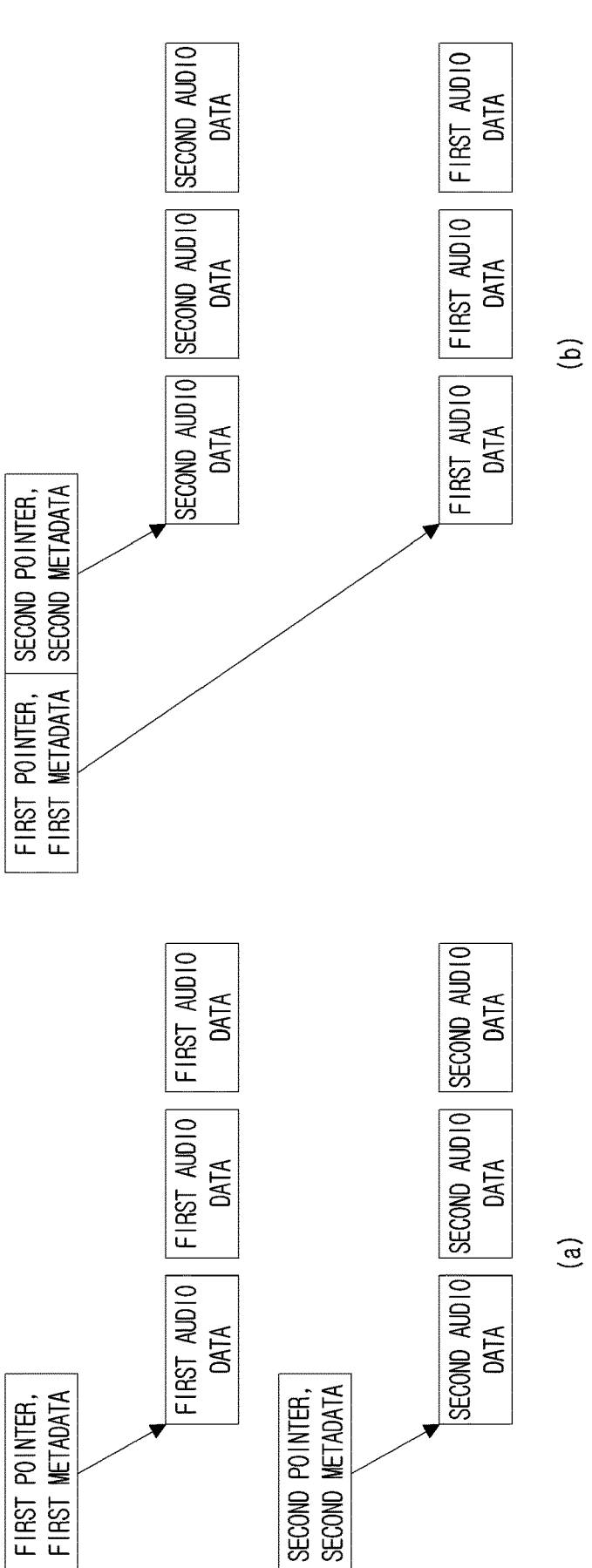

FIG. 22 is a diagram illustrating an example of a metadata transfer method to which the present disclosure is applicable.

Figure 23:
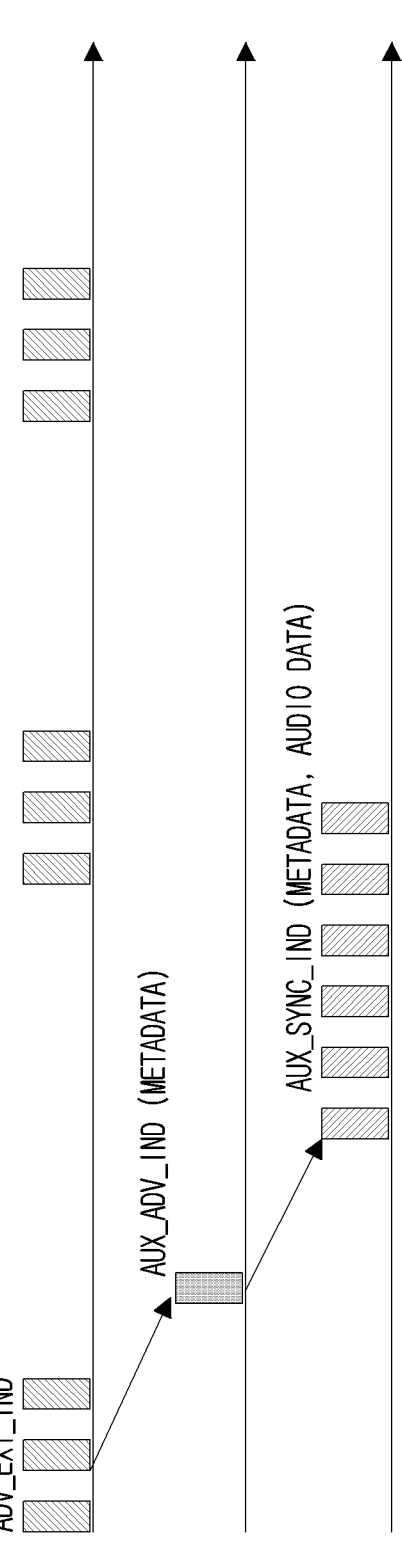

FIG. 23 is a diagram illustrating an additional example of a metadata transfer method to which the present disclosure is applicable.

FIG. 24 is a diagram exemplarily illustrating a structure of metadata to which the present disclosure is applicable.

Figure 25:
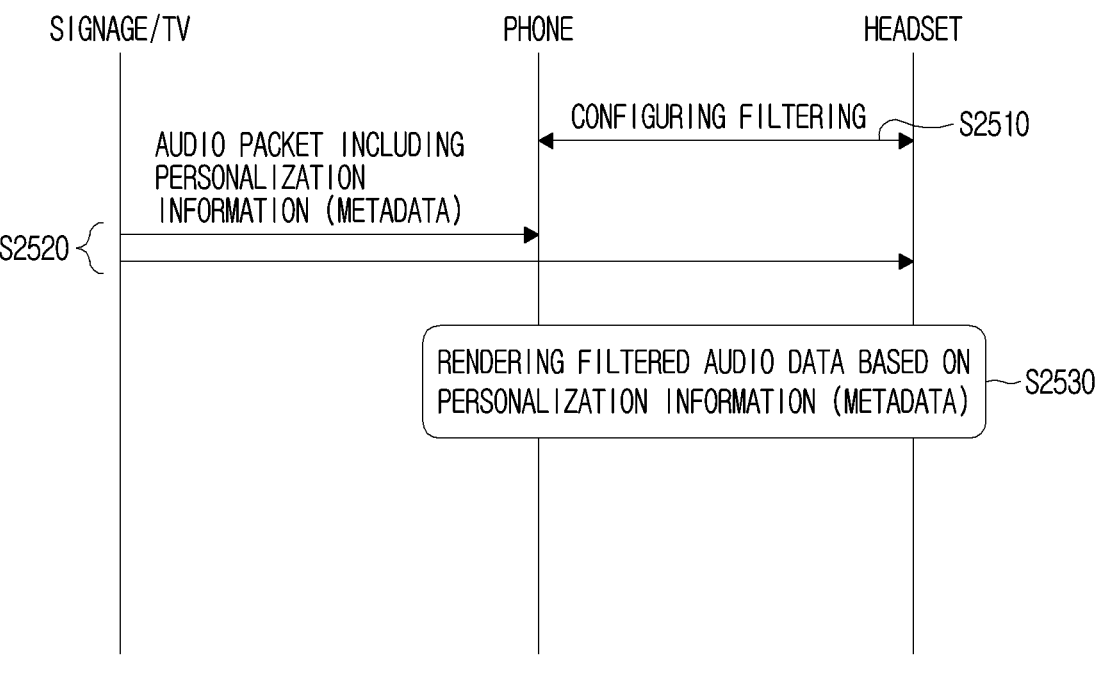

FIG. 25 is a diagram illustrating an example of personalized audio or audio filtering to which the present disclosure is applicable.

Figure 26:
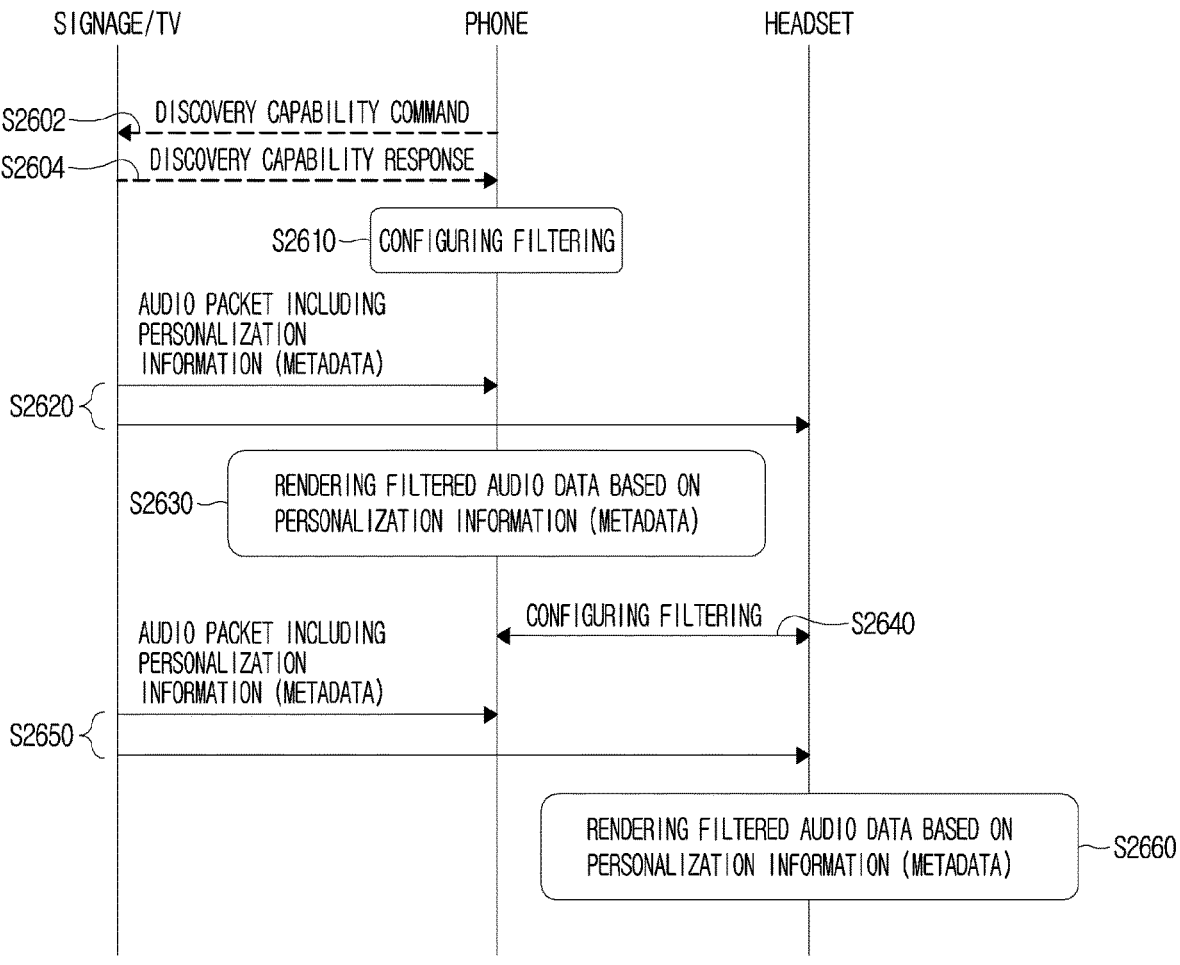

FIG. 26 is diagram illustrating an additional example of personalized audio or audio filtering to which the present disclosure is applicable.

Figure 27:
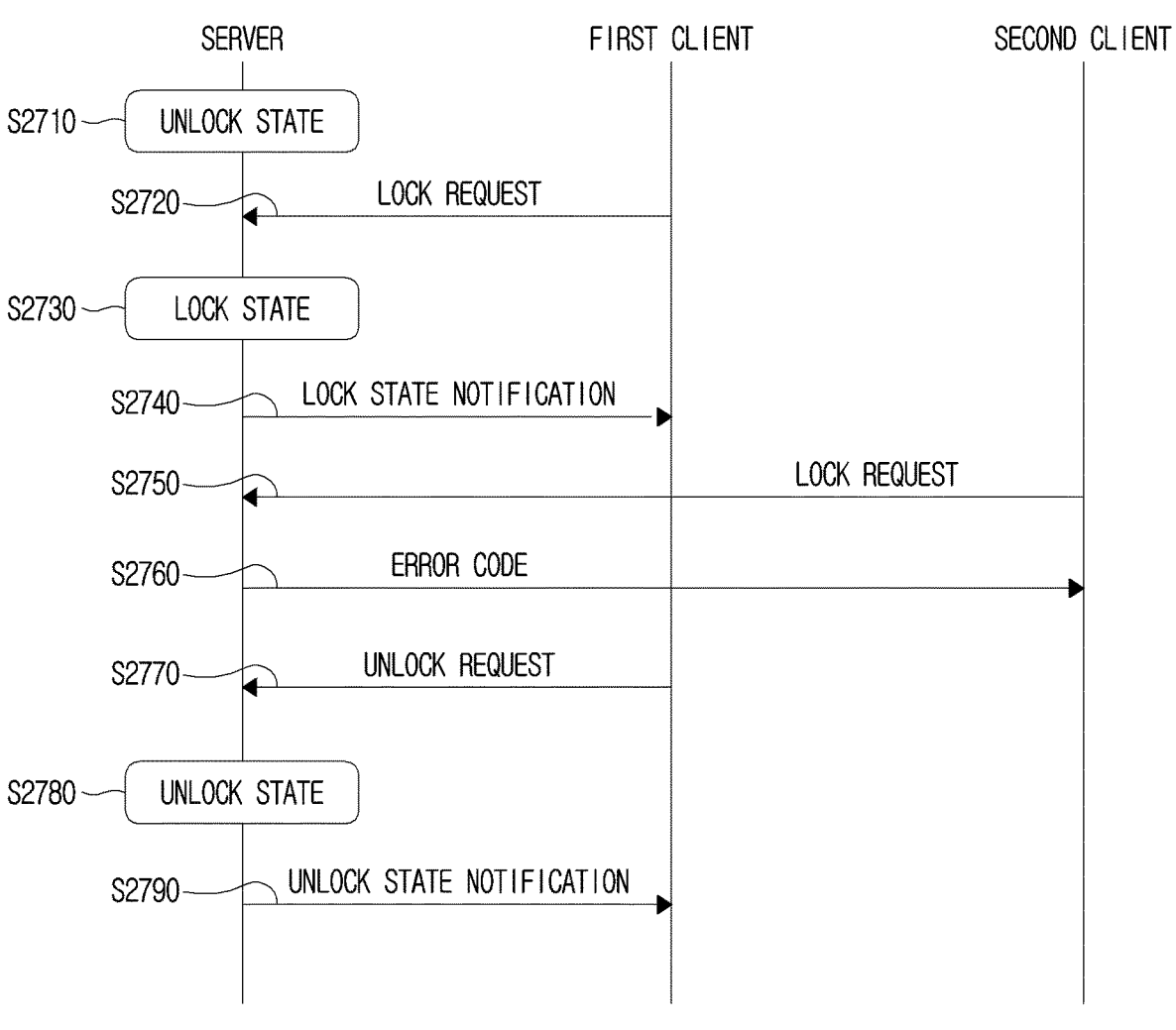

FIG. 27 is a diagram for describing a lock control method to which the present disclosure is applicable.

Figure 28:
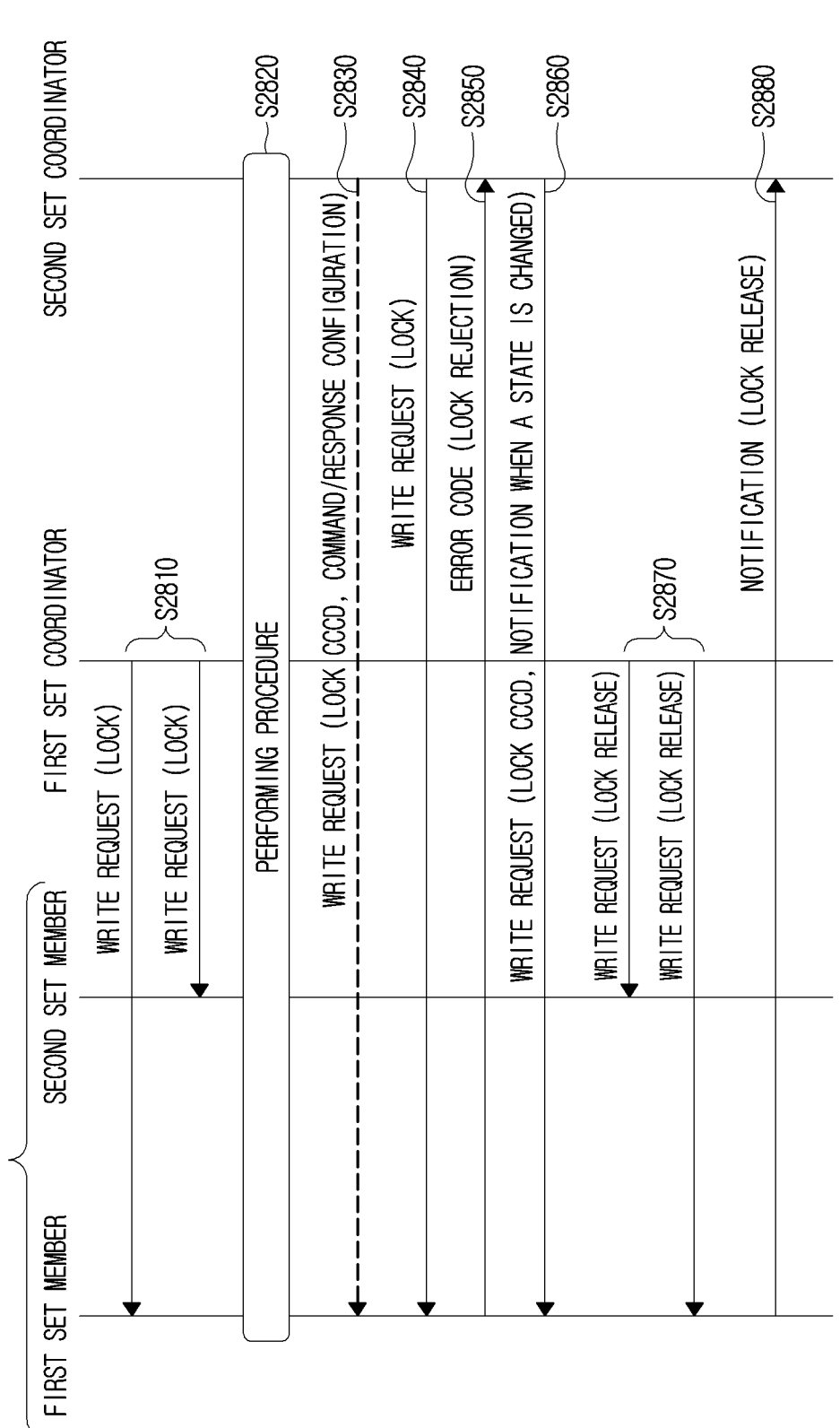

FIG. 28 is a diagram for describing a set lock request/release procedure to which the present disclosure is applicable.

Figure 29:
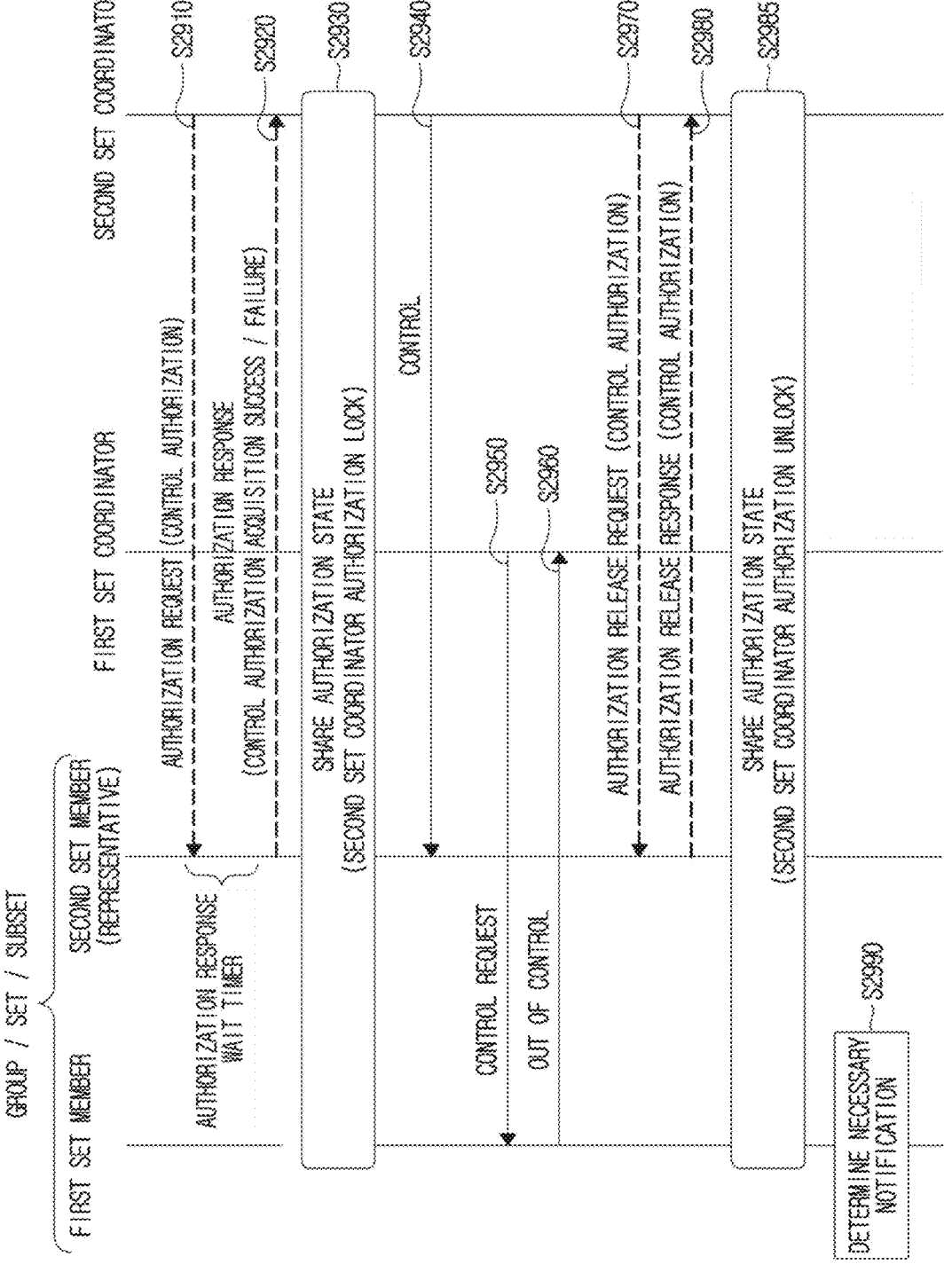

FIG. 29 is a diagram illustrating an example of a method for requesting a group ID service authorization to which the present disclosure is applicable.

Figure 30:
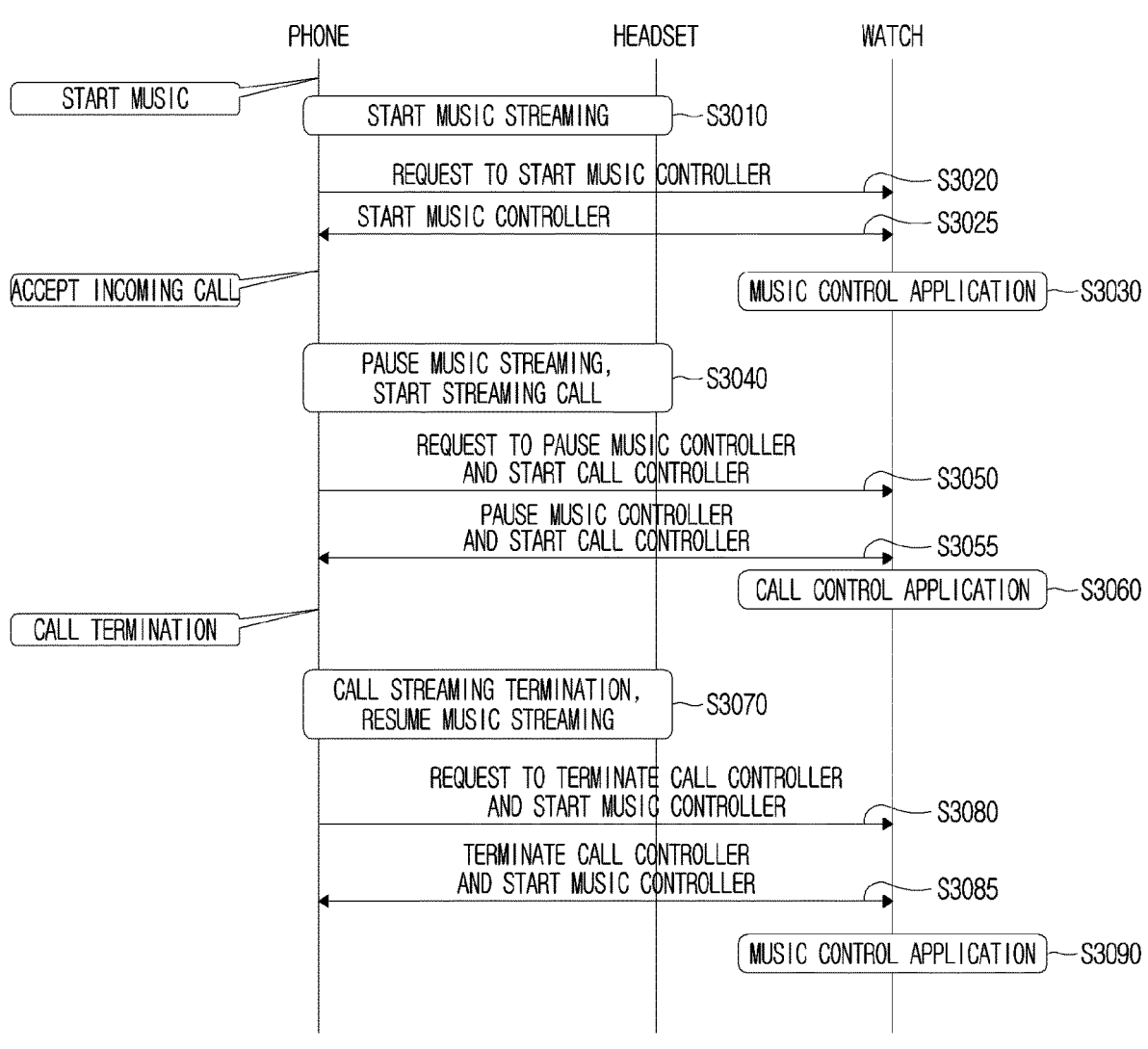

FIG. 30 is a diagram illustrating an example of a method for changing a profile linkage controller to which the present disclosure is applicable.

Figure 31:
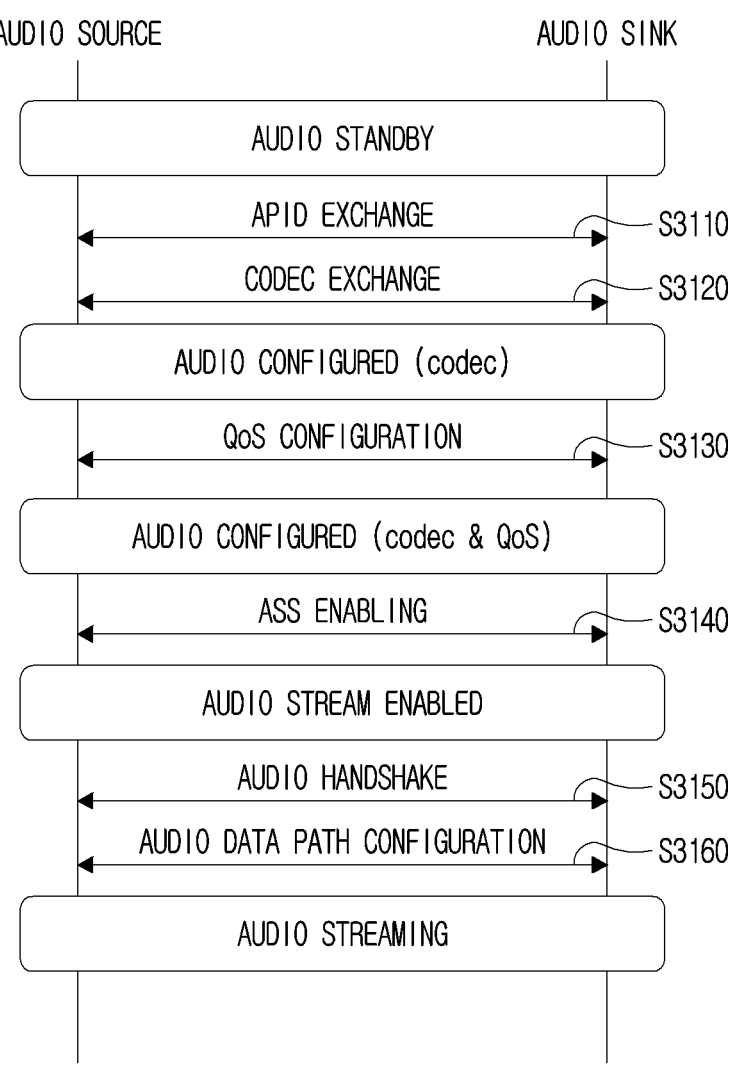

FIG. 31 is a diagram for describing an audio stream setup and state to which the present disclosure is applicable.

Figure 32:
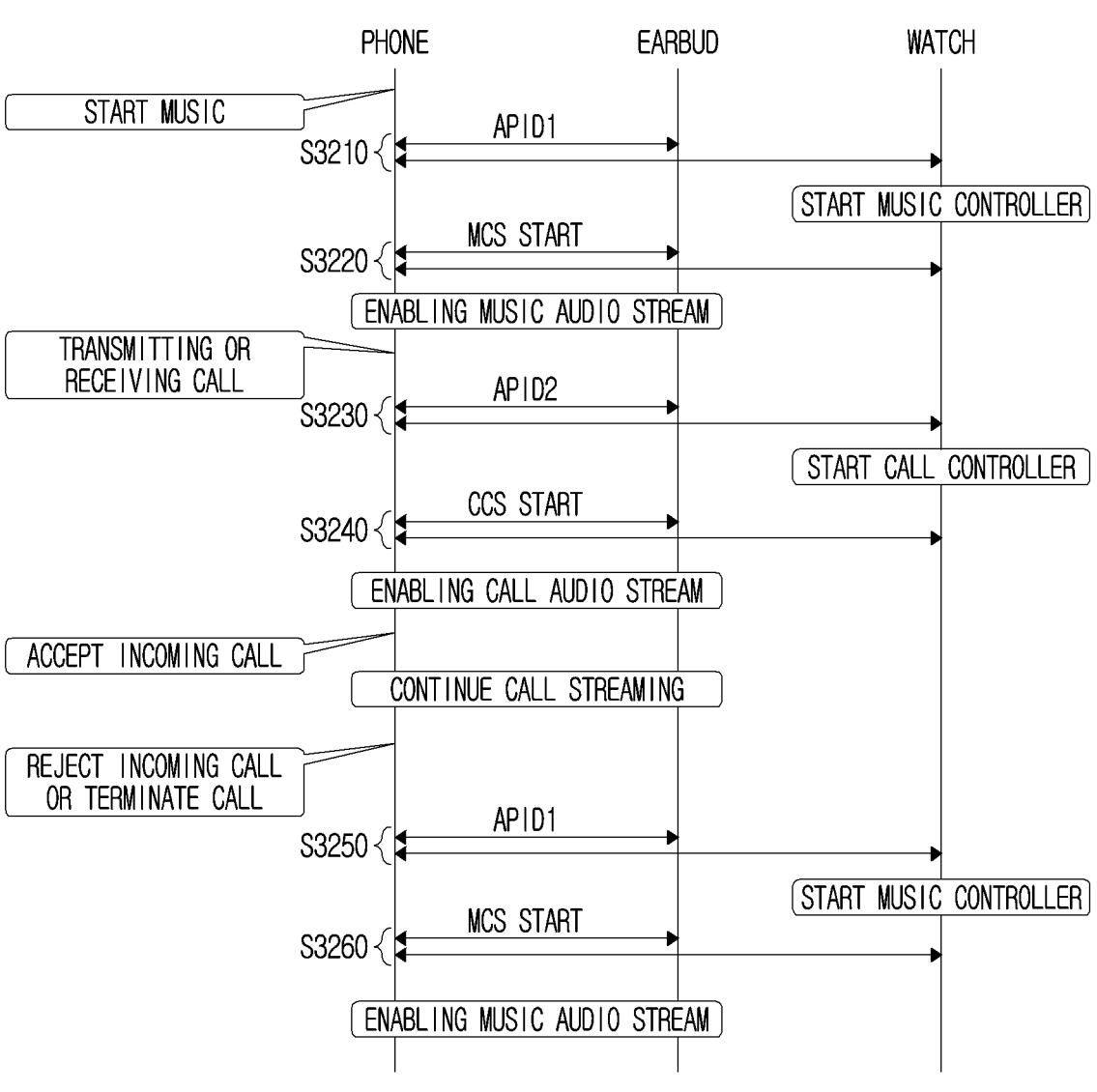

FIG. 32 is a diagram for describing an APID exchange procedure triggered by an audio source to which the present disclosure is applicable.

Figure 33:
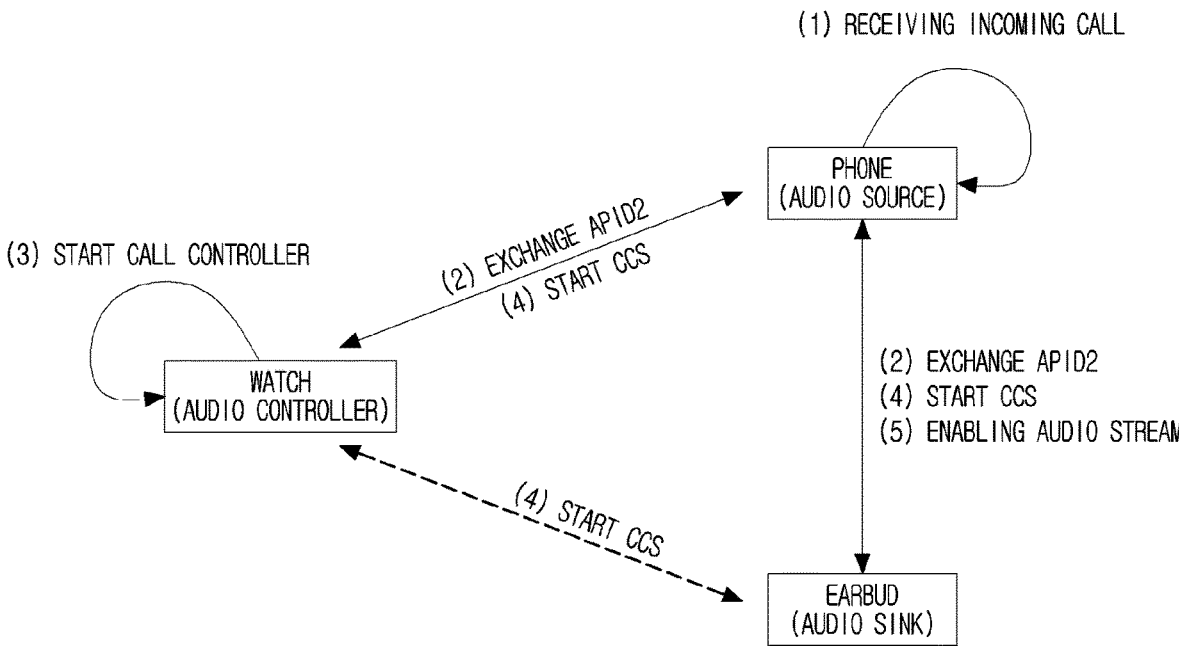

FIG. 33 is a diagram for describing state transition of an APID exchange procedure triggered by an audio source to which the present disclosure is applicable.

Figure 34:
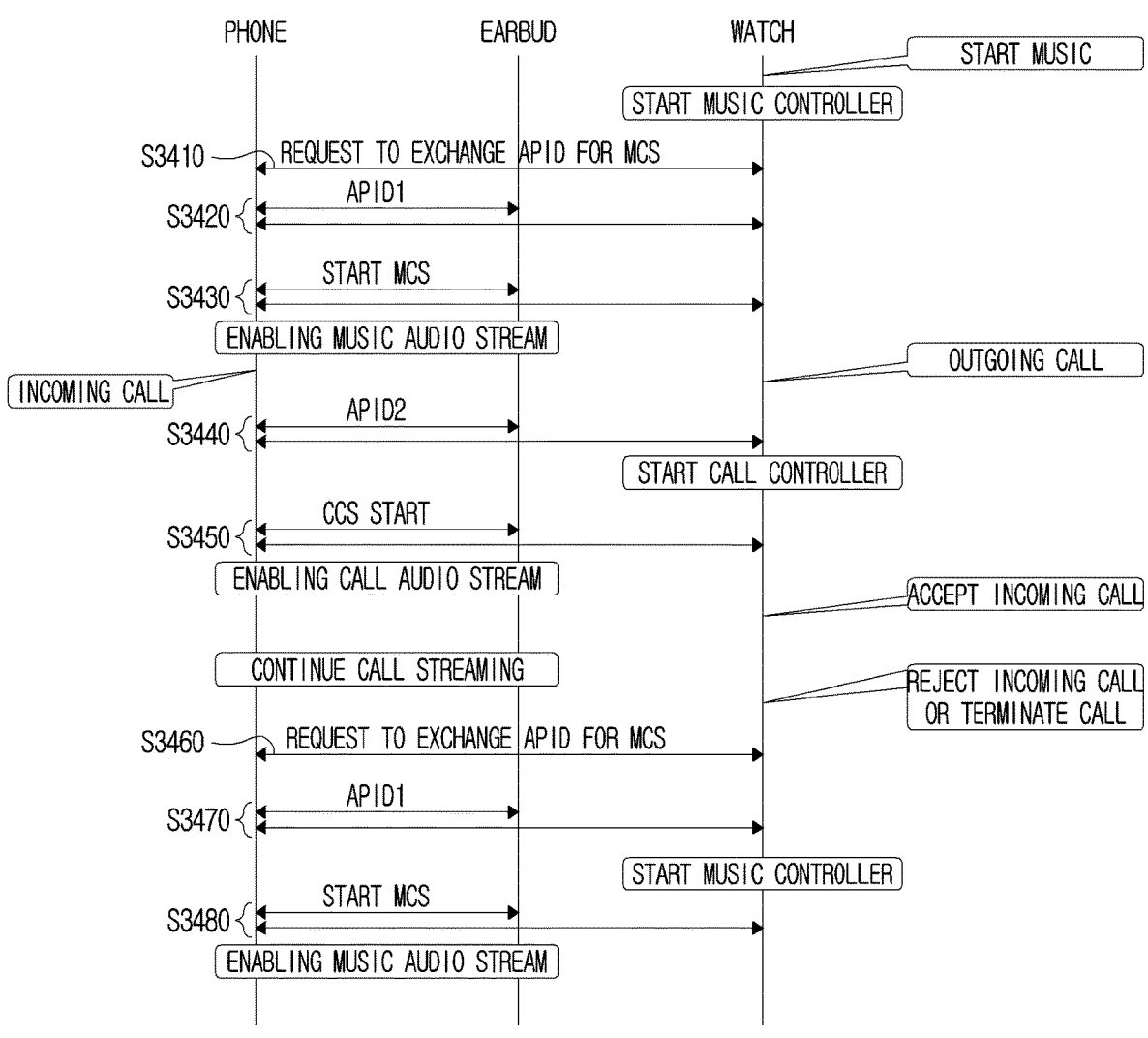

FIG. 34 is a diagram for describing an embodiment of an APID exchange procedure triggered by an audio controller to which the present disclosure is applicable.

Figure 35:
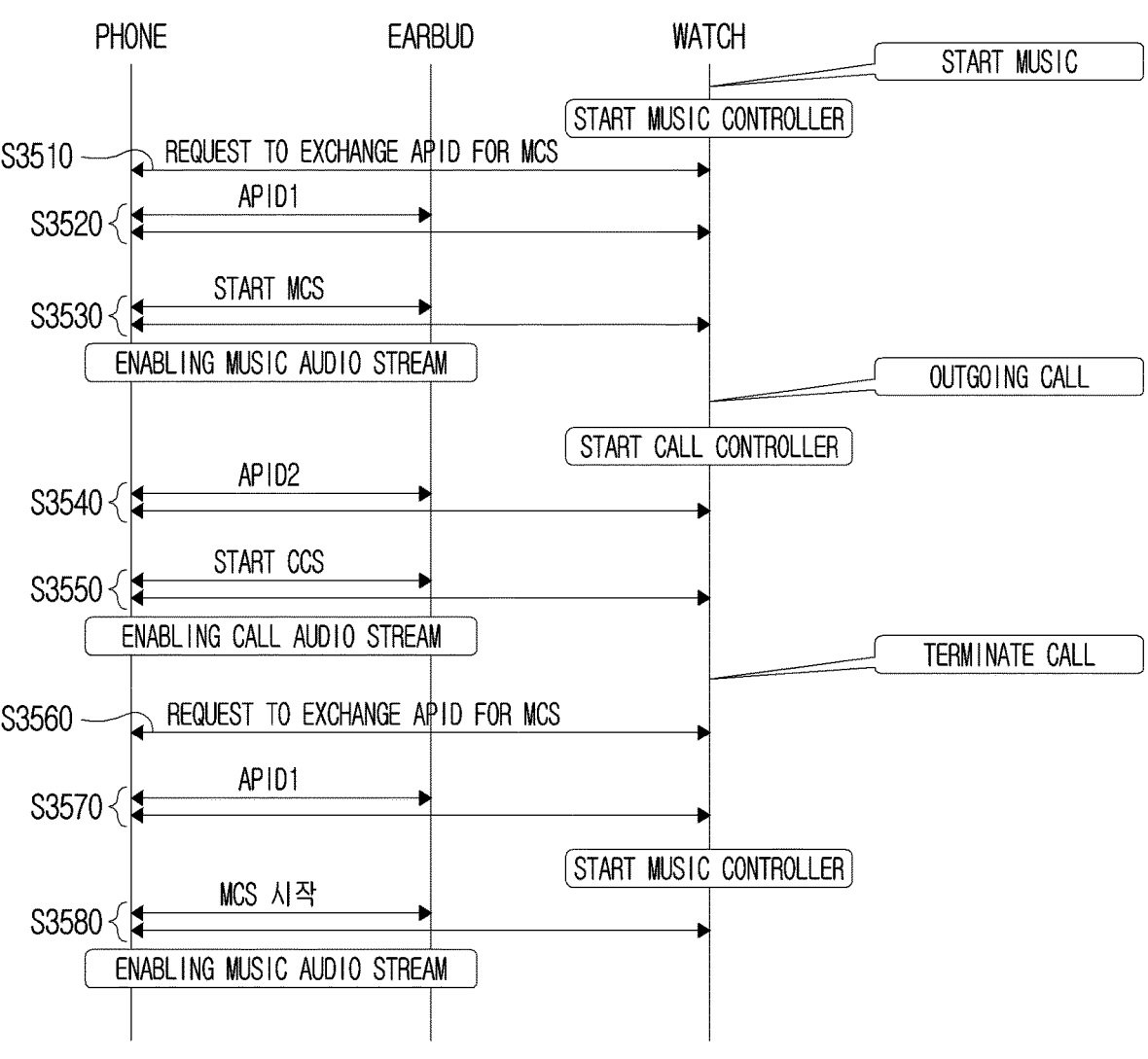

FIG. 35 is a diagram for describing an additional example of an APID exchange procedure triggered by an audio controller to which the present disclosure is applicable.

Figure 36:
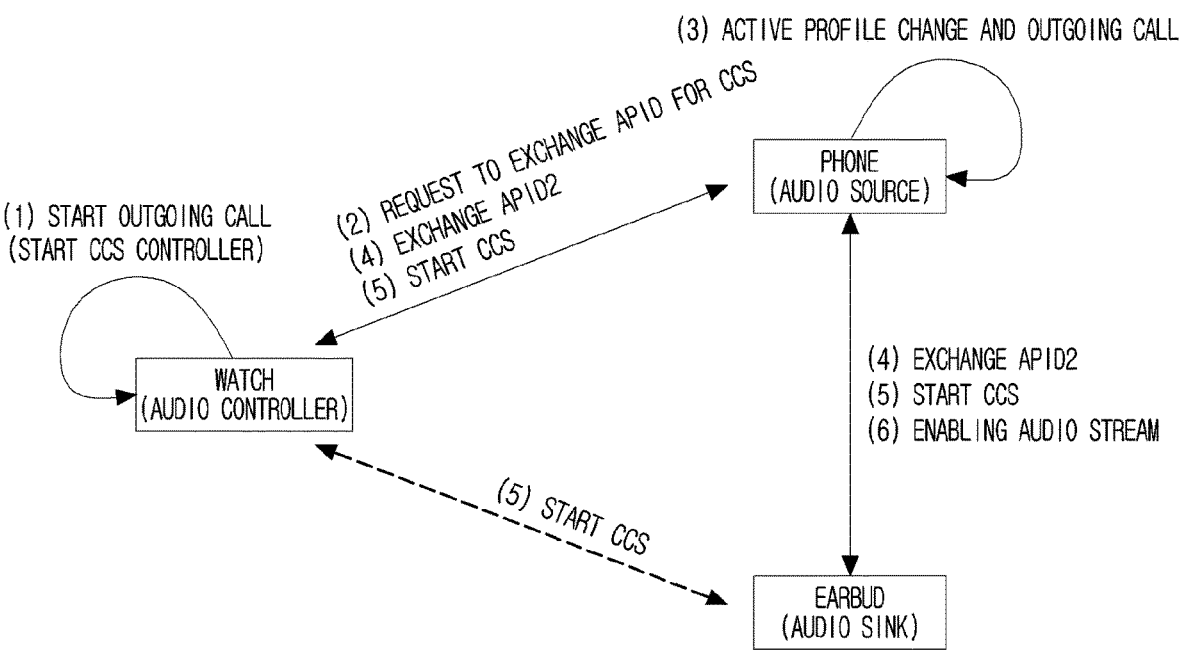

FIG. 36 is a diagram for describing state transition of an APID exchange procedure triggered by an audio controller to which the present disclosure is applicable.

Figure 37:
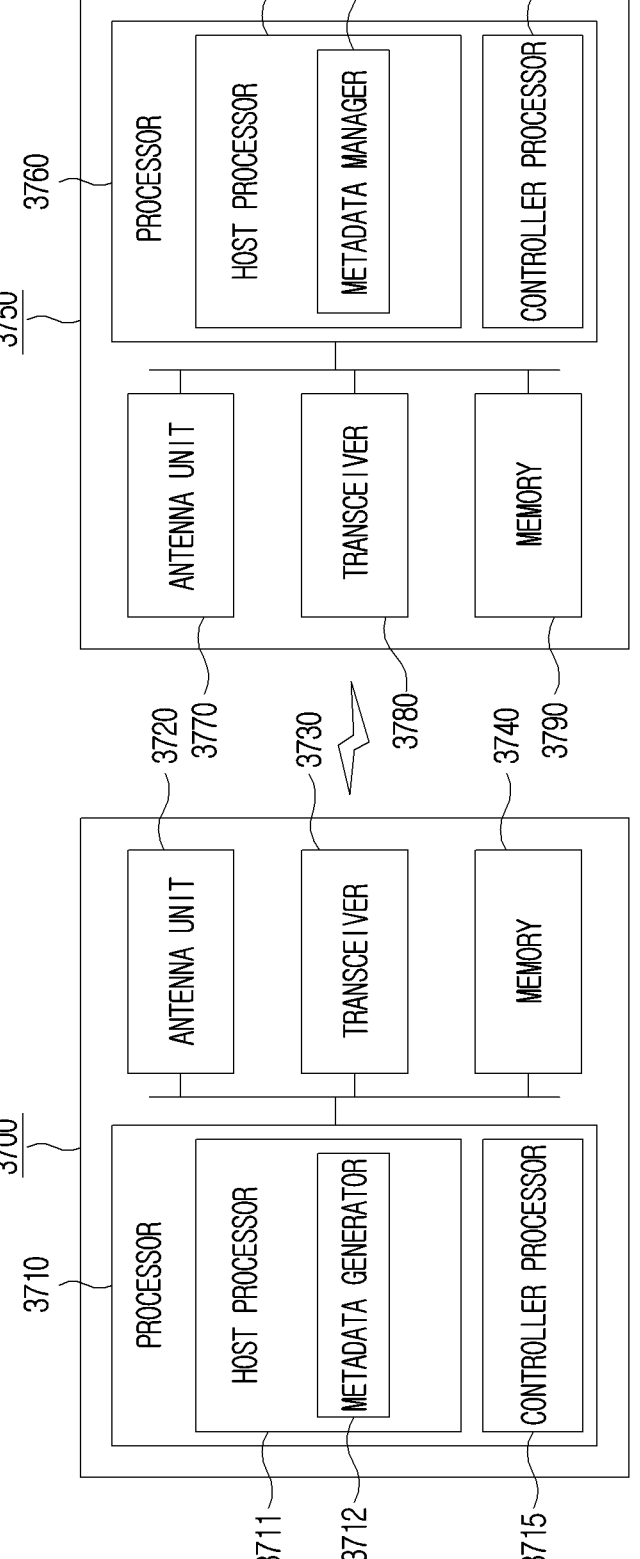

FIG. 37 is a diagram illustrating a configuration of a first device and a second device to which the present disclosure may be applied.

BEST MODE

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Definitions of terms used in the present disclosure are as follows.

An audio sink is an entity that receives audio data from an audio source.

An audio source is an entity that transmits audio data to the audio sink.

An audio channel is a single flow of coded or uncoded audio data.

An audio stream is a unidirectional logical communication channel that carries audio data flowing from the audio source to the audio sink. Audio data may flow on an audio stream session (ASS). An audio stream may carry audio data for one or more audio channels.

An audio group may include one or more synchronized audio streams.

A content type indicates a classification of content of an audio group. The classification may include whether the audio was initiated by the user. A content type indicates a classification of content of an audio group. The classification may include whether the audio was initiated by the user. Examples of the content type may include uncategorized audio (UncategorizedAudio), ringtone (Ringtone), system sound (SystemSound), satellite navigation (Satnav), call audio (CallAudio), media (Media), and the like.

Metadata is a variable-length data that describes and provides the context of audio data. Metadata may be defined for a higher layer.

An audio stream session (ASS) means to a unidirectional or bidirectional transmission/exchange process of an audio stream. An endpoint of an ASS corresponds to an audio input and/or audio output of an audio stream session, and may correspond to one device or a group of devices. The end of the ASS resides on the server and may be configured by the server or by the client. The server may store, change, and manage ASS state.

QoS (Quality of Service) means a quality of service for an audio stream and may correspond to a requirement for a specific service.

An audio location means a logical spatial rendering location intended for an audio channel within a spatial arrangement of a device for rendering audio. For example, the left and right location of a headset may correspond to an audio location. An audio location may be allocated to an audio channel.

CBIS (Connection Based Isochronous Stream) is a term defined in a core layer and is a concept corresponding to an audio stream in an ASS service. A unidirectional CBIS may have one audio stream, and a bidirectional CBIS may have two audio streams.

CBISS (Connection Based Isochronous Stream Set) is a term defined in a core layer and is a concept corresponding to an audio group in the ASS service.

An audio scene application (ASA) means an audio group performing a specific content type.

ASC (Audio Steam Capability) is a set of parameters necessary for configuring an audio session capability.

An audio advertisement is to discover the availability of ASA participation. An audio general advertisement is an audio advertisement that does not specify a target, and an audio directed advertisement is an audio advertisement for a specific target.

Isochronous data means data that is limited by time. For example, isochronous data may be time-dependent audio, such as television audio that needs to be synchronized with respect to an image of a video, or audio that needs to be synchronized and reproduced in multiple devices constituting a multi-channel.

An isochronous channel means a logical transmitting end used to transmit isochronous data from a transmitting device to one or more receiving devices.

An isochronous stream means a logical link carrying one or more isochronous channels.

Figure 1:
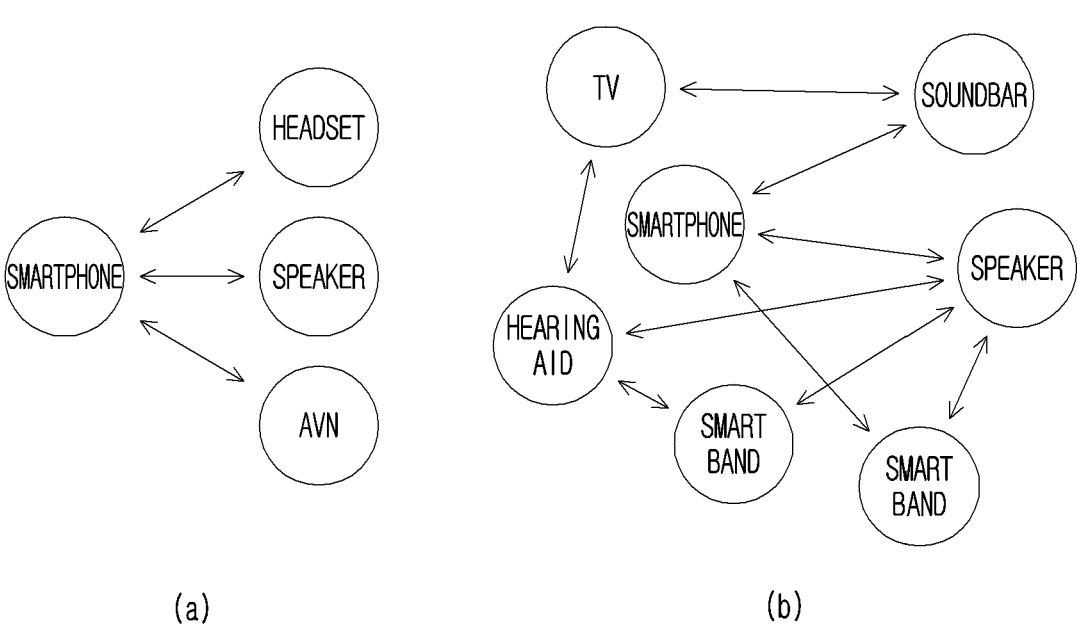
FIG. 1 is a diagram exemplarily illustrating a conventional audio connection type and an audio connection type to which the present disclosure is applicable.

FIG. 1 is a diagram exemplarily illustrating a conventional audio connection type and an audio connection type to which the present disclosure is applicable.

FIG. 1(a) illustrates an example of a BR/EDR audio connection type. In the case of BR/EDR, one-to-one connection type is supported. One device (e.g., a smartphone) may function as a central device, and may be connected one-to-one with each of several devices. That is, there may be multiple one-to-one connections. Accordingly, the service such as a phone call through a headset or music reproduction through a speaker may be supported. The center of service in this connection type is an audio source, and an audio sink such as a headset, a speaker, and AVN (Audio Video Navigation) may operate as a peripheral device of the audio source.

FIG. 1(b) illustrates an example of a BLE audio connection type. In the case of BLE, many-to-many connections may be supported. In this case, there may be a plurality of center devices such as a TV, a smart phone, and a gateway etc., and complex M-to-N connection may be configured. Accordingly, services of phone calls and music reproduction through the headset may be supported, and broadcast audio services such as alarms, doorbells, and advertising voices may be supported. The center of the service in this connection type is an audio sink, and the audio service may be used by moving multiple audio sources.

Figure 2:
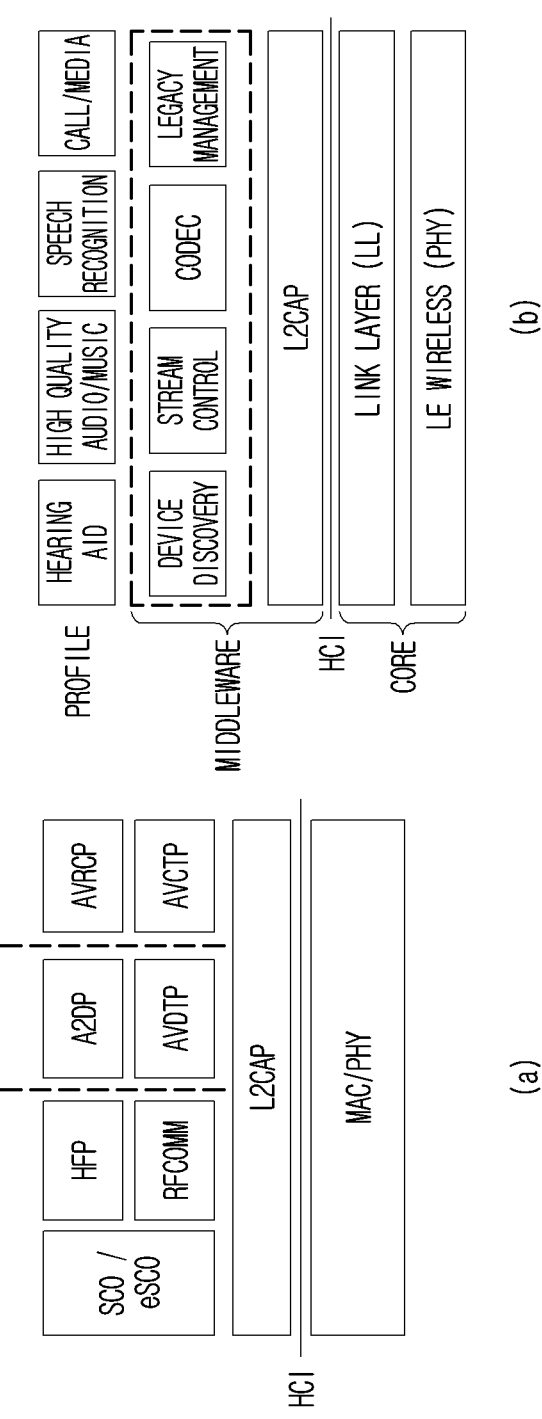
FIG. 2 is a diagram exemplarily illustrating a conventional audio-related protocol and an audio-related protocol stack to which the present is applicable.

FIG. 2 is a diagram exemplarily illustrating a conventional audio-related protocol stack and an audio-related protocol stack to which the present disclosure is applicable.

FIG. 2 (a) illustrates an example of an audio-related protocol stack. L2CAP (Logical Link Control & Adaption Protocol) layer functions as arbitration and mediation between the upper layer and the lower layer. In the upper layer, protocols such as RFCOMM (Radio Frequency Communication), AVDTP (Audio/Video Distribution Transport Protocol), AVCTP (Audio/Video Control Transport Protocol) etc. and profiles such as HFP (Hands Free Profile), A2DP (Advanced Audio Distribution Profile), AVRCP (Audio/Video Remote Control Profile) etc. may be included. The lower layer may include a MAC/PHY layer. The MAC (Medium Access Control) layer may include a link manager and a link controller, and the PHY (Physical) layer may include a BR/EDR radio. In addition, Synchronous Connection Oriented (SCO)/extended SCO (eSCO) may provide a synchronous data communication path for voice. As such, in BR/EDR, a protocol stack may be designed for each profile. The L2CAP layer, the BR/EDR protocol, the Generic Access Profile (GAP), and the BR/EDR profile layer may be collectively referred to as the host layer, and the link manager, link controller, and BR/EDR radio layer may be referred to as the controller layer. The interface between the host and the controller may be referred to as a HCI (Host Controller Interface).

FIG. 2(b) illustrates an example of a BLE audio-related protocol stack. Unlike BR/EDR in which protocols are configured for each profile, in BLE, a common protocol stack for various profiles may be designed. This common protocol stack may be referred to as middleware. For example, a common protocol for various profiles such as hearing aids, high quality audio/music, voice recognition, and call/media in the form of middleware may be configured. For example, the middleware may include protocols such as device discovery, stream control (or stream management), codec, and legacy management. In addition, the core layer may include a link layer (Link Layer, LL), an LE Radio (i.e., a PHY layer), and the LL may include functions related to multicast support isochronous channels defined from Bluetooth 5.

In addition, the profile and middleware may be referred to as a host layer, the core layer may be referred to as a controller layer, and HCI may be defined between the host and the controller.

In addition to the host profile and protocol illustrated in FIG. 2(b), the host may include an LE profile, a generic access profile (GAP), a generic attribute profile (GATT), an Attribute (ATT) protocol, a security manager (SM), and the like.

Information transmitted from a host to a controller may be referred to as a HCI command packet. Information transmitted from a controller to a host may be referred to as a HCI event packet. In addition, HCI asynchronous data packets or HCI synchronous data packets may be exchanged between a host and a controller.

Also, in addition to the middleware profiles and services illustrated in FIG. 2(b), the middleware may include various profiles and/or services as follows:

Audio Session Capability Service (ASCS): Audio Session Capability Service (ASCS) is a service that supports to advertise or discover capabilities related to an audio session;

Audio Stream Session Service (Audio Stream Session Service, ASSS): Audio Stream Session Service (ASSS) is a service that supports discovery, setup, establishment, control, and management related to an audio session;

Audio Input Management Service (AIMS): a service for managing audio input volume, etc.;

Audio Routing Service (ARS): a service for selecting the location of audio inputs and outputs;

Audio Middleware Profile (AMP): a basic profile for the behavior of a device to distribute audio;

Call Management Profile (CMP): a profile of the roles and procedures of interaction between two devices for a call;

Audio General Middleware Profile (AGMP): a basic profile that enables content and/or stream control;

Group Identification Service (GIS): a service for the discovery of devices belonging to a group. A Group Identification Service (GIS) or Group Identification Profile (GIP) may allow devices to be discovered as part of a group. A group is defined as a group of devices that operate together to support a specific scenario, and these devices may be referred to as group members. For example, a group of devices that respond to a control command together, such as a pair of hearing aids, a pair of earbuds, or a set of speakers that receive multichannel (e.g., 5.1CH) audio, may be such examples:

Audio Player Management Profile (APMP): a profile that supports the control or interaction of an audio player;

Audio Player Management Service (APMS): a service that supports the control or interaction of an audio player;

Microphone Management Profile: a profile for microphone state management;

Microphone Management Service: a service that supports interfaces and states for microphone state management;

Quick Service Discovery Service (QSDS): a service that supports quick discovery of services such as audio player management and call management;

Call Bearer Service: a service that supports management of a call interface and a call state for a bearer on a device;

Volume Management Profile: a profile that supports audio volume management of a device;

Volume Management Service: a service that supports the device's audio volume interface and state;

Volume Offset Management Service: a service for volume management for audio output.

Figure 3:
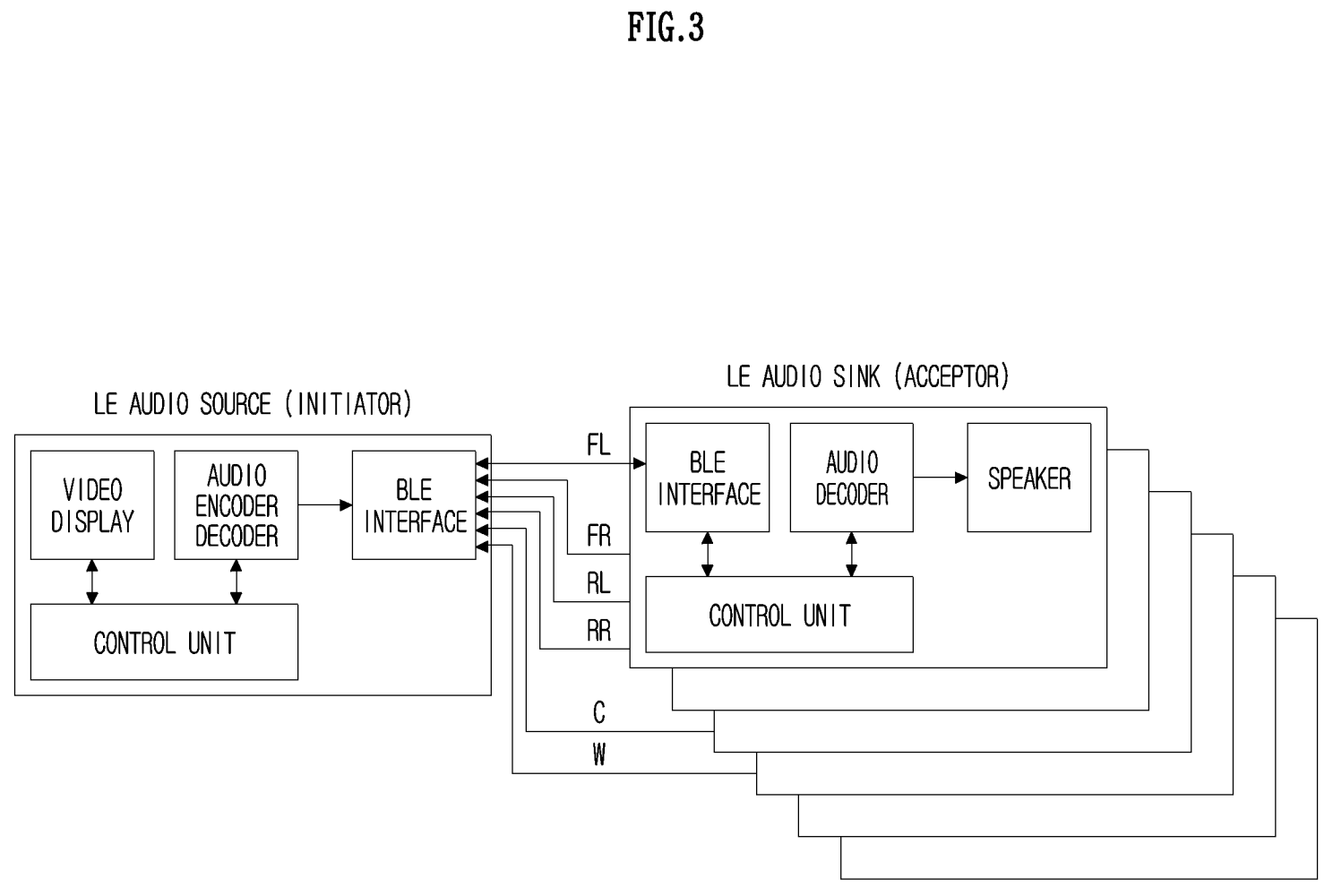

FIG. 3 illustrates examples of 5.1 channel surround system hardware to which the present disclosure is applicable.

In FIG. 3, a LE audio source device may perform a function of an initiator, and a LE audio sink device may perform a function of an acceptor. The initiator means a device that initiates an audio session, and the acceptor means a device that accepts the initiation of an audio session. Here, a source is not always the initiator or a sink is not always the acceptor, and the source may be the acceptor or the sink may be the initiator.

For example, an audio source may be a TV device, and an audio sink may be a speaker device. The audio source may transmit audio data to the audio sink. In addition, the audio source may receive feedback data from the audio sink. A plurality of audio sinks may receive audio data corresponding to one of 5.1 channels, respectively, FL (Front Left), FR (Front Right), RL (Rear Left), RR (Rear Right), C (Center), and W (Woofer) and output it through the speaker.

An audio encoder or decoder may support various audio formats. For example, the audio format may include Bluetooth Low Energy Audio Codec (BLEAC), Dolby 5.1CH, Digital Surround Sound (DTS), and the like, and the characteristics of each format are as follows. BLEAC is a mono codec, and the 96 kbps transmission rate of BLEAC may provide the same quality as 256 kbps of SBC (Sub-Band Codec) and 200 kbps of MP3. Dolby 5.1CH may support a 48 kHz sampling rate, support 1 to 5.1 (or 1 to 6) channels and support a transmission rate of up to 448 kbps. DTS may support 48 kHz or 96 kHz sampling rate, support 2 to 6.1 channels, and support transmission rates of 768 kbps half rate and 1,536 kbps full rate.

Figure 4:
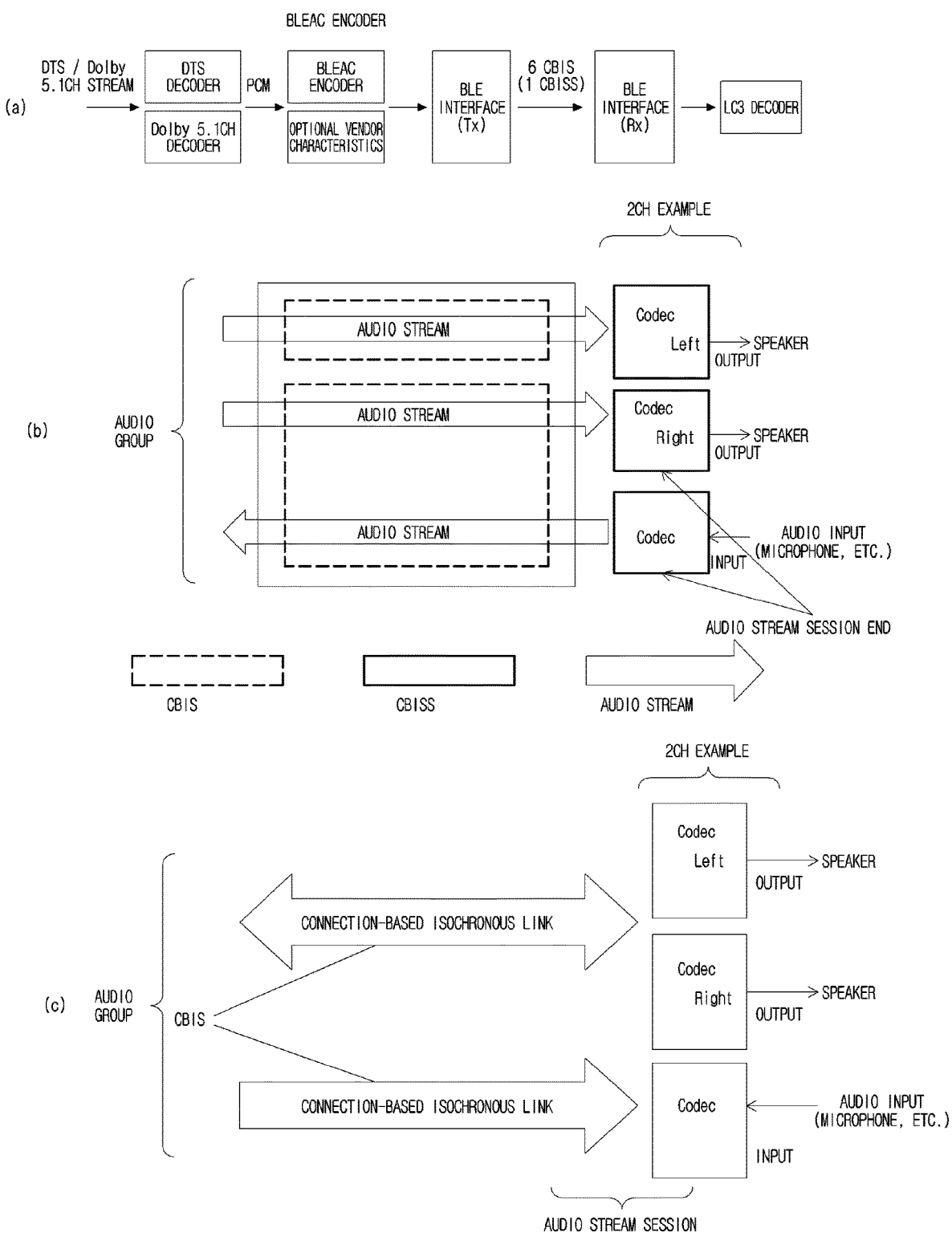
FIG. 4 is a diagram illustrating an audio data encoding/decoding process to which the present disclosure is applicable.

FIG. 4 is a diagram illustrating an audio data encoding/decoding process to which the present disclosure is applicable.

Referring to FIG. 4(a), a DTS format stream or a Dolby 5.1CH format stream may be input to a DTS decoder or a Dolby 5.1CH decoder of the transmitting end (Tx) and an audio signal in a PCM (Pulse-Code Modulation) format may be output. The PCM signal may be input to the BLEAC encoder and output as an audio signal in the BLEAC format. Here, optional vendor-specific information may be added. The BLEAC signal may be transmitted to the BLE interface of the receiving end (Rx) through the BLE interface. The receiving end may process the BLEAC signal through the BLEAC decoder and convert it into a signal that can be output through the speaker.

Here, a plurality of streams may be transmitted from a transmitting end to a plurality of receiving ends. For example, each of the plurality of streams may include an audio signal corresponding to one channel among 5.1 CHs. The plurality of streams may be received at different times from the plurality of receiving ends, but have isochronous properties that require play or rendering at the same time, and these streams may be called CBIS (Connection Based Isochronous Stream). That is, six CBISs corresponding to 5.1CH may be transmitted from a transmitting end to a receiving end, and a set of these six CBISs may be referred to as one CBISS (Connection Based Isochronous Steam Set).

FIGS. 4(b) and 4(c) conceptually illustrates audio streaming through a plurality of streams. One or more audio streams may correspond to CBIS, and an audio group may correspond to CBISS. For example, one audio stream may correspond to one CBIS, and two or more audio streams may correspond to one CBIS. A plurality of CBISs may be included in one audio group or CBISS.

Figure 5:
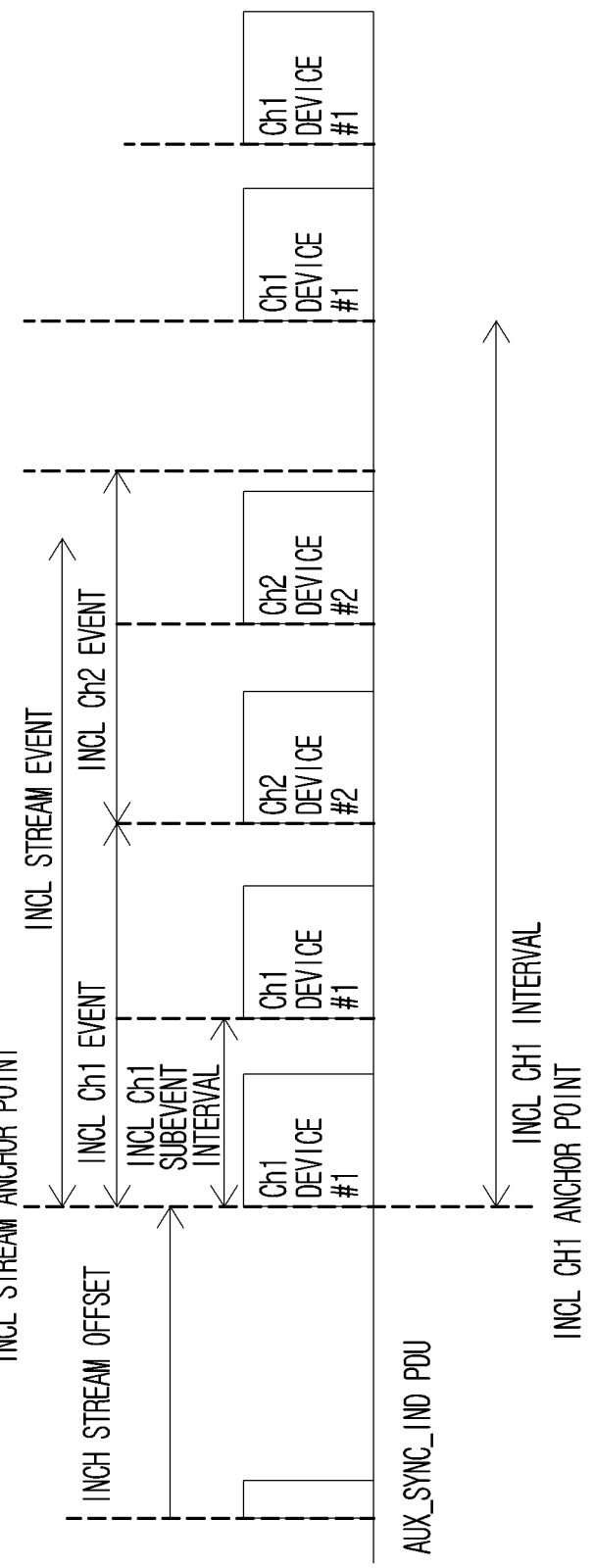
FIG. 5 is a diagram illustrating an example of channel allocation for two devices to which the present disclosure is applicable.

FIG. 5 is a diagram illustrating an example of channel allocation for two devices to which the present disclosure is applicable.

The receiving end may initiate stream reception according to timing information provided by the transmitting end. For example, the timing information may indicate a time point after a predetermined offset from a time point at which a data unit including the timing information is transmitted. The receiving end may receive audio data corresponding to one or more channels included in the stream. For example, a plurality of channels included in one stream may be allocated to a plurality of receiving ends, respectively. A plurality of channels (or a plurality of audio data) included in one stream may be transmitted in a time division multiplexing (TDM) method. For example, audio data of a first channel may be transmitted at a first timing, and audio data of a second channel may be transmitted at a second timing.

The broadcast receiving end may detect a currently obtainable broadcast audio stream, a stream offset value, a stream interval value, and the like, by using information included in a data unit periodically advertised by the transmitting end.

In the case of an Isochronous Non-Connection Link (INCL), which is a connectionless-based isochronous link, an isochronous channel may be transmitted/received (e.g., in a broadcast manner) without a connection between a source device and a sink device. From information such as BSG (Broadcast Synch Group) included in the AUX_SYNC_IND Protocol Data Unit (PDU) advertised by the transmitting end, the receiving end may check the INCL stream offset or BSG offset, and determine the anchor point timing. INCL stream transmission may start from the anchor point. A timing difference between two consecutive anchor points may be defined as an interval (e.g., an INCL CH1 interval or an ISO interval of FIG. 5). One or more sub-events may be included in the stream transmission event.

In the example of FIG. 5, one audio stream may include audio data for two channels. The first channel (CH1) may be allocated to the first device (device #1), and the second channel (CH2) may be allocated to the second device (device #2). At one or more timings after the anchor point, CH1 included in the INCL stream may be transmitted to the device #1, and thereafter, CH2 may be transmitted to the device #2 at one or more timings. In addition, the INCL stream event may include an event for CH1 and an event for CH2. An event for CH1 may include two sub-events. An event for CH2 may include two sub-events. A timing difference between sub-events may be defined as a sub-event interval.

Isochronous audio data may have a limited lifetime. That is, the audio data may be invalidated after the predetermined time has expired. For example, a predetermined timeout value may be defined in the ICL channel, and isochronous audio data transmitted to a plurality of devices may be discarded after the predetermined timeout value has expired. For example, a timeout may be expressed as a number of sub-events.

Figure 6:
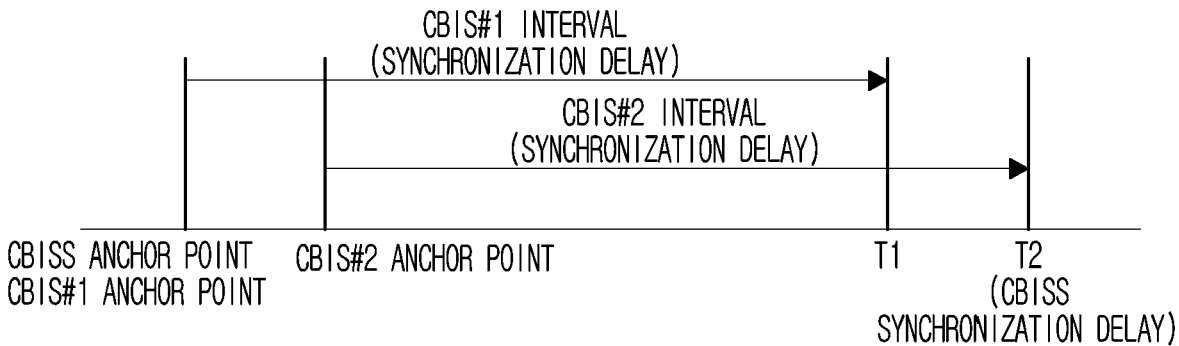
FIG. 6 is a diagram for describing a synchronization delay of two streams to which the present disclosure is applicable.

FIG. 6 is a diagram for describing a synchronization delay of two streams to which the present disclosure is applicable.

It is assumed that a plurality of streams are included in one audio group, and the plurality of streams have isochronism required to be reproduced at the same time. A plurality of streams may be transmitted from one device or may be transmitted from different devices. Also, the plurality of streams may be received by one device or may be received by different devices.

Since the Bluetooth communication method does not support simultaneous transmission of a plurality of streams, the plurality of streams may be transmitted in the TDM method on different time resources (or timings) according to a predetermined order. In this case, a difference may occur in the transmission timing of the plurality of streams, and accordingly, a difference may also occur in the reception timing of the plurality of streams. In addition, since a plurality of streams are required to be reproduced simultaneously, the stream received first cannot be reproduced first, but may be reproduced after waiting until the last stream is received. That is, a synchronization delay may occur until a timing at which reception of all streams is completed.

In the example of FIG. 6, the first stream (CBIS #1) and the second stream (CBIS #2) may be required to be reproduced simultaneously, and may be included in one CBISS. The CBISS anchor point may be same as the anchor point of CBIS #1, and after the CBIS #1 audio data may be transmitted, CBIS #1 audio data subsequent to the time point (e.g., T1) after the CBIS #1 interval may be transmitted. Next, after CBIS #2 audio data is transmitted from the anchor point of CBIS #2, CBIS #2 audio data subsequent to a time point after the CBIS #2 interval (e.g., T2) may be transmitted. After all streams included in one CBISS are received, they may be reproduced simultaneously. That is, the audio data of CBIS #1 and CBIS #2 may be processed and reproduced at the time of completion of reception of CBIS #2, which is transmitted relatively late.

Here, the synchronization delay of the CBISS may be defined as a time interval until the reception completion time (T2) of CBIS #2, which is received relatively late from the CBISS. For example, the later time point among the reception completion time T1 of CBIS #1 and the reception completion time T2 of CBIS #2 may be determined as the synchronization delay of the CBISS. That is, a later reception completion time among synchronization delays of a plurality of streams may be determined as a synchronization delay of the CBISS. Specifically, when CBIS #1 and CBIS #2 are bundled into the same single CBISS, the previously received stream CBIS #1 may be reproduced after waiting until the received stream CBIS #2 information is transmitted.

The transmitting end (Tx) may inform the receiving end (Rx) of an expected delay value calculated in consideration of the number of CBISs, CBIS events, sub-events, and intervals in advance. For example, the transmitting end may inform the receiving end of the expected delay value when configuring the channel.

In the case of a connection-based isochronous connection link (ICL), since the transmitting end and the receiving end are connected, the receiving end may inform the transmitting end of the actual delay value.

In the case of INCL, since the transmitting end and the receiving end are not connected, the receiving end cannot inform the transmitting end of the actual delay value. Even if the delay value may be informed from the receiving end to the transmitting end, the transmitting end cannot control the playback time of a specific device in order to synchronize the plurality of devices.

For example, even in the case of INCL, when a plurality of CBISs (e.g., six CBISs corresponding to six channels of 5.1CH) are included in one CBISS, the transmitting end may receive feedback from the receiver to adjust synchronization. Through the feedback, the receiving end may inform the transmitting end of its delay information.

Figure 7:
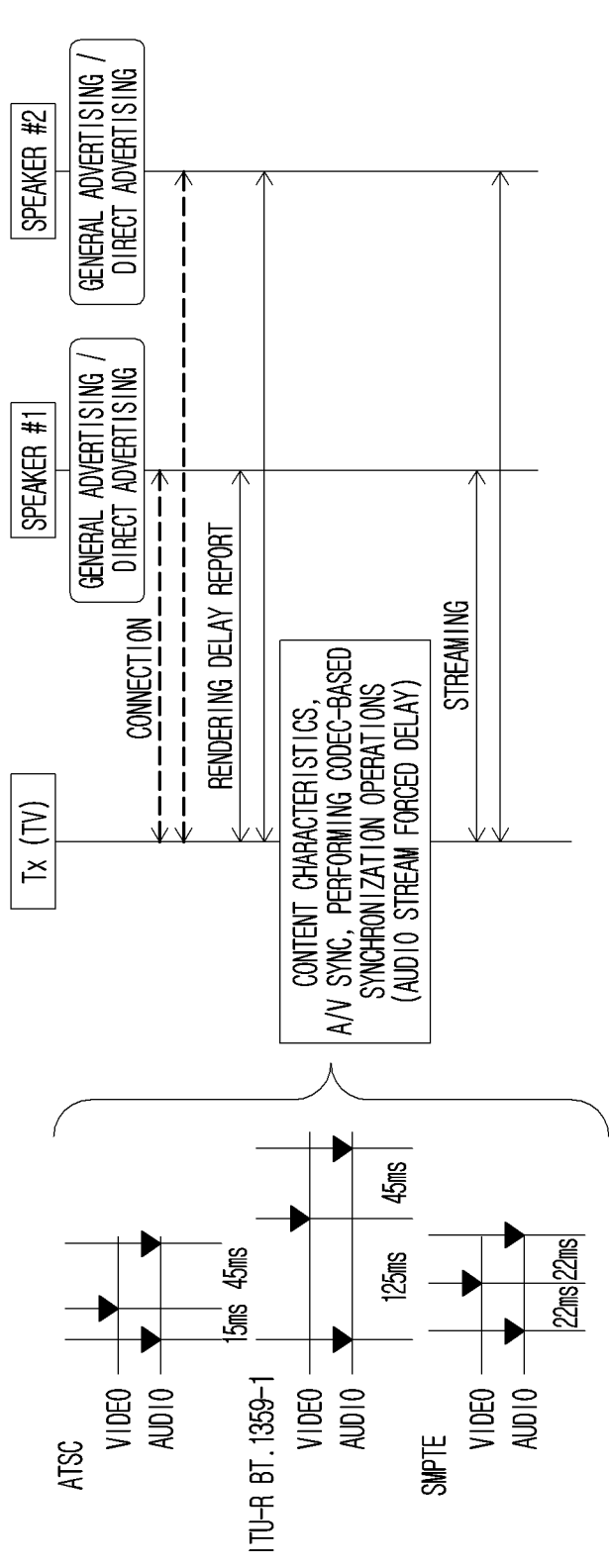
FIG. 7 is a diagram for describing a broadcast operation for a plurality of devices to which the present disclosure is applicable.

FIG. 7 is a diagram for describing a broadcast operation for a plurality of devices to which the present disclosure is applicable.

The audio source device may calculate a synchronization delay value for simultaneous reproduction of isochronous streams and transmit it to a plurality of audio sink devices. Each of the sink devices may determine the playback timing based on the delay value provided from the source device. That is, since the source device cannot accurately know the amount of time the sink device takes to receive and process audio data, the sink device may provide the delay value as basic information for determining the playback timing. The sink device may determine a reproduction timing according to its device characteristics and reproduce audio data.

For example, in an Isochronous Broadcast operation, a source device (e.g., a TV) may calculate a transmission delay, a rendering delay, etc., and transmit to a sink device (e.g., speaker). The sink device may adjust playback or rendering timing of audio data by reflecting the received delay value. Since device characteristics are different for each sink device manufacturer, the actual playback timing may be determined by the sink device.

If the sink device can transmit information to the source device, the sink, the sink device may calculate a delay value and transmit to the source device. Accordingly, the source device may determine the transmission timing based on the delay value provided from the sink device.

For example, a feedback channel may be formed through which a sink device (e.g., a speaker) may communicate information to a source device (e.g., a TV). In this case, a unicast operation based on an isochronous connection may be performed. The sink device may calculate a rendering delay value and transmit it to the source device through a feedback channel. Accordingly, the source device may adjust the transmission time of the audio data by reflecting the delay value provided from the sink device.

Referring to FIG. 7, an isochronous stream operation is exemplarily illustrated in the case where a transmitting end is a TV, and two receiving ends are a first speaker (speaker #1) and a second speaker (speaker #2). The first speaker may be allocated a first stream/channel (e.g., RR channel in 5.1CH), and the second speaker may be allocated a second stream/channel (e.g., RL channel in 5.1CH).

The first and second speakers may transmit an audio general advertisement or an audio directed advertisement, respectively. At least one of the TV and the first speaker or the second speaker may or may not be connected to each other.

When at least one of the TV and the speaker is connected, the speaker may calculate a rendering delay value and report it to the TV. When the TV and the speaker are not connected, the TV may calculate the transmission delay, rendering delay value, and the like, and send it to the speaker.

The TV may perform a synchronization operation in consideration of audio content characteristics, audio/video synch, codec characteristics, and the like, and forcibly apply a delay to a specific audio stream. For example, since the audio codec encoding/decoding delay is different from 40 ms for BLEAC, 200 ms for SBC, 100 ms for APT-X, etc., the delay value may be determined according to codec characteristics. In addition, since characteristics of A/V content are different according to games, movies, anima- tions, and the like, a delay value may be determined in consideration of this. Also, a delay value may be determined in consideration of a difference between a media clock and a clock of the BLE interface. The media clock may be confirmed through A/V time scale information.

In addition, as shown on the left side of FIG. 7, a delay value may be determined in consideration of audio/video signal processing time defined in various broadcasting stan- dards. For example, the time interval between audio-video- audio is 15 ms and 45 ms in Advanced Television Systems Committee (ATSC), 125 ms and 45 ms in ITU-R BT.1359-1, and SMPTE (Society of Motion Picture and Television Engineers) It is defined as 22 ms and 22 ms, and a delay value may be determined in consideration of these time intervals.

The TV may configure the rendering delay value of each stream and inform the speaker, or determine the transmis- sion timing of the stream based on the delay value provided from the speaker.

The TV may transmit a stream to the speaker based on the determined delay value. That is, the source device or the TV which is the transmitting end may exchange a delay value with the sink device and the speaker(s) which is the receiv- ing end, and may perform an operation of synchronizing by reflecting the delay value.

Figure 8:
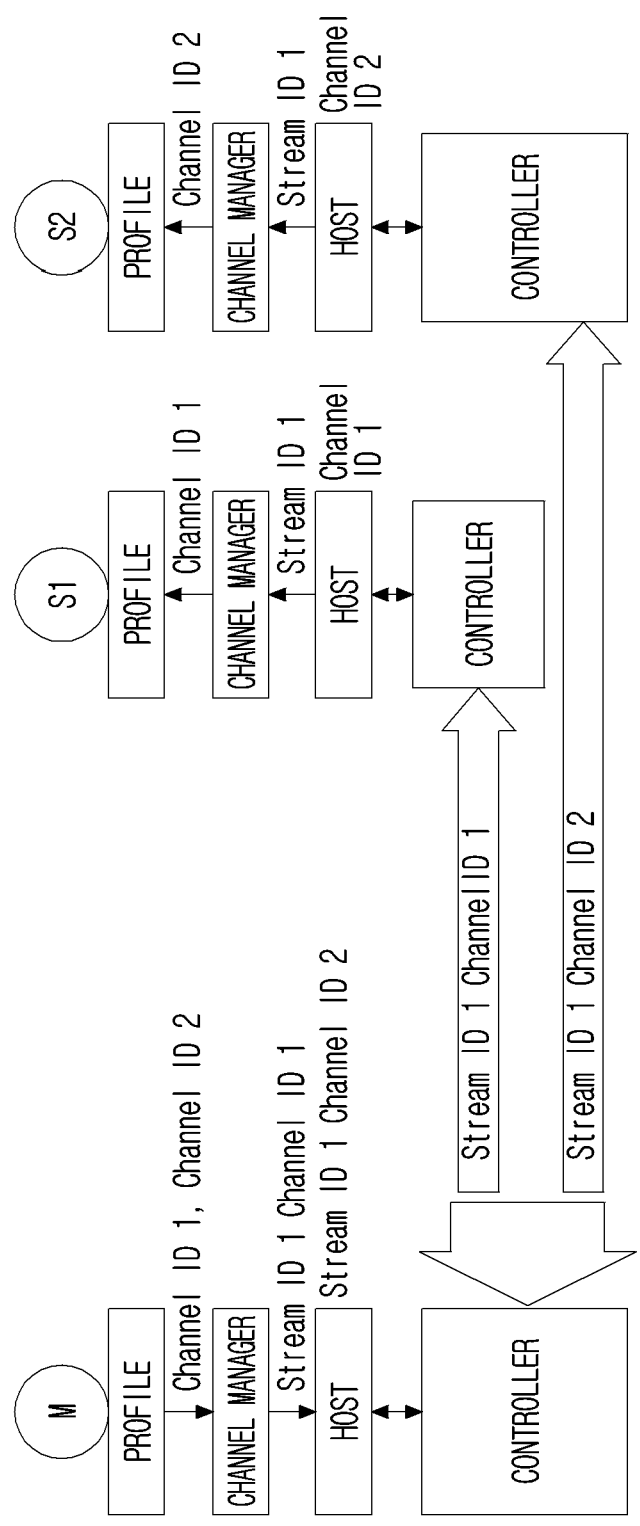
FIG. 8 and FIG. 9 are diagrams for describing the operation of the ICL type and the INCL type to which the present disclosure is applicable.
Figure 9:
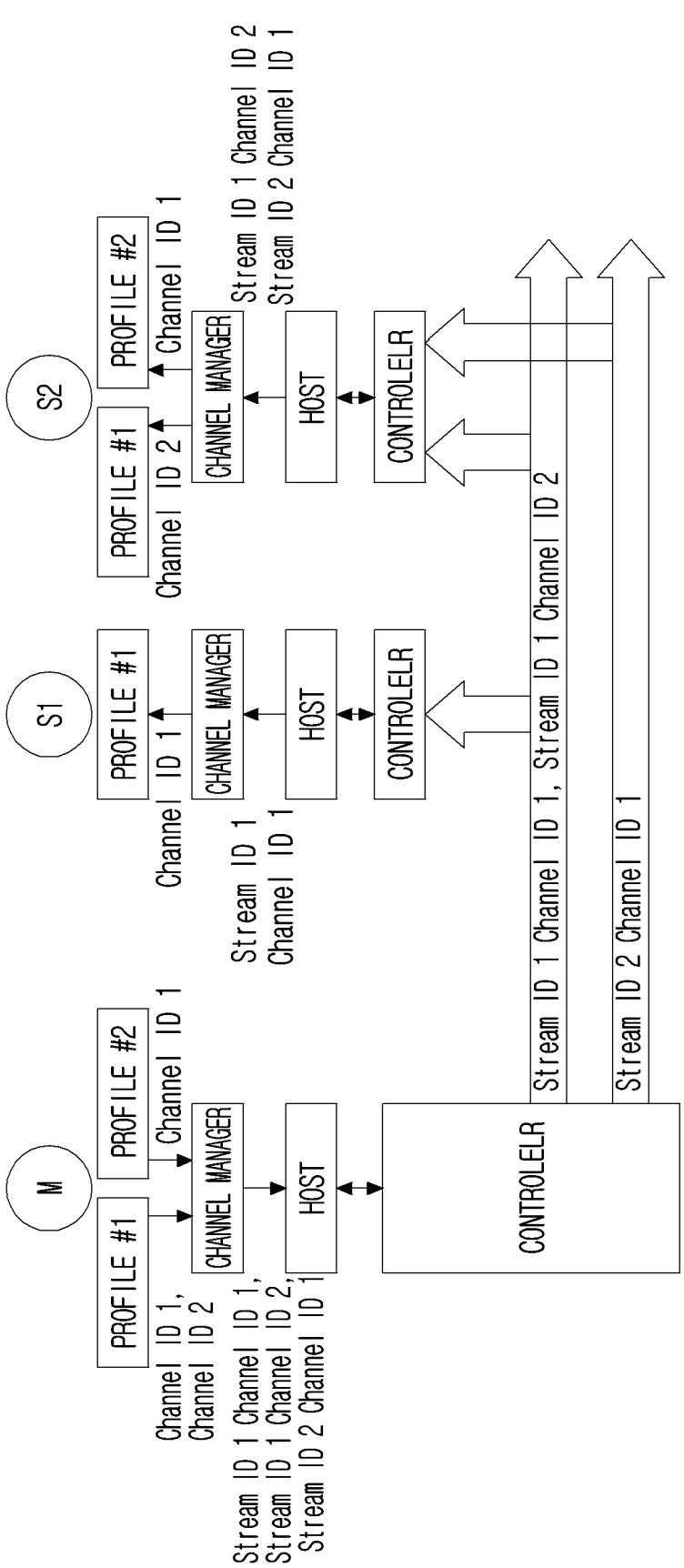

FIG. 8 and FIG. 9 are diagrams for describing the opera- tion of a ICL type and a INCL type to which the present disclosure is applicable.

In BLE, a channel for audio transmission may be classi- fied into an ICL type and an INCL type. Both the ICL channel and the INCL channel may transmit audio data to multiple devices and/or multiple profiles using a stream ID and a channel ID. According to the ICL type and the INCL type, it may be determined what operation is to be performed on the BLE channel for audio data transmission.

ICL channels correspond to a connection-based use case that supports unidirectional or bidirectional communication through a point-to-point physical link between one source device and one sink device. In addition, INCL channels correspond to a broadcast use case that supports only unidirectional communication through a point-to-multipoint physical link between one source device and one or more sink devices.

The protocol stack of the device may include a profile layer, a channel manager layer, a host layer, and a controller layer in order from an upper layer to a lower layer. Data may be transferred between the profile layer and the channel manager layer in units of channels, and data may be trans- ferred between the channel manager layer and the host layer in units of streams.

Referring to FIG. 8, in case of the ICL type, a connection between a master (M) and the first slave S1 and a connection between the master M and the second slave S2. In this case, it is possible to divide two channels included in one stream by a channel identifier and transmit to the two slaves. That is, channel ID 1 may be allocated to the S1 and channel ID 2 may be allocated to the S2. Both the channel ID 1 and the Channel ID 2 may be transmitted through the same stream ID 1. In addition, since bidirectional communication is possible based on the connection, the slaves may provide feedback information to the master M. For example, when S1 is a wireless earphone mounted on the right ear and S2 is a wireless earphone mounted on the left ear, it is possible to listen to music transmitted by the master M in stereo through S1 and S2.

Referring to FIG. 9, in the case of the INCL type, there is no connection between the master M and the slaves (S1, S2), and the slaves may synchronize with a INCL stream offset, an event, a timing of the sub-event based on the synchro- nization information advertised by the master and may receive broadcast audio data. In addition, the master M may include two profiles (profile #1 and profile #2). The first slave S1 may include the profile #1, and the second slave S2 may include the profile #1 and the profile #2. In Profile #1, the channel ID 1 and the channel ID 2 may be broadcast from the master M through one stream, Stream ID 1, and it is similar to FIG. 8 that the slaves S1 and S2 respectively receive the channel ID 1 and the channel ID in Profile #1. Additionally, in profile #2, the channel ID 1 may be broad- cast from the master M through Stream ID 2, and the second slave S2 may receive Channel ID 1 in profile #2.

Figure 10:
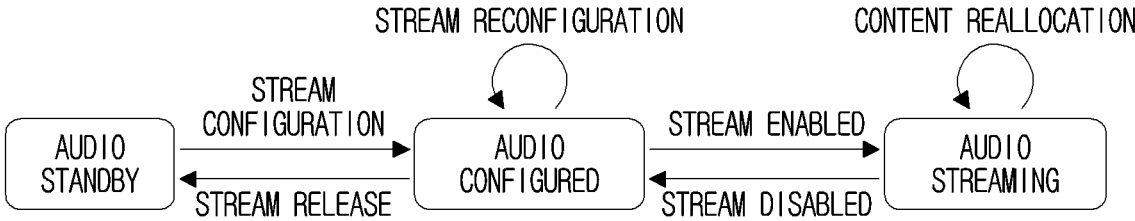
FIG. 10 is a diagram illustrating a broadcast audio stream state machine to which the present disclosure is applicable.

FIG. 10 is a diagram illustrating a broadcast audio stream state machine to which the present disclosure is applicable.

The control of the broadcast audio stream may be described as a broadcast audio stream state machine and state transition at the broadcast transmitting end.

The broadcast audio stream state machine may allow a broadcast transmitter to communicate with one or more broadcast receivers (or broadcast discovery clients) in a one-way manner without a connection or not with a broad- cast receiver (or broadcast discovery client). The broadcast transmitter may communicate using a broadcast audio advertisement in the form of a Broadcast Audio Source Session (BASS). A broadcast audio stream may be trans- mitted by a broadcast transmitter.

The AUDIO STANDBY state means a state in which a broadcast audio stream is not transmitted.

The AUDIO CONFIGURED state means a state in which a broadcast receiver (or a broadcast discovery initiator) starts advertising information for detecting an audio stream through a periodic advertising event. The periodic advertis- ing event may include delivering advertisement metadata, stream configuration, synchronization information, and the like. In this state, no audio data packet is transmitted from the broadcast transmitter.

The AUDIO STREAMING state means a state in which a broadcast audio stream is enabled in a broadcast transmit- ter and an audio data packet may be transmitted. The broadcast transmitter may continuously perform metadata advertising through periodic advertising while transmitting the broadcast audio stream. If a stream is configured in the AUDIO STANDBY state, it may transition to the AUDIO CONFIGURED state, and if the stream is released in the AUDIO CONFIGURED state, it may transition to the AUDIO STANDBY state. If a stream is enabled in the AUDIO CONFIGURED state, it may transition to the AUDIO STREAMING state, and if the stream is disabled in the AUDIO STREAMING state, it may transition to the AUDIO CONFIGURED state. If a stream reconfiguration occurs in the AUDIO CONFIGURED state, it may transition to the AUDIO CONFIGURED state. When content reas- signment occurs in the AUDIO STREAMING state, it may transition to the AUDIO STREAMING state.

Figure 11:
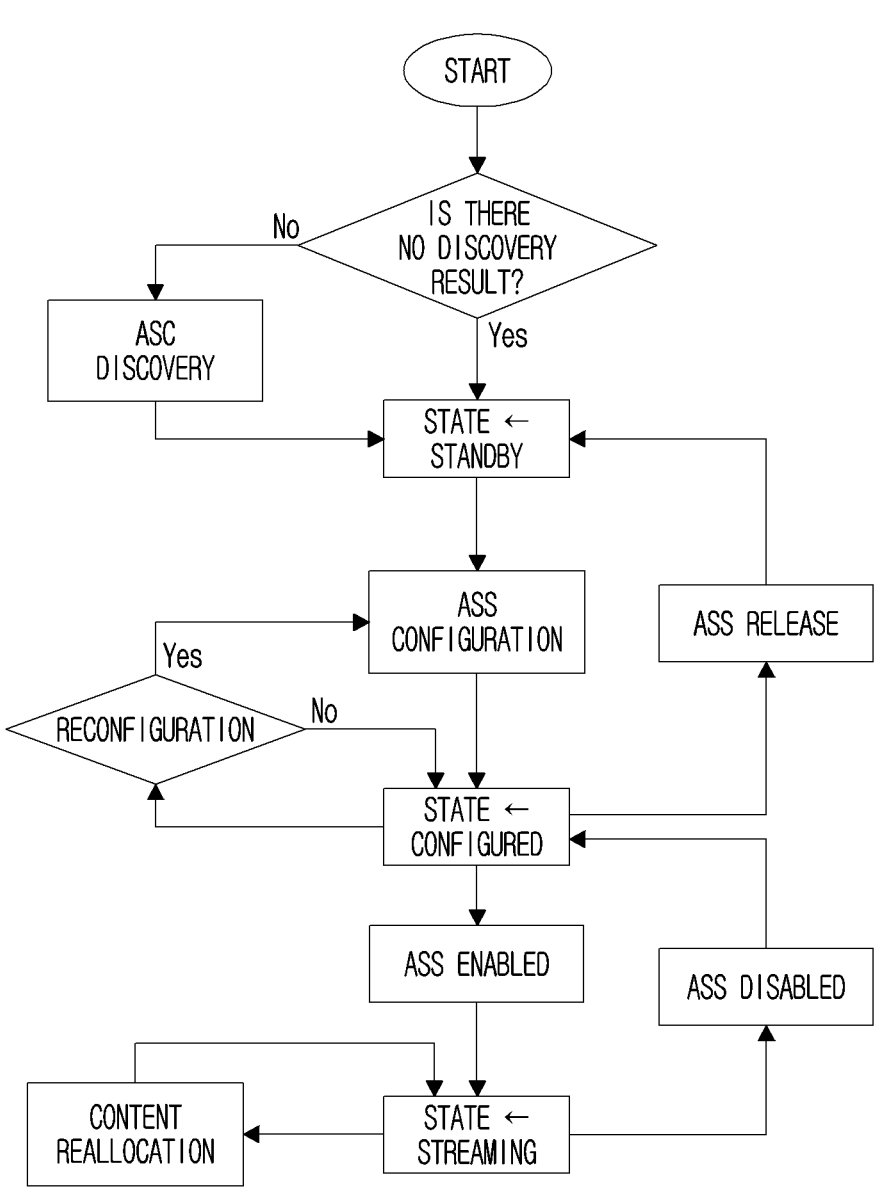
FIG. 11 is a diagram illustrating an audio setup procedure to which the present disclosure is applicable.

FIG. 11 is a diagram illustrating an audio setup procedure to which the present disclosure is applicable.

When there is no discovery result (that is, zero discovery), the AUDIO STANDBY state may be transitioned, and if there is a discovery result, discovery for Audio Stream Capability (ASC) may be performed and transition to the AUDIO STANDBY state.

When an ASS (Audio Stream Session) configuration occurs, it may transition to the AUDIO CONFIGURED state. If ASS is released in the AUDIO CONFIGURED state, it may transition to the AUDIO STANDBY state. When reconfiguration occurs in the AUDIO CONFIGURED state, it may transition to the AUDIO CONFIGURED state through the ASS configuration.

When ASS is enabled, it may transition to AUDIO STREAMING state. If ASS deactivation occurs in the AUDIO STREAMING state, it may transition to the AUDIO CONFIGURED state. If content reassignment occurs in the AUDIO STREAMING state, it may transition to the AUDIO STREAMING state.

Figure 12:
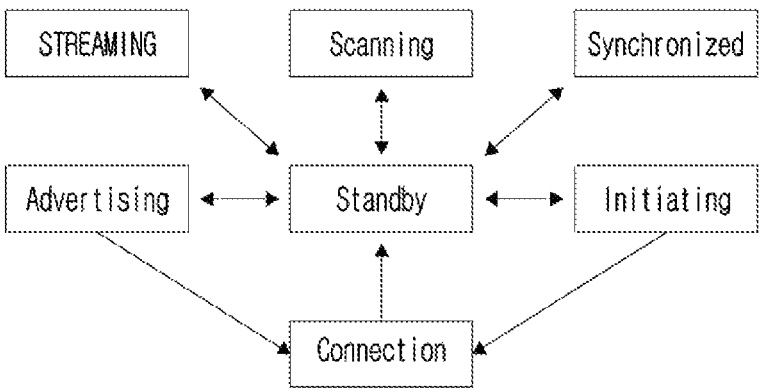
FIG. 12 is a diagram illustrating a link layer state machine to which the present disclosure is applicable.

FIG. 12 is a diagram illustrating a link layer state machine to which the present disclosure is applicable.

The operation of the link layer LL may be expressed as (in terms of an isochronous channel) Standby state, Advertising state, Scanning state, Initiating state, Connection state, Synchronized (synchronization) state, and Streaming (Isochronous Broadcasting) state.

The Standby state corresponds to a standby state before transitioning to another state.

In the Advertising state, the LL may operate as a advertiser transmitting an advertising packet. When a connection is established in the advertising state, the device may operate as a slave.

In the Initiating state, the LL may act as an initiator that listens for packets from other advertisers and initiates a connection in response to the packets. When a connection is established in the initiating state, the device may operate as a master.

In the Scanning state, the LL may act as a scanner that listens for packets from other advertisers and requests additional information.

The synchronized state may refer to a state in which an audio stream may be received or received in synchronization with another device.

The streaming state may refer to a state in which an audio stream is transmitted to another synchronized device.

Figure 13:
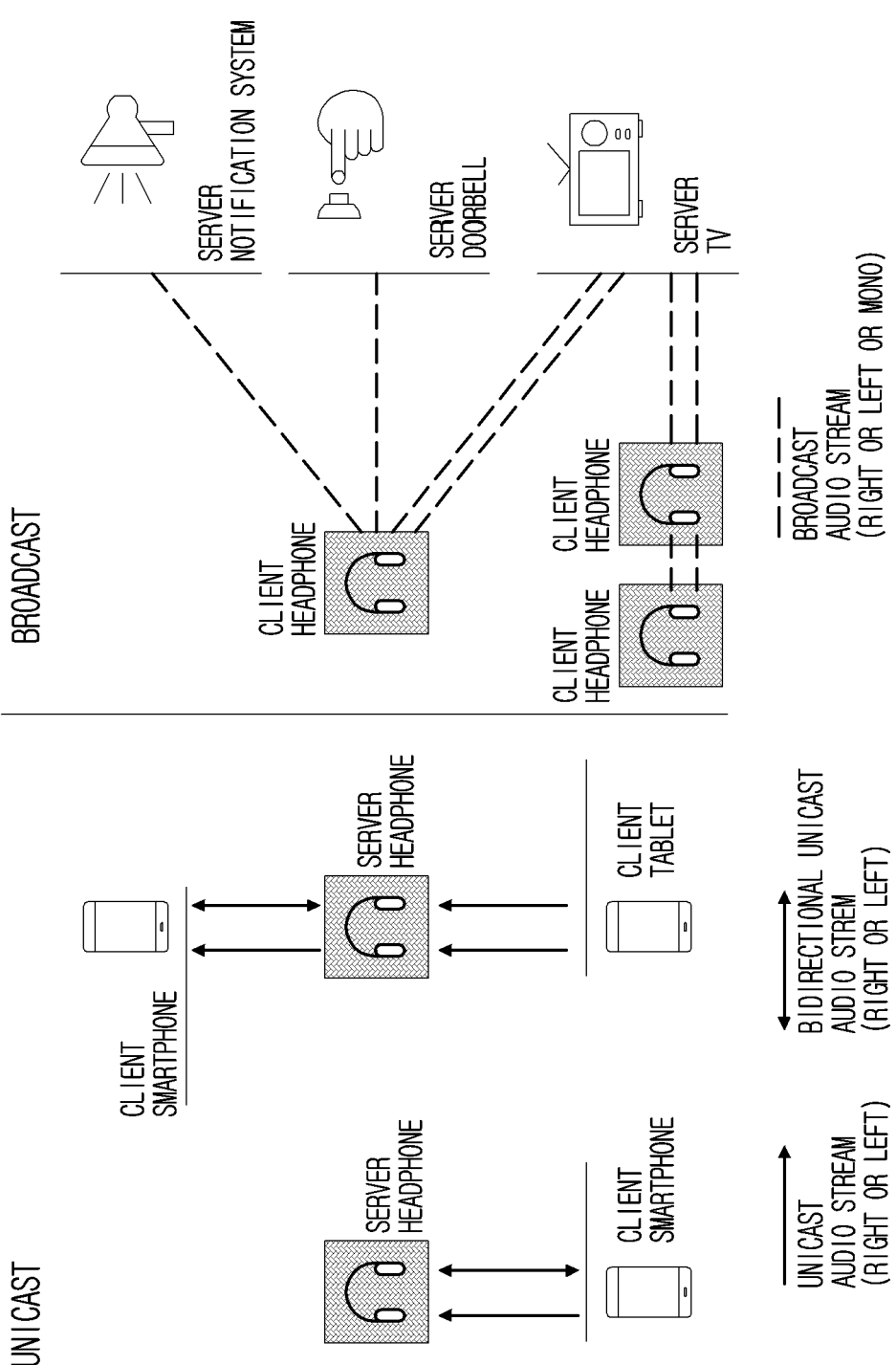
FIG. 13 is a diagram illustrating an example of an audio topology to which the present disclosure is applicable.

FIG. 13 is a diagram illustrating an audio topology to which the present disclosure is applicable.

In the case of unicast, unidirectional or bidirectional audio streams may be supported. Unicast audio data transmission/reception based on a connection between a headset and a smartphone may be performed, and the unicast audio data transmission/reception based on a connection between a headset and a smartphone and a connection between the headset and a tablet may be performed. In this case, the server of the unicast audio service may be a headphone, and the client may be a smartphone or tablet. Also, headphones may correspond to an audio sink, and a smartphone or tablet may correspond to an audio source.

In the case of broadcast, a notification system, a doorbell, a TV, etc. may transmit audio data in a broadcast manner, and one or more devices may receive the broadcast audio data. In this case, the server of the broadcast audio service may be a notification system, a doorbell, a TV, or the like, and the client may be a headphone. Also, the headphones may correspond to an audio sink, and a notification system, a doorbell, and a TV may correspond to an audio source.

Figure 14:
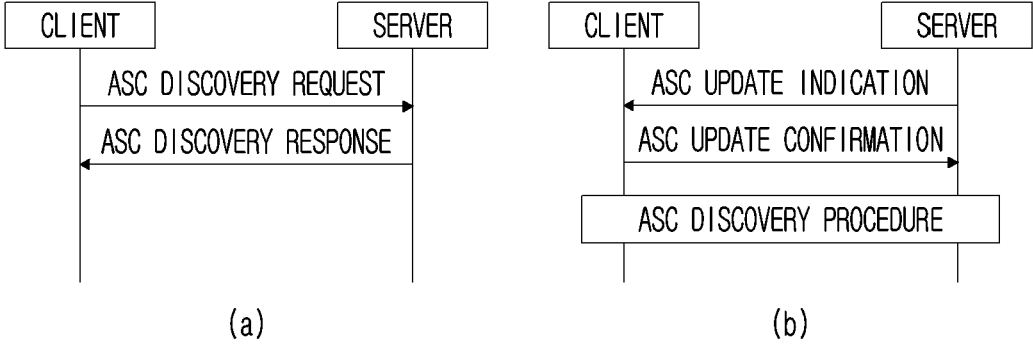
Figure 15:
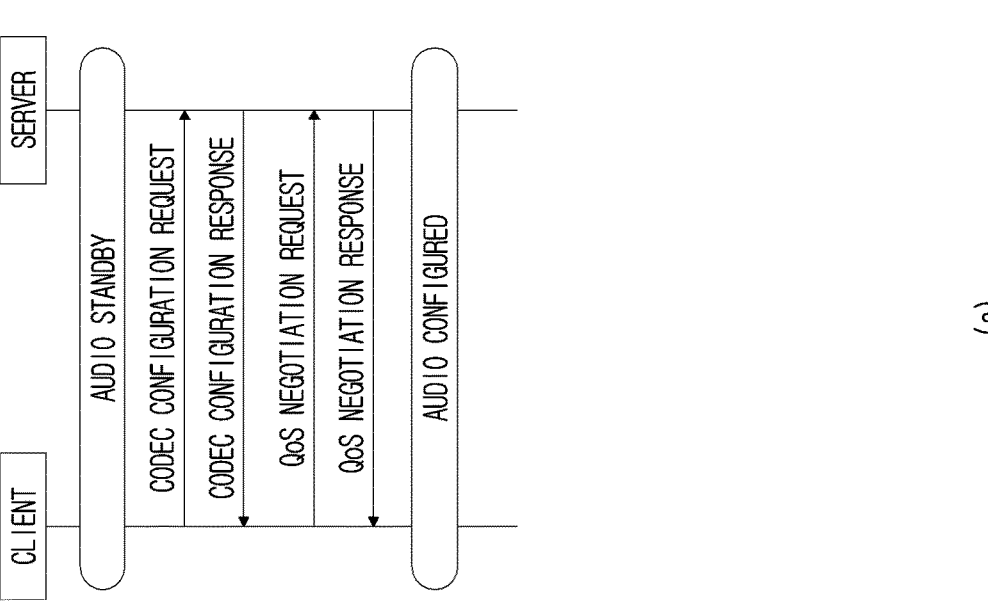
Figure 16:
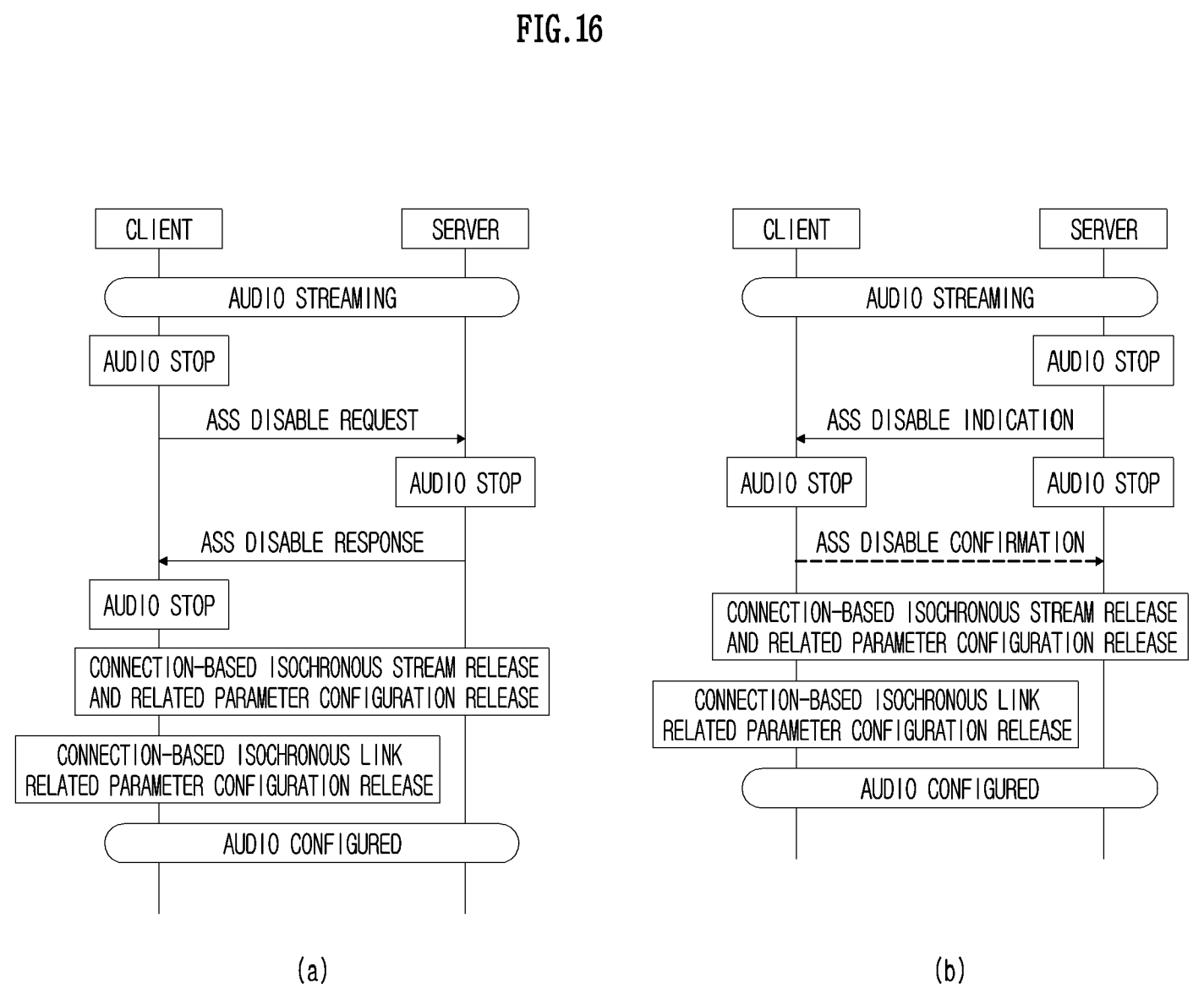

FIG. 14 to FIG. 16 are diagrams illustrating a message exchange procedure between a server and a client to which the present disclosure is applicable.

In the example of FIG. 14 to FIG. 16, the client may be an audio source and the server may be an audio sink. Or, the client may be an audio sink and the server may be an audio source.

FIG. 14 exemplarily illustrates an audio session capability (ASC) discovery procedure and an ASC update procedure.

In the audio session capability discovery procedure of FIG. 14(a), the client may request capability discovery by transmitting an ASC discovery request message to the server, and in response to that, the server may transmit detailed information of the capability by transmitting an ASC discovery response message to the client.

In the audio session capability update procedure of FIG. 14(b), the server may transmit an ASC update indication message to the client to inform that the capability update has occurred, and the client may notify the server to perform a capability update by transmitting an ASC update confirmation message. Subsequently, an audio session capability discovery procedure or an ASC discovery procedure may be performed.

The format of the message used in the example of FIG. 14 may be defined as shown in Table 1 below.

TABLE 1

| ASC_DISCOVERY REQUEST |
| --- |
| Direction |
| ASC_DISCOVERY RESPONSE |
| Sink Locations: Bitmap |
| Source Locations: Bitmap |
| Number of ASC Records |
| Direction |
| Codec ID |
| Sampling Frequency |
| Codec Specific |
| Content Protection Type |
| Content Protection type Specific |

The ASC update indication message and the ASC update confirmation message may include information indicating that ASC discovery is required and confirmation information therefor, respectively.

FIG. 15 exemplarily illustrate a unicast audio stream configuration procedure and an unicast audio stream establishment procedure.

In the unicast audio stream configuration procedure of FIG. 15(a), the client, in the AUDIO STANDBY state, may transmit a Codec configuration request message to the server to inform the server of the codec requesting configuration, and the like. In response, the server may transmit a codec configuration response message to the client to inform the server of QoS and rendering delay values supported by the server. In addition, the client may transmit a QoS negotiation request message to the server to specify a specific audio stream session (ASS), an audio group, and an audio stream to inform the client of QoS and rendering delay values supported by the client. In response, the server may transmit a QoS negotiation response message to the client. Accordingly, bandwidth (BW), bitrate, etc. may be determined by negotiation between the client and the server, and the client and the server may transition to a CONFIGURED state.

In the unicast audio stream establishment procedure of FIG. 15(b), the client may transmit an ASS enable request message to the server in the AUDIO CONFIGURED state to inform information on the ASS requesting activation. In response, the server may transmit an ASS enable response message to the client to inform about which ASS to enable.

Configuration for connection-based isochronous link parameters may be performed at the client, and CBIS may be established by the client and the server configuring the connection-based isochronous stream connection and related parameters. If the client is the audio sink and the server is the audio source, the server may prepare to play audio data and transmit an ASS Rx ready indication message to the client, and the client may prepare to provide audio data after receiving the ASS reception ready indication notification message. Accordingly, the client and the server may transition to the AUDIO STREAMING state.

The format of the message used in the example of FIG. 15 may be defined as shown in table 2 below.

TABLE 2

| CODEC CONFIGURATION REQUEST |
| --- |
| ASS ID |
| ASA ID |
| Direction |
| Codec ID |
| Sampling Frequency |
| Codec Specific |
| CODEC CONFIGURATION RESPONSE |
| ASS ID |
| Server Supported QoS (Interleaved, Framed, Transport Latency) |
| Presentation delay |
| QOS NEGOTIATION REQUEST |
| ASS ID |
| CBISS ID |
| CBIS ID |
| Client QoS (Transport Latency) |
| Rendering Delay |
| QOS NEGOTIATION RESPONSE |
| ASS ID |
| ASS ENABLE REQUEST/ASS ENABLE RESPONSE |
| Number of ASS ID |
| ASS ID |
| ASA ID |
| Content Type |
| ASS RX READY COMMAND/ASS RX READY NOTIFICATION |
| Number of ASS ID |
| ASS ID |

FIG. 16 exemplarily illustrates a procedure for disabling an audio stream by a client and a procedure for disabling an audio stream by a server.

In the procedure of the client disable audio streams in FIG. 16(*a*), if the client is an audio source and the server is an audio sink, when the client decides to stop the audio in the AUDIO STREAMING state, an ASS disable request message may be transmitted to the server. Accordingly, the server may stop streaming audio data and transmit an ASS disable response message to the client. Upon receiving this, the client may stop audio data encoding and audio application operation.

Alternatively, if the client is an audio sink and the server is an audio source, the client may stop audio data streaming and transmit ASS disable request message to the client. Accordingly, the server may stop audio data encoding and audio application operation and transmit an ASS disable response message to the client.

After that, the client and the server may perform connection-based isochronous stream release and related parameter setting release. Here, in preparation for reconnection between the client and the server, device information may be stored in the client and/or the server together with an isochronous stream connection related parameter. Accordingly, the client may release the connection-based isochronous link related parameter setting. Accordingly, the client and the server may transition to the AUDIO CONFIGURED state.

In the example of FIG. 16(*b*), in the procedure of disabling audio streams by the server, if the server is an audio source and the client is an audio sink, when the server decides to stop audio in the AUDIO STREAMING state, an ASS disable indication message may be transmitted to the client. Accordingly, the client may stop streaming audio data and may or may not transmit an ASS disable confirmation message to the server. The server may stop encoding audio data and audio application operation with or without receiving an ASS deactivation response.

Alternatively, if the server is an audio sink and the client is an audio source, the server may stop audio data streaming and transmit an ASS disable indication message to the client. Accordingly, the client may stop the audio data encoding and audio application operation, and may or may not transmit an ASS disable confirmation message to the server.

After that, the client and the server may perform connection-based isochronous stream release and related parameter configuration release. Here, in preparation for reconnection between the client and the server, device information may be stored in the client and/or the server together with an isochronous stream connection related parameter. Accordingly, the client may release the connection-based isochronous link related parameter configuration. Accordingly, the client and the server may transition to the AUDIO CONFIGURED state.

The format of the message used in the example of FIG. 16 may be defined as shown in table 3 below.

TABLE 3

| ASS DISABLE REQUEST/ASS DISABLE RESPONSE/ASS DISABLE INDICATION |
| --- |
| Number of ASS ID |
| ASS ID |
| (No Contents) |

Table 4 below exemplarily shows content reallocation request/response, ASS release request/response, general advertisement, and directed advertisement message formats.

TABLE 4

| REASSIGN CONTENT REQUEST/REASSIGN CONTENT RESPONSE |
| --- |
| Number of ASS ID |
| ASS ID |
| ASA ID |
| Content Type |
| ASS RELEASE REQUEST/ASS RELEASE RESPONSE |
| ASS ID |
| GENERAL ADVERTISEMENT |
| DIRECTED ADVERTISEMENT |
| Content Type |
| Meta data |

Figure 17:
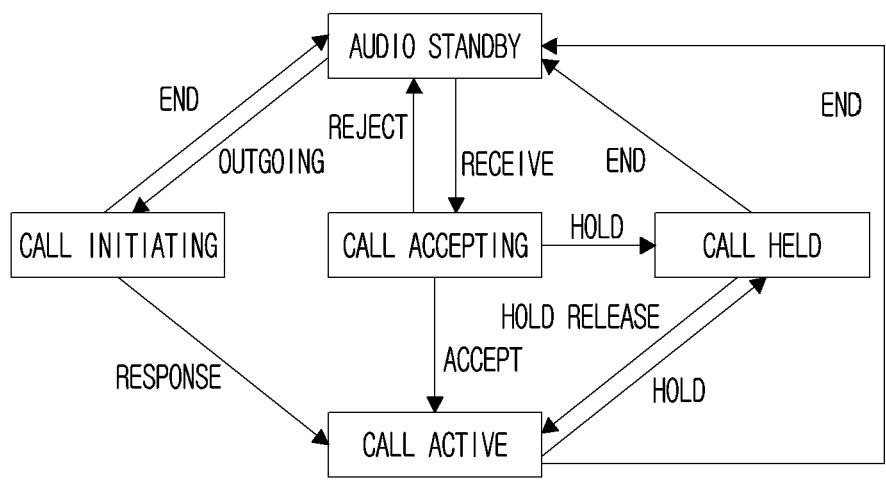
FIG. 17 is a diagram illustrating a state machine for a call service to which the present disclosure is applicable.

FIG. 17 is a diagram illustrating a state machine for a call service to which the present disclosure is applicable.

When a call is received in the AUDIO STANDBY state, it may transition to the CALL ACCEPTING state. When a call is accepted in the CALL ACCEPTING state, it may transition to the CALL ACTIVE state. When a call is rejected in the CALL ACCEPTING state, it may transition to the AUDIO STANDBY state. In the case of hold in which a call cannot be received in the CALL ACCEPTING state, it may transition to the CALL HELD state, and may transition to the CALL ACTIVE state when the hold is released in the CALL HELD state. When the CALL HELD state or the CALL ACTIVE state is terminated, it may transition to the AUDIO STANDBY state.

Also, When a call is outgoing in the AUDIO STANDBY state, it may transition to the CALL INITIATING state. When it answers a call from a remote location or the other party in the CALL INITIATING state, it may transition to the CALL ACTIVE state. When it ends in the CALL INITIATING state, it may transition to the AUDIO STANDBY state.

In such a call service state machine, audio data that needs to be delivered to the headset in the AUDIO STANDBY state may occur. For example, audio data may be transmitted to the headset when a response when a phone number is dialed is notified by sound.

Alternatively, information definitively indicating various wireless access technology (e.g., 2G, 3G, 4G, 5G, Wi-Fi, GSM, CDMA, WCDMA, etc.) related to the call service. For example, For example, a bearer technology field having a size of 1 octet may be defined. This may be related to the aforementioned call bearer service.

In the case of multiway calling, a plurality of lines may exist, and a state machine as shown in FIG. 17 may be maintained for each line. For example, when the second line transitions from the AUDIO STANDBY state to the CALL ACCEPTING state while the first line is in the CALL ACTIVE state, the first or the second line may transition to the CALL HELD state according to the user's control.

Hereinafter, logical links of Bluetooth system and logical transports will be described.

A variety of logical links may be used to support different application data transfer requirements. Each logical link is associated with a logical transport, which may have various characteristics. These characteristics may include flow control, acknowledgment/repeat mechanisms, sequence numbering and scheduling operations, and the like. A logical transport may carry various types of logical links depending on its type. A plurality of logical links may be multiplexed into the same single logical transport. A logical transport may be carried by a physical link on a particular channel.

Logical transport identification and real-time (link control) signaling may be included in the packet header, and specific logical link identification may be included in the header of the payload.

Table 5 below exemplarily illustrates logical transport types, supported logical link types, supported physical link and physical channel types, and descriptions of logical transports.

TABLE 5

| Logical transport | Links supported | Supported by | Bearer | Overview |
|---|---|---|---|---|
| Connection based Isochronous Stream | Stream (framed or unframed) LE-S or LE-F | LE isochronous physical link | LE | Unidirectional or bidirectional transport in a point-to-point connection for transferring isochronous data. |

TABLE 5-continued

| Logical transport | Links supported | Supported by | Bearer | Overview |
|---|---|---|---|---|
| Broadcast Isochronous Stream | Stream (framed or unframed) LE-S (or LE-F) and Control (LEB-C) | LE isochronous physical link | LE | Unidirectional transport for broadcasting data in a point to multipoint configuration and unidirectional transport for controlling the broadcast data |

FIG. 18 is a diagram illustrating a packet format for each layer to which the present disclosure is applicable.

FIG. 18(a) illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

FIG. 18(b) illustrates an exemplary format of the PDU of FIG. 18(a). PDU may be defined in two types, one is a data channel PDU (Data channel PDU), the other is an advertising channel PDU (Advertising channel PDU). The data channel PDU will be described in detail with reference to FIG. 19, and the advertising channel PDU will be described in detail with reference to FIG. 20.

FIG. 18(c) illustrates an example of an L2CAP PDU format, which may correspond to an exemplary format of the payload field of FIG. 18(b). The L2CAP PDU may include a Length, a Channel ID, and an Information Payload field. The length field may indicate the size of the information payload, and the information payload field may include higher layer data. The channel identifier field may indicate which upper layer data the information payload field includes. For example, if the value of the channel identifier field is 0x0004, it may indicate ATT (ATTribute protocol), if the value of the channel identifier field is 0x0004, it may indicate SMP (Security Manager Protocol), or another channel identifier indicating a different type of upper layer or middleware Values may be defined and used.

When the L2CAP packet of FIG. 18(c) is an L2CAP PDU (i.e., a control frame) transmitted on a signaling channel, the information payload field of FIG. 18(c) may be configured as shown in FIG. 18(d). The information payload field may include a code (Code), an identifier (Identifier), a length (Length) and data (Data) fields. For example, the code field may indicate the type of the L2CAP signaling message. The identifier field may include a value that matches the request and the response. The length field may indicate the size of the data field. Data fields may contain attributes. An attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data.

The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

FIG. 19 is a diagram illustrating examples of a data unit format to which the present disclosure is applicable.

FIG. 19(a) illustrates an exemplary format of a data physical channel PDU (Protocol Data Unit). The data channel PDU may be used to transmit a packet on the data physical channel (e.g., channel number 0 to 36). The data physical channel PDU includes a 16 or 24 bit length header and a variable size (e.g., 0 to 251 octet size) payload, and may further include a Message Integrity Check (MIC) field. For example, the MIC field may be included in the case of an encrypted link layer connection in which the payload field size is not 0.

As shown in FIG. 19(b), the header fields may include LLID (Logical Link Identifier), NESN (Next Expected Sequence Number), SN (Sequence Number), MD (More Data), CP (CTEInfo Present), RFU (Reserved). for Future Use). The RFU corresponds to a part reserved for future use when necessary, and its value may be usually filled with 0. Also, according to the value of the CP field, the header field may further include a Constant Tone Extension Information (CTEInfo) subfield. In addition, the Length field may indicate the size of the payload, and when the MIC is included, it may indicate the length of the payload and the MIC.

FIG. 19(c) illustrates an exemplary format of an LL Control PDU. The LL Control PDU may correspond to a data physical channel PDU used to control link layer connection. The LL Control PDU may have a fixed value according to an operation code (Opcode). The Opcode field may indicate the type of the LL Control PDU. The control data (CtrData) field may have various formats and lengths specified by the Opcode.

For example, the Opcode of the LL Control PDU may have a value (e.g., 0x1F, 0x20, 0x21, 0x22, . . . ) indicating one of LL_CBIS_REQ, LL_CBIS_RSP, LL_CBIS_IND, LL_CBIS_TERMINATE_IND, LL_CBIS_SDU_CONFI-G_REQ, and LL_CBIS_SDU_CONFIG_RSP.

When the opcode indicates LL_CBIS_REQ, the CtrData field may include information necessary for a CBIS request together with CBISS identification information and CBIS identification information. Similarly, in each case where the Opcode indicates one of LL_CBIS_RSP, LL_CBIS_IND, LL_CBIS_TERMINATE_IND, LL_CBIS_SDU_CONFI-G_REQ, LL_CBIS_SDU_CONFIG_RSP, the CtrData may include information required for a CBIS response, a CBIS indication, a CBIS termination indication, a CBIS Service Data Unit (SDU) setup request, and a CBIS SDU setup response.

FIG. 19(d) illustrates an example of audio data PDU format.

Audio data PDU may be CBIS PUD or broadcast isochronous PDU. When used in a CBIS stream, the audio data PDU may be defined as CBIS PDU. When used in a broadcast isochronous PDU, the audio data PDU may be defined as broadcast isochronous PDU.

The audio data PDU may include a 16-bit length header field and a variable length payload field. Also, the audio data PDU may further include a MIC field.

In the case of a CBIS PDU, the format of the header field may include 2-bit LLID, 1-bit NESN, 1-bit SN, 1-bit Close Isochronous Event (CIE), 1-bit RFU, 1-bit Null PDU Indicator (NPI), 1-bit RFU, 9-bit Length subfield.

In the case of broadcast isochronous PUD, the format of the header field may include 2-bit LLID, 3-bit Control Subevent Sequence Number (CSSN), 1-bit Control Subevent Transmission Number (CSTF), 2-bit RFU, and 8-bit Length subfield.

The payload field of audio data PDU may include audio data.

FIG. 20 is a diagram illustrating examples of an advertisement unit format to which the present disclosure is applicable.

FIG. 20(a) shows an exemplary format of an Advertising Physical Channel PDU (Protocol Data Unit). The advertising channel PDU may be used to transmit packets on an advertising physical channel (e.g., channel numbers 37, 38, 39). The advertising channel PDU may consist of a header of 2 octets and a payload of 6 to 37 octets.

FIG. 20(b) shows an exemplary format of a header of an advertising channel PDU. The header may include a PDU type, a Reserved for Future Use (RFU), a transmission address (TxAdd), a reception address (RxAdd), a length (Length), and an RFU field. The length field of the header may indicate the size of the payload.

FIG. 20(c) shows an exemplary format of a payload of an advertising channel PDU. The payload may include an Advertiser Address (AdvA) field with a length of 6 octets and an AdvData field with a length of 0 to 31 octets. The AdvA field may include a public address or a random address of the advertiser. The AdvData field may include zero or more advertising data (AD) structures, and padding if necessary.

FIG. 20(d) shows a format of one AD structure. The AD structure may include three fields. A length field may indicate a length of a AD Data field. That is, a value obtained by subtracting 1 from the value indicated by the length field may correspond to the length of the AD Data field. The AD Type field may indicate a type of data included in the AD Data field. The AD Data field may include advertising data provided from a host of an advertiser.

Hereinafter, a call duration transfer method according to the present disclosure will be described.

It may be assumed that the first device and the second device are connected while the audio data is being rendered or streamed in the first device and the audio data is continuously rendered or streamed in the second device. In this case, it may be required to calculate the total audio rendering or streaming time by summing the time or duration at which the audio data was rendered or streamed in the first device and the time or duration at which the audio data was rendered or streamed in the second device.

Additionally, it may be assumed that the first device and the third device are connected while audio data is being rendered or streamed in the second device while the first device and the second device are connected, and the audio data is continuously rendered or streamed in the third device. In this case, it may be required to calculate the total audio rendering or streaming time by adding the time or duration at which the audio data is rendered or streamed in the second device and the time or duration when the audio data is rendered or streamed in the third device.

For example, the audio data may be call audio data. In this case, the rendering or streaming time or duration of audio data may be defined as a call duration.

For example, the first device (e.g., a mobile phone) and the second device (e.g., a hands-free (HF) display device)) may be connected while the call audio is being rendered on the first device (i.e., while the call is not interrupted). In this case, rather than counting the call time (or call audio rendering time) from the time when the second device is connected to the first device, before the second device is connected to the first device, call time information from a point in time when a call is initiated in the first device may be transmitted to the second device. Accordingly, while the call audio data is continuously rendered through the second device, the second device may display the total call time of the currently active call.

Furthermore, the first device and the third device (e.g. watch device or AVN (audio, video, navigation) device) may be connected while call audio is being rendered on the second device connected to the first device (i.e., in a state in which the call is not interrupted). In this case, rather than counting the call time from the time when the third device is connected to the first device, before the third device is connected to the first device (and before the second device is connected to the first device), call time information from a point in time when a call is initiated in the first device may be transmitted to the third device. Accordingly, the total talk time of the call currently activated in the third device may be displayed.

FIG. 21 is a diagram illustrating an example of a call duration transfer.

In step S2110, rendering or streaming audio data for a call received from or from the phone through the headset, that is, call streaming may be performed.

When the user gets into the vehicle while the phone and the headset are connected and call streaming is being performed, the phone and the AVN (or hands-free display) may be connected. Accordingly, a call setup procedure may be performed in step S2120. The call setup procedure may include a link establishment procedure between the phone and the headset.

In step S2130, the phone may transmit previously initiated call time (i.e., call duration) information to the AVN. For example, information indicating a first call time (e.g., 5 minutes and 30 seconds) before being connected to AVN (or call setup) after a call is initiated by the phone may be transmitted from the phone to the AVN. Here, the first call time may correspond to a length of time from when call audio is rendered in the phone and/or headset to when rendering is finished. For example, the first call time (or call duration) information may additionally include information on when call audio rendering is started and ended in the previous device.

In step S2140, rendering or streaming audio data for a call maintained in the phone through AVN, that is, call streaming may be performed.

While call audio data is being streamed through the AVN, call time information may be displayed in the AVN in step S2150. For example, the call may be maintained for a second talk time (e.g., 3 minutes) after the phone and AVN are connected (or call setup). Here, the second call time may correspond to a length of time from the time when call audio is rendered in the AVN to the current time. For example, the second call time (or call duration) information may additionally include information on a time point at which call audio rendering is started and a time point (or end time point) of call audio rendering in the current device.

In this case, the AVN may not display the second talk time, but display the talk time (e.g., 8 minutes and 30 seconds) that is the sum of the first talk time and the second talk time in real time.

In the present disclosure, full call duration information may be generated by receiving the first call duration information from the previous device and combining it with the second call duration information from the current device. Such total call duration information may be displayed in the current device, transferred to another device, or used for other operations (e.g., notification, etc.) based on the total call duration. For example, audio data combining (e.g., call recording data combining) may be performed based on a start time, an end time, and a current time of rendering audio data included in the first and second call duration information.

The transfer of such call duration information may be provided by the client device (e.g., phone) in response to a request from a newly connected server device (e.g., AVN device), or the client may provide it to the server device without a request from the server.

In addition, the rendering time in each of the devices continuously participating in audio rendering may be calculated or displayed. Together with this, the total summed time of rendering in devices continuously participating in rendering may be calculated and displayed.

Hereinafter, an audio metadata processing method according to the present disclosure will be described.

First, a method for transferring metadata of audio data will be described. For example, metadata may include data indicating or identifying characteristics of audio data (or audio content). For example, audio data may be transmitted in a connection-based unicast or multicast method, or may be transmitted in a connectionless-based broadcast method.

The following example mainly describes a method of transmitting metadata in the case of transmission of audio data in a connectionless-based broadcast method. The scope of the present disclosure is not limited thereto, and includes transmitting metadata in connection-based unicast or multicast audio data transmission.

Metadata may be included in a first packet (or PDU) including a field indicating a location (e.g., time and/or channel) at which broadcast audio data is transmitted. Also, the metadata may be included in the second packet including the broadcast audio data. Also, the metadata may be included in the first packet and the second packet, respectively.

For example, the first packet may be transmitted on an information exchange channel for synchronizing. The information exchange channel for synchronizing may be a primary advertising physical channel (e.g., channel numbers 37, 38, 39), and a secondary advertising physical channel (e.g., channel numbers 0-36).

For example, the second packet may be transmitted on an audio data channel. The Audio data channels may be channel numbers 0-36.

For example, since the first packet includes a field indicating a position of the second packet, it may be referred to as a pointer packet. Also, since the second packet includes audio data, it may be referred to as an audio packet. That is, the metadata may be included in one or more of a pointer packet and an audio packet.

In addition, the metadata included in the first packet (or pointer packet) and/or the second packet (or audio packet) may include one metadata (e.g., one LTV (length, type, value) structure) field or a plurality of metadata fields (e.g., a plurality of LTV structures).

Metadata indicating or identifying characteristics of audio data (or audio content) may be referred to as program information metadata. The program information metadata may be human recognizable information (e.g., text and/or audio) related to data that the currently broadcast audio source is broadcasting. For example, the program information metadata may include one or more of language, male/female, adult/child, and program information text.

FIG. 22 is a diagram illustrating an example of a metadata transfer method to which the present disclosure is applicable.

FIG. 22(a) illustrates an example in which one point packet includes one metadata field, and FIG. 22(b) illustrates an example in which one pointer packet includes a plurality of metadata fields.

In an example of FIG. 22(a), the first pointer of the first pointer packet may indicate the location of the first audio packet. The first metadata of the first pointer packet may include information related to a characteristic of the first audio data. The first pointer packet may be transmitted on an information exchange channel for synchronization (e.g., a main/sub advertising channel). One or more audio packets including the first audio data may be transmitted on an audio data channel (e.g., a data channel) for exchanging audio data indicated by the first pointer.

In addition, the second pointer of the second pointer packet may indicate the location of the second audio packet. The second metadata of the second pointer packet may include information related to a characteristic of the second audio data. The second pointer packet may be transmitted on an information exchange channel for synchronization (e.g., a main/sub advertising channel). One or more audio packets including the second audio data may be transmitted on an audio data channel (e.g., a data channel) for exchanging audio data indicated by the second pointer.

In an example of FIG. 22(b), the pointer packet may include a first pointer and first metadata, and may additionally include a second pointer and second metadata. Although not shown, the pointer packet may include two or more pointers and metadata. The pointer packet may be transmitted on an information exchange channel (e.g., a main/sub advertising channel) for synchronization. One or more audio packets including the first audio data may be transmitted on an audio data channel (e.g., a data channel) for exchanging audio data indicated by the first pointer. One or more audio packets including the second audio data may be transmitted on an audio data channel (e.g., a data channel) for exchanging audio data indicated by the second pointer.

As described above, the metadata transmitted through the pointer packet may be used for audio filtering.

The example of FIG. 22 may be applied for audio filtering in a connectionless-based audio transmission (e.g., broadcast audio) transmission situation.

As in the example of FIG. 22, in the audio broadcasting technology, a pointer packet containing audio data pointer information indicating the location of an audio data channel through which actual audio data is to be transmitted is transmitted first, then the audio data may be transmitted at that location (i.e., the location pointed to by the pointer).

Metadata included in the pointer packet transmitted first may indicate whether audio data for adults or audio data for children will be transmitted through a data channel indicated by the pointer. Since adult audio data or children's audio data can be filtered based on such metadata, the metadata may be referred to as filter information.

As in the example of FIG. 22(a), when pointer information is individually transmitted for each audio data, an overhead of having to individually scan the pointer packet by a device receiving it may occur.

That is, the device receiving the broadcast audio may scan the main/sub advertising channels and receive the first pointer packet on one of the channels, identify that the target listener of the audio data to be transmitted is an adult based on the first metadata, and know that adult audio data is to be transmitted at a specific location based on the first pointer. Accordingly, the adult audio may be received on the data channel indicated by the first pointer.

Additionally, the device receiving the broadcast audio may scan the main/sub advertising channels and receive the second pointer packet on one of the channels, identify that the target listener of the audio data to be transmitted is an children based on the second metadata, and know that children audio data is to be transmitted at a specific location based on the second pointer. Accordingly, the children audio may be received on the data channel indicated by the first pointer.

In the example of FIG. 22B, a plurality of pointer information and a plurality of metadata for various audio data may be configured as one packet.

Instead of configuring one pointer packet for each pointer/metadata as in the example of FIG. 22(a), in the example of FIG. 22(b), one or more or a plurality of pointers/metadata may be included in one pointer packet. Accordingly, by scanning and receiving one pointer packet in the receiving device, it may be known in advance at which location the audio data of which characteristic is transmitted. Accordingly, the receiving device may check the data channel position through which the audio data desired by the receiving device (or meeting the filtering criteria) is transmitted through one scan.

In FIG. 22(*b*), the device receiving the broadcast audio may scan the main/sub advertising channels and receive a pointer packet on one of the channels, and the adult audio data associated with the first metadata may be transmitted at the location indicated by the first pointer, and it may be known that the audio data for children associated with the second metadata will be transmitted at the location indicated by the second pointer. Accordingly, the user may select specific audio data based on the metadata, and may receive the specific audio data in a data channel indicated by a pointer associated with the corresponding metadata.

FIG. 23 is a diagram illustrating an additional example of a metadata transfer method to which the present disclosure is applicable.

FIG. 23 illustrates an example of metadata transfer according to the present disclosure based on an LE audio broadcasting operation and a packet structure.

The relationship between the pointer packet and the audio packet described with reference to FIG. 22 may also be applied to the periodic advertising operation.

For example, in the periodic advertising operation, the ADV_EXT_IND packet may include a field indicating the location (e.g., time and/or channel) of the AUX_ADV_IND packet. For example, the ADV_EXT_IND packet may include AUX pointer information (i.e., the location of the AUX_ADV_IND packet). The ADV_EXT_IND packet may be transmitted on a primary advertising channel (e.g., one of channels 37, 38, 39).

The AUX_ADV_IND packet may include a field indicating the location (e.g., time and/or channel) of the AUX_SYNC_IND packet. For example, the AUX_ADV_IND packet may include SYNC pointer information (i.e., the location of the AUX_SYNC_IND packet). The AUX_ADV_IND packet may be transmitted on the secondary advertising channel (e.g., one of channels 0-36).

The AUX_SYNC_IND packet and/or the packet following the AUX_SYNC_IND may include audio data. The AUX_SYNC_IND packet may be transmitted on a data channel (e.g., one of channels 0-36).

Here, the ADV_EXT_IND packet or the AUX_ADV_IND packet may correspond to the first packet or the pointer packet, and the AUX_SYNC_IND packet may correspond to the second packet or the audio packet.

For example, the source device may exchange information to synchronize on a primary advertising channel (e.g., one of CH 37, 38, 39). In this case, AUX pointer information may be included in the advertising message or packet (e.g., ADV_EXT_IND).

After receiving the message or packet transmitted on the main advertising channel, the sink device may receive the AUX_ADV_IND message or packet on the secondary advertising channel indicated by the AUX pointer after checking the AUX pointer. The AUX_ADV_IND message or packet includes SYNC pointer information, and the sink device may receive the AUX_SYNC_IND message or packet on a channel indicated by the sync pointer. The AUX_SYNC_IND message or packet includes audio data, and the sink device may receive and render the audio data.

For example, the metadata may be included in an AUX_SYNC_IND packet (or audio packet) including a field indicating a location (e.g., time and/or channel) where broadcast audio data is transmitted. Also, the metadata may be included in an AUX_SYNC_IND packet (or audio packet) including broadcast audio data. Also, the metadata may be included in the AUX_ADV_IND packet and the AUX_SYNC_IND packet, respectively.

FIG. 24 is a diagram exemplarily illustrating a structure of metadata to which the present disclosure is applicable.

As shown in FIG. 24(*a*), the metadata may include a length field and a metadata (or vendor data) field. The length field may include a value of the length (e.g., octet size) of the metadata field. The metadata field may include language, age, gender, subscription tags (e.g., program information such as advertisement audio and sports audio).

Alternatively, as shown in FIG. 24B, the metadata may include a length field, a UUID/type field, and a metadata (or vendor data) field. The length field may include values of the UUID/type field and the length (e.g., octet size) of the metadata field. The UUID/type field may include an identifier indicating the type of metadata or a type value. For example, specific content of metadata may be used for audio filtering to be described later, but audio filtering described later may be performed based on UUID/type of metadata. The metadata field may include language, age, gender, subscription tags (e.g., program information such as advertisement audio and sports audio).

As described above, the metadata may be included in a pointer packet or an audio packet. The pointer packet or metadata included in the audio packet may be used for personalized audio or audio filtering.

For example, by using metadata for identifying characteristics of audio data, it may be to render audio data content only when it satisfies a predetermined filtering criterion. In this case, the information indicating the characteristics of the audio data may be configured as a metadata/filter information field including information that is a criterion for filtering. If the metadata/filter information field is included in the pointer packet, audio data filtered based on the metadata/filter information field may be rendered at a position indicated by the pointer included in the pointer packet.

Here, the packet including the metadata/filter information field does not include only one pointer, but may include a plurality of pointers. Alternatively, the metadata/filter information field may not consist of one field, but may consist of a plurality of fields, and each field may include one pointer. Accordingly, since pointers according to a plurality of filtering criteria may be transmitted simultaneously or consecutively, a delay from transmitting and acquiring various pointer information to applying filtering may be reduced.

Personalized audio or audio filtering according to the present disclosure may be applied to broadcast audio data transmission that does not require a connection between devices.

FIG. 25 is a diagram illustrating an example of personalized audio or audio filtering to which the present disclosure is applicable.

As described above, personalized audio or audio filtering may be performed based on metadata included in a point packet and/or audio packet provided from the transmitting side. For example, personalized audio or audio filtering may include comparing the metadata information with the filtering configuration to receive or render audio data that meets a predetermined criterion, and not receive or render audio data that does not meet the predetermined criterion. The filtering configuration may be performed before receiving the metadata and/or audio data, or may be configured simultaneously with or after receiving the metadata and/or audio data. Audio filtering may be performed by selection or confirmation of a user who has recognized the metadata, or may be automatically performed in the device according to a preset filtering criterion.

In step S2510, the user may make configurations related to audio to be heard through the headset using the phone. For example, among configurations related to audio, configurations related to personalizing information (or filtering configurations) may be included. The configurations related to the personalization information may include configurations to listen to or not to listen to specific audio according to characteristics of audio data. For example, configurations related to personalization information may include filtering-based subscription configurations, not receiving or rendering certain content (e.g., adult audio content), receiving or rendering recommended audio content, or configurations such as receiving or rendering audio content in a specific language.

In step S2520, when a signage or a TV device transmits audio data, it may transmit the audio data including personalization information on content of the corresponding audio data. For example, the signage/TV device may transmit audio data in a broadcast manner. The personalization information may be composed of metadata. The phone or headset that has received the audio data and personalization information may perform audio filtering using a field including the personalization information (e.g., metadata of FIG. 24).

In step S2530, a phone or a headset may perform audio data filtering based on personalized information or metadata related to audio data among audio data broadcast from the signage/TV, and may render filtered audio data. For example, the signage/TV may perform advertising (or broadcast) a pointer packet including a metadata and may perform advertising (or broadcast) an audio packet (or including audio data, or including the metadata and the audio data) at a location indicated by a pointer included in the pointer packet. The phone or the headset may determine whether to receive/render audio data related to the corresponding metadata based on metadata included in the pointer packet (or metadata included in the audio packet).

To this end, the broadcast profile may define a method of defining metadata (or program information metadata) of broadcast audio and a method of arranging the metadata.

A broadcast profile may define two roles of a broadcast audio source and a broadcast audio sink. A broadcast audio source (or broadcaster) may correspond to a device that broadcasts broadcast program information metadata and a broadcast stream. The broadcast audio sink (or observer) may correspond to a device that scans program information metadata in a periodic advertising method and receives a broadcast stream by using it.

The broadcast audio source may periodically perform broadcast audio advertisement. Information included in the periodic advertisement may be required for LL (Link Layer) synchronization. The broadcast advertisement data may include information on the broadcast audio source side, and may further include metadata defined in a broadcast profile. The program information metadata may be human recognizable information (e.g., text and/or audio) related to data that the currently broadcast audio source is broadcasting.

FIG. 26 is a diagram illustrating an additional example of personalized audio or audio filtering to which the present disclosure is applicable.

In an example of FIG. 26, a signage/TV device may correspond to an audio acceptor, and a phone may correspond to an audio initiator.

In step S2610, after filtering configuration is performed in the phone, the signage/TV device may broadcast audio data including personalization data (or metadata) in step S2620. Accordingly, in step S2630, a user may listen to audio data satisfying a filtering criterion through a headset or the phone.

As an additional example, the phone may perform a connection based discovery process with the signage/TV device.

For example, in step S2602, the phone may transmit a discovery capability command (CMD) to the signage/TV device, and in response, may receive a discovery capability response (RSP) from the signage/TV device in step S2604.

Accordingly, the phone may check the capability of the target device (i.e., the signage/TV device) and then perform filtering configurations accordingly (step S2610).

Here, an audio initiator such as a phone may specify a filter that constrains a response from an audio receiver such as signage/TV to a subset of the audio receiver's capability information.

If the audio receiver does not have matching audio capability information, the receiver may return an error response containing an appropriate error code. If there is audio capability information matching the audio receiver, the receiver may deliver an Audio Steam Capability (ASC) record matching a specific profile and filter together with a discovery capability response message.

If the direction filter is configured to a sink, all audio capability information having a sink direction may be returned. If the direction filter is configured as a source, all audio capability information having the source direction may be returned. If the direction filter is configured to all, all ASC records may be returned.

This filtering configuration may be configured in the phone, the headset, or both the phone and the headset through information exchange between the phone and the headset (step S2640).

Thereafter, based on the audio data broadcast from the signage/TV device and related personalization information in step S2650, the headset may render the filtered audio data in step S2660.

Table 6 below is an example of parameters included in broadcast audio advertisement, and Tables 7 to 9 show examples of fields included in program information metadata. Table 7 is a single-language (Single-Language), Table 8 is a multi-language (Multi-Language), Table 9 is an example of personalization information.

For example, metadata or program information metadata of the present disclosure may include program info text describing the TV program including the broadcast audio data of Table 7, language codes (Korean (KOR), English (ENG), French (FRE)) defined in standards such as ISO-639 in Table 8, or at least one of the personalization information or a bit string representing the target-listener of Table 9.

TABLE 6

| Parameter | Size (Octets) | Description |
|---|---|---|
| Service Data AD Type | 1 | Defined in Vol 3. Part C (GAP) of the Bluetooth Core Specification |
| Broadcast Audio Advertisement Service UUID | 2 | Defined in Bluetooth Assigned Numbers |

TABLE 6-continued

| Parameter | Size (Octets) | Description |
|---|---|---|
| Number of BASS (Broadcast Audio Source Session) | 1 | Number of discrete configurations supplied |
| Audio_Locations | 2xNumber of BASS | A logical OR of the bit values gives the combination of supported Audio Locations for each Number of BASS |
| Codec_ID | 1 | Codec identifier, as defined in Bluetooth Assigned Numbers |
| Sampling_Frequency | 1 | A single value describing the Sampling Frequency |
| Codec_Specific_Parameter_Length | 1 | Length N in Octets of the codec-specific Parameters. |
| Codec_Specific_Parameters | N | Codec-specific parameters (sub-band, etc.) |
| Rendering_Delay | 4 | The rendering delay for BASSs in microseconds ($\mu$s). Used to render multiple coordinated Broadcast Receivers or Broadcast Scan Servers acquiring a single Broadcast Synch Group with multiple Isochronouse streams. |
| Content_Type | 1 | Unique identifier of the Content_Type associated with the Audio Stream |
| Encryption | 1 | Indicates whether the Broadcast Synch Group is encrypted or not. Value of 0x0 indicates is it unencrypted. Value of 0x1 indicates that it is encrypted. |
| Broadcast_ID | 1 | Identifier for a Broadcast Synch Group |
| Metadata_Length | 1 | Length M in octets of the Metadata field |
| Metadata | M | Profile Metadata. Defined by an implementation or by a higher layer specification and may be modified in either the CONFIGURED or the STREAMING state. |

TABLE 7

| Field Name | Size (Octet) | Field Description |
|---|---|---|
| SL-Program Informaion Length | 2 | Length from SL-ProgramInfo UUID to SL-ProgramInfo Text (in Octet) |
| SL-Program Information UUID | 2 | UUID assigned by Bluetooth SIG, (On the other hand, as it's only meaningful in Broadcast TV, we can assign UUID here) |
| Isochronous Stream number | 1 | Isochronous Stream number referencing this stream when mono. When stereo, left channel of the stream. Last 5 bits are used for Isochronous Stream number. $1^{st}$ bit is used to distinguish mono and stereo 0(mono), 1(stereo) $2^{nd}$ and $3^{rd}$ bit are not used and zero coded. |
| SL-ProgramInfo Text | ProgramInfo Length - 3 | Program Information describing the TV program currently broadcasting |

45

TABLE 8

| Field Name | Size (Octet) | Field Description |
|---|---|---|
| ML-ProgramInfo Length | 2 | Length from ML-ProgramInfo UUID to the end (in Octect) |
| ML-ProgramInfo UUID | 2 | UUID assigned in Bluetooth SIG (likewise as before, we can assign UUID here) |
| ML-Count | 1 | Multi language repetition count from ISO_639_language_code to ProgramInfo Text |
| Isochronous Stream number[i] | 1 | Isochronous Stream number referencing this stream when mono. When stereo, left channel of the stream. Last 5 bits are used for Isochronous Stream number. $1^{st}$ bit is used to distinguish mono and stereo 0(mono), 1(stereo) $2^{nd}$ and $3^{rd}$ bit are not used and zero coded. |
| ISO_639_language_code[i] | 3 | 3 byte language code (KOR, ENG, FRE . . . ) |
| ProgramInfo Length[i] | 2 | Program Information Text Length (in Octect) |
| ProgramInfo Text[i] | Variable | Program Information describing the TV program currently broadcasting |

TABLE 9

| Field Name | Size (Octet) | Field Description |
| --- | --- | --- |
| Personalized-ProgramInfo Length | 2 | Length from Personalized -ProgramInfo UUID to the end (in Octet) |
| Personalized-ProgramInfo UUID | 2 | UUID assigned by Bluetooth SIG (likewise as before, we can assign UUID here) |
| Personalized Count | 1 | Personalized repetition count |
| Isochronous Stream number[i] | 1 | Isochronous Stream number referencing this stream when mono. When stereo, left channel of the stream. Last 5 bits are used for Isochronous Stream number. $1^{st}$ bit is used to distinguish mono and stereo 0(mono), 1(stereo) $2^{nd}$ and $3^{rd}$ bit are not used and zero coded. X:00:XXXXX |
| ISO_639_language_code[i] | 3 | 3 byte language code (KOR, ENG, FRE . . . ) |
| Personalized Info[i] | 1 | Bit field for Man, Woman, Kid, Adult, . . . M:W:K:A:xxxx (last 4 bit is not used for now) |

Hereinafter, a lock control method for a device group according to the present disclosure will be described.

A lock characteristic may be defined to allow a client exclusive access to a server, and to prevent a situation in which a plurality of clients compete simultaneously for a plurality of servers in the same coordinated set.

FIG. 27 is a diagram for describing a lock control method to which the present disclosure is applicable.

In the example of FIG. 27, it is assumed that the server is one device in the set. Other device(s) or other server(s) included in the set are omitted for clarity of description.

In step S2710, it is assumed that the server is in an unlock state. For example, it is assumed that the value of the lock characteristic has a value corresponding to "unlocked".

In step S2720, the server may receive a lock request from the first client. The lock request may include a request to change the value of the lock characteristic maintained by the server to a value corresponding to "locked".

In step S2730, the server may change the lock characteristic to the locked state according to the lock request of the first client.

In step S2740, the server may notify the first client of the change to the locked state. Accordingly, exclusive access to the server (and other server(s) in the set to which the server belongs) may be granted to the first client.

In step S2750, the server may receive a lock request from the second client while maintaining the lock state for the first client.

In step S2760, the server may transmit an error code to the second client. The error code may have a value indicating that the lock request is rejected.

In step S2770, the server may receive an unlock request from the first client while maintaining a lock state for the first client. The unlock request may include a request to change the value of the lock characteristic maintained in the server to a value corresponding to "unlock".

In step S2780, the server may change a lock characteristic to an unlock state according to an unlock request of the first client.

In step S2790, the server may notify the first client that the unlock state has been changed.

The lock characteristic as described above may be referred to as a set lock characteristic, which may be defined to support exclusive control of a group or set.

The set lock characteristic stored and maintained in the server may be written by the client according to the GATT Write Characteristic Value procedure.

When the set lock characteristic stored and maintained in the server is read by the client according to the GATT characteristic value read procedure, the server may return a value related thereto.

The set lock characteristic may be configured for notification by a GATT Write Characteristic Descriptors procedure on a Client Characteristic Configuration Descriptor (CCCD).

When a property value is changed upon connection, and the value of CCCD is configured for notification, the server notifies the client of the new property value. The server does not notify the new property value to clients who have written it in.

If the property value is changed upon disconnection and the value of CCCD is configured for notification, the server notifies the bonded client of the new property value upon reconnection. The server does not notify the new property value to clients who have written it in.

A set lock request procedure may be defined as follows.

A set coordinator may use a set lock request procedure to obtain exclusive access to set members of a coordinated set. The timing of using these procedures may be defined by the upper layer, but in general, the set lock request procedure may be performed before other procedures that cause an unwanted race condition, such as when multiple set coordinators attempt execution on set members at the same time.

In order to perform the set lock request procedure, the set coordinator may use, for each set member of the coordinated set or within a subset of the coordinated set, a GATT feature value writing procedure to write the value of the set lock feature to a predetermined value (e.g., 0x01) corresponding to the locked state. For example, the set coordinator may perform the above procedure in ascending order of rank, starting with the set member having the lowest rank characteristic value for the adjustment set or a subset of the adjustment set.

When all available set members respond with a write response, the set lock request procedure may be considered to have been completed successfully. In this case, the set coordinator may be said to own the lock on the coordinating set.

Regarding the set lock request procedure, the Set Lock Denied code indicates that the set lock cannot be granted because the server is already locked by another client.

If one set member responds with an Attribute Protocol Application error code of Set Lock Denied, the set coordinator does not write the value of the set lock attribute for the remaining set members as 0x01. The set coordinator may register a notification about the set lock characteristics of a set member that responds with a set lock rejection error code, and the set coordinator may set a timer to TCSIP (set_lock_timeout).

When the set lock characteristic value is notified and the value is 0x00 corresponding to the unlock state, or when the timer TCSIP (set_lock_timeout) expires, the set coordinator may restart the set lock request procedure.

A value of the timer TCSIP (set_lock_timeout) may be defined by a higher layer.

A set lock release procedure may be defined as follows.

The set unlock procedure may be used to unlock the reconciliation set, and the set coordinator may be again granted exclusive access to the reconciliation set.

If the set coordinator previously obtained a lock on the coordinating set through the set lock request procedure, the set coordinator may use the set unlock procedure. The timing of using the set lock release procedure may be defined by a higher layer, but in general, the set lock request procedure may be performed after another procedure that causes an undesired race condition, such as when multiple set coordinators try to execute the set members at the same time.

To perform the set lock release procedure, the set coordinator may use a GATT feature value writing procedure that writes the value of the set lock feature to a predetermined value (e.g., 0x00) corresponding to the unlocked state for all set members of the arbitration set. For example, the set coordinator may perform the above procedure in descending rank order, starting with a set member having the highest rank characteristic value among the adjustment sets.

Regarding the set lock release procedure, the Set Lock Release Not Allowed code indicates that the set lock cannot be released because the coordinated set is locked by another client.

FIG. 28 is a diagram for describing a set lock request/release procedure to which the present disclosure is applicable.

An example of FIG. 28 shows that the first set coordinator (or the first manager) performs a set lock request and set lock release procedure.

In step S2810, the first set coordinator may request a lock through a write request to the first set member and the second set member belonging to the group set or subset. For example, the first set coordinator may send a message requesting that the value of the set lock property of each of the first and second set members be written as 0x01.

Although not shown in FIG. 28, the first and second set members may send a write response to the first set coordinator. The write response may include information indicating that the value of the set lock characteristic of each set member has been written or changed to a value corresponding to the lock state. The write response may be replaced with notification of the value (or lock status) of the lock property. Accordingly, the first set coordinator may successfully obtain a lock on the devices in the group set or subset.

In step S2820, the first coordinator may perform a procedure (e.g., a control procedure) for each set member.

With the first set coordinator successfully acquiring the lock, another set coordinator (or administrator) may attempt to allow the second set coordinator to acquire the lock. For example, in step S2830, the second set coordinator may set the lock CCCD and command/response while delivering the write request message to the first set member. Also, in step S2840, the second set coordinator may request a lock from the first set member through a write request.

In step S2850, since the first set member is in a state in which a lock for the first set coordinator is configured, it may respond to an error code indicating a Set Lock Denied to the second set coordinator.

In step S2860, the second set coordinator may transmit a write request message requesting notification when the state of the set lock characteristic is changed to the first set member.

In step S2870, the first set coordinator may transmit a request for releasing the lock to the set members. For example, the first set coordinator may send a message requesting that the value of the set lock property of each of the first and second set members be written as 0x00.

Although not shown in FIG. 28, the first and second set members may send a write response to the first set coordinator. The write response may include information indicating that the value of the set lock characteristic of each set member has been written or changed to a value corresponding to the unlocked (or unlocked) state. The write response may be replaced with a notification of the value (or unlock status) of the lock property. Accordingly, the first set coordinator may successfully release the lock on the devices in the group set or subset.

In step S2880, the first set member may transmit to the second set coordinator a message informing that the value of the set lock characteristic has changed according to a notification request from the second set coordinator in step S2860. Accordingly, the second set coordinator may initiate a new set lock request procedure.

In the example of FIG. 28 described above, the set coordinator makes a lock request for each set member in a group/set/subset in an order according to a rank. Even if lock request contention by a plurality of set coordinators occurs, each set coordinator preferentially attempts a lock request for a specific set member (e.g., a set member having the lowest rank value). After the particular set member grants a lock right to a set coordinator, lock requests from other set coordinators are rejected. Accordingly, a case in which a plurality of set members within one group/set/subset grant lock rights to different set coordinators does not occur. Here, the specific set member (i.e., the device that receives the lock request first in the group/set/subset) may be referred to as a representative device.

As an additional example, it may increase overhead for a certain device to discover, access, and control each device included in one group/set/subset. For example, in most cases, the same control is applied to devices included in one group/set/subset, and when different controllers control each device in the group/set/subset, control consistency, etc. there may be problems. Accordingly, a protocol in which one control device or an administrator monopolizes the control authorization for a device group/set/subset is required.

For example, a plurality of devices may constitute one group, set, or subset. For example, all speakers constituting a 5.1-channel speaker may constitute one group or set, among which two speakers of front left and front right constitute one subset, and two of rear left and rear right Speakers may constitute another subset. Alternatively, a pair of earbuds may constitute one group or set. In this case, it is preferable to equally control devices included in one group/set/subset. In this way, when a plurality of devices constitute one group/set/subset, a method for discovering the device group/set/subset and exclusively accessing and controlling the device group/set/subset is required.

FIG. 29 is a diagram illustrating an example of a method for requesting a group ID service authorization to which the present disclosure is applicable.

Coordinating behavior for a coordinated set generally requires performing the same procedure for all set members in a group/set/subset. A contention situation may arise when multiple clients attempt to interact for the same group/set/subset.

To solve this problem, one representative of the set members may be appointed to manage the authorization status for all set members. A set coordinator or administrator may choose to exchange privilege request/response messages only with or preferentially with the delegate.

In the example of FIG. 29, the first set coordinator and the second set coordinator are devices capable of controlling a group/set/subset. In step S2910, it is assumed that the second set coordinator first transmits an authorization request to a representative (e.g., a second set member). In the examples to be described later, the authorization or the control authorization may correspond to the lock in the above-described examples.

In a situation where a plurality of set coordinators compete, a lock on the control authorization may be established according to the order in which the authorization request arrives first to the representative of the group/set/subset. For example, the set coordinator may send an authorization request message to the representative and wait for the authorization response message for a predetermined timer (e.g., an authorization response wait timer). If the authorization response message is received before the timer expires as in step S2920, and the authorization response message includes information that control authorization response acquisition is successful, the second set coordinator may acquire control permission for the group/set/subset. Alternatively, if the authorization response message is not received until the timer expires, or if the authorization response is received but includes information that control authorization response acquisition fails, the set coordinator may not acquire control permission for the group/set/subset.

If the authorization request from the set coordinator is transmitted to another member device in the group set that is not the representative member, the lock may not be configured. Alternatively, when each device in the group/set/subset individually receives an authorization request from the same or different set coordinator, the lock may be configured in the order in which the authorization request is first received from any member device within the corresponding group/set/subset.

As an additional example, before expiration of a predetermined timer for which the set coordinator waits for an authorization response message, a case may occur where the representative member receives authorization request messages from a plurality of administrators. Here, the authorization request messages of the set coordinators may be simultaneously received, or the timing or order of receiving the authorization request messages may be unclear. In this case, the representative member receiving the authorization request message may transmit an authorization response message including information indicating failure to acquire authorization to all set coordinators who have transmitted the authorization request message. The set coordinators receiving the authorization response message indicating the authorization response failure may retransmit the authorization request message after a time interval determined in a random backoff manner. The timing at which the set coordinators retransmit the authorization request message may be distributed by the random backoff method.

In step S2930, group set members other than the representative may receive which set coordinator device has control authorization. For example, the set coordinator who has obtained the authorization may notify the fact that the authorization has been obtained to group set members in a broadcast or unicast manner.

For example, the set coordinator receiving the authorization response of successful authorization acquisition from the representative member may transmit the authorization request to the next set member and receive the authorization response. As such, after successful authorization is obtained by preferentially performing the authorization request/response procedure for a specific member (e.g., a representative member or a member having the lowest rank), the set coordinator may acquire the authorization for all members in the group/set/subset by performing the authorization request/response procedure for the next member(s) sequentially (e.g., in the order of increasing the rank value).

Alternatively, among set members, for example, the representative member may transmit information about the set coordinator who has obtained authority to the remaining members.

The second set coordinator device, which has obtained the control authorization in step S2940, may transmit control information to the representative member, thereby controlling all member devices belonging to the group/set/subset. Alternatively, the set coordinator device that has obtained the control authorization may transmit the same control information to each set member in the group/set/subset.

In step S2950, even if the set coordinator device that has not acquired the control authorization may transmit a control request message to the representative member or other set members, since the other manager device has the control authorization over the member device (that is, the locked state), the set member may not respond to the control request or may send a response message indicating that the control is not possible in step S2960.

Alternatively, since the representative member device is configured among the set members for controlling the group/set/subset, when a set member other than the representative member receives a control request from an arbitrary set coordinator device (step S2950), the corresponding set member may transmit an uncontrollable response (step S2960).

When control over the group/set/subset is terminated, the second set coordinator device may send a authorization release request message to the representative member (or other set member) in step S2970, and in step S2980, an authorization response message may be received from the corresponding set member.

In step S2958, a state in which the authorization of the second set coordinator is released may be shared among set members.

For example, the representative member may perform an authorization release request/response on behalf of the other set member(s), and may transmit an authorization release state to the other set member(s).

Alternatively, the set coordinator device that has acquired the authority may send a request to release the authorization to each set member in the group/set/subset sequentially (e.g., in the reverse order of transmitting the authority request) and may receive a release response from each of those set members.

In step S2990, the first set member may notify the set coordinator of the control authorization lock/unlock state when there is a request for notification of a state change for control authorization lock/unlock from the set coordinator. For example, in steps S2950 and S2960, after the first set coordinator confirms that control is impossible to the first set member through the control request/response, the first set coordinator may request the first set member to notify the control authorization state change.

The first clause: A method of processing a lock request for a set or a subset, the method comprising: receiving, by a first server device belonging to the set or subset, a lock request from a first client device; and changing the lock characteristic to the locked state based on the unlocked state of the lock characteristic of the first server device, and transmitting a response including the lock state change information to the first client.

The second clause: in the first clause, the method of processing the lock request further includes: receiving, by the first server device, a lock request from a second client device; transmitting a response including an error code indicating that the lock state is in the lock state to the second client device based on the lock characteristic being the lock state.

The third clause: in the first clause, the method of processing the lock request further includes: receiving, by the first server device, an unlock request from the first client device; changing the lock characteristic to the unlock state based on the lock characteristic being the locked state, and transmitting a response including the unlock state change information to the first client.

The fourth clause: in the first clause, among a plurality of server devices belonging to the set or subset, a lock request is received with priority from the first server device, and the first server device is one device determined based on a preset criterion among the set or subset.

The fifth clause: in the fourth clause, a lock request is sequentially received preferentially to one or more other server devices among a plurality of server devices belonging to the set or subset, and the first server device is a device other than one determined based on a preconfigured criterion among the set or subset.

The sixth clause: The method of performing a lock request for a set or a subset, the method comprising: sending, by a first client device, a lock request to a first server device belonging to the set or subset; and receiving, from the first server device, a response including information indicating that the lock characteristic is changed to the locked state, based on the lock characteristic of the first server device being in the unlocked state.

The seventh clause: in the sixth clause, the method further includes: receiving a response including an error code indicating that a lock characteristic is in a lock state from the first server device, based on the lock characteristic of the first server device being in the lock state.

The eighth clause: in the sixth clause, the method further includes: sending, by the first client device, an unlock request to the first server device; and receiving a response including information indicating that the lock state is changed to the unlock state from the first server device based on the lock characteristic being the locked state.

The ninth clause: in the sixth clause, a lock request is transmitted with the highest priority to the first server device among a plurality of server devices belonging to the set or subset, and the first server device is one device determined based on a preconfigured criterion among the set or the subset.

The tenth clause: in the ninth clause, a lock request is sequentially transmitted preferentially to one or more other server devices among a plurality of server devices belonging to the set or subset, and the first server device is a device other than one device determined based on a preset criterion among the set or the subset.

Hereinafter, a method of changing the profile linkage controller according to the present disclosure.

A method of implementing dynamic control of a BLE audio source/sink device through a BLE audio controller will be described.

BLE audio technology supports various topologies. For example, a plurality of audio sources, a plurality of audio sinks, and a plurality of controllers for controlling these source/sink devices are supported, and more than a three-box model may be supported.

The existing BR/EDR can support the 3-box model, but since the controller cannot always know the state of the audio source, it is difficult to respond to the dynamic change of the profile/service between the audio source and the sink.

In the present disclosure, an active profile identifier (Active Profile ID, APID) is defined and it supports exchanging APIDs before setting up the audio stream. Accordingly, the source/sink/controller may know in advance the identifier and profile/service of an audio stream to be set up in the future. In addition, the controller may dynamically check the profile/service between the source and the sink to provide an optimal user experience.

FIG. 30 is a diagram illustrating an example of a method of changing a profile linkage control to which the present disclosure is applicable.

According to a music start operation by the user of the phone, music streaming may be started from the phone to the headset in step S3010.

In step S3020, the phone may request the connected watch device to start a controller for controlling music. In step S3025, the music controller is started in the watch device, and the music streaming state may be changed in the phone and the headset according to the control of the music streaming through the watch device. For example, control (e.g., volume control, seeking, pause, resume, etc.) of music streaming may be performed through the watch device while listening to music through a headset. For example, in step S3030, a music control application suitable for music control may be executed on the watch device.

It is assumed that a call is received to the user's phone and the user accepts the call. According to an incoming call reception acceptance operation by the user of the phone, music streaming from the phone and the headset may be paused in step S3030, and call streaming from the phone to the headset may be started.

In step S3040, the phone may request the watch device to pause or deactivate the music controller and to start the call controller. In step S3045, a call controller is started in the watch device, and the call streaming state may be changed in the phone and the headset according to control of call streaming through the watch device. For example, while listening to call voice data through a headset, control of call streaming (e.g., adjusting volume, answering a call, hanging up, etc.) may be performed through the watch device. For example, in step S3060, the music control application on the watch device may be changed to a call control application suitable for call control.

According to the call termination operation by the user of the phone, call streaming from the phone and the headset may be terminated in step S3070, and music streaming from the phone to the headset may be resumed.

In step S3080, the phone may request the watch device to terminate the call controller and resume the paused music controller. In step S3085, the music controller is restarted or enabled in the watch device, and the music streaming state may be changed in the phone and the headset according to control of the music streaming through the watch device. For example, in step S3090, the call control application on the watch device may be changed back to a music control application suitable for music control.

Accordingly, the user may return to the state before accepting the call, listen to music through the headset again, and control music streaming through the watch device.

FIG. 31 is a diagram for describing an audio stream setup and state to which the present disclosure is applicable.

Audio source and audio sink devices in the AUDIO STANBY state may transition to the AUDIO CONFIG-URED (codec) state by performing the APID exchange procedure (S3110) and the codec negotiation procedure (S3120). Thereafter, the QoS configuration procedure (S3130) may be performed to transition to the AUDIO CONFIGURED (codec & QoS) state. Thereafter, the ASS enabling procedure (S3140) may be performed to transition to the AUDIO STREAM ENABLED state. Thereafter, an audio handshake procedure (S3150) and an audio data path setting procedure (S3160) may be performed to transition to the AUDIO STREAMING state.

APID Exchange—This procedure is a procedure for exchanging an APID (Active Profile ID) between an audio sink and an audio source, and may be required in order for the ASS to be configured to stream related content. The APID is determined by the audio source, and through APID exchange, the audio sink may acquire the ID for the enabled audio stream through the profile/service and the following procedure.

Codec Negotiation—The ASS on the audio source may be in a Codec Configured state. As part of this exchange step, the audio sink may read the ASS characteristics of the ASS configured from the audio source and use it in a subsequent procedure. The ASS_ID read from the ASS characteristic may be used to address the ASS maintained by the audio source.

QoS configuration (or QoS negotiation)—Prior to this step, the audio sink may read the ASS characteristics to determine the range of acceptable QoS parameters. According to this exchange step, assuming that no error occurs, the ASS is in a state in which the codec and QoS are set (Codec & QoS Configured). Optionally, at this point, the audio sink may set up CBISS/CBIS for the audio data path using the parameter set in the codec and QoS agreement/exchange/setup phase.

ASS enabling—The audio sink may use a known content type value for enabling, including being able to use an uncategorized content type. If the audio source does not support the content type selected by the audio sink, but the audio source wants to accept the enabling, it may respond with an uncategorized content type. According to this exchange step, assuming no errors occur, the audio source may be in an enabling/enabled state. In the active state, the audio sink may set up CBISS/CBIS if not previously set up. Configuring internal audio paths on both the client and server may be done at this point.

Audio handshake—The audio sink may initiate an audio handshake. According to this exchange step, assuming no error occurs, the audio source may be in the streaming state through the audio data path setting.

In the following examples, a phone device may correspond to an audio source, an earbud device may correspond to an audio sink, and a watch device may correspond to an audio controller.

FIG. 32 is a diagram for describing an APID exchange procedure triggered by an audio source to which the present disclosure is applicable.

FIG. 33 is a diagram for describing state transition of an APID exchange procedure triggered by an audio source to which the present disclosure is applicable.

In the example of FIG. 32, a music start request may be performed by a user input in the phone device. In step S3210, APID1 (e.g., an identifier for a music-related profile/service, an identifier for a music audio stream) may be exchanged between the phone device and the earbud device, and between the phone device and the watch device. Accordingly, the music controller application may be executed on the watch device. In operation S3220, a music control service (MCS) is started between the phone device and the earbuds and the watch, so that a music audio stream may be enabled through the earbuds.

Next, a call may be received or transmitted by a user input. In step S3230, APID2 (e.g., an identifier for a call-related profile/service, an identifier for a call audio stream) may be exchanged between the phone device and the earbud device, and between the phone device and the watch device. Accordingly, the call controller application may be executed on the watch device. In operation S2340, a call control service (CCS) is started between the phone device and the earbud and the watch, and a call audio stream may be enabled through the earbud. When a call is received, after the call audio stream is enabled, the call reception is accepted by a user input, and call streaming can be continued.

Referring to FIG. 33, (1) when a user receives an incoming call through a phone while listening to music, (2) the phone and the earbud may exchange APID2, and the phone and the watch may exchange APID2, (3) after the call controller corresponding to APID2 starts in the watch, (4) as CCS is initiated between the phone and the watch, and between the phone and the earbud (additionally, between the earbud and the watch), (5) a call audio stream between the phone and the earbud may be enabled.

Referring back to FIG. 32, when the call reception is rejected or the call is terminated by a user input, the phone device may exchange APID1 with the earbud device and the watch device in step S3250. Accordingly, the music controller application may be executed on the watch device. In operation S3560, a music control service (MCS) is started between the phone device and the earbuds and the watch, so that a music audio stream may be enabled through the earbuds.

APID may include at least one of an identifier, a service identifier, or an audio stream identifier.

The APID is generated by the audio source, and at this time, a mapping relationship between a specific profile/service and APID may be configured. For example, APID1 may be mapped to MCS, and APID2 may be mapped to CCS. Also, the validity period of the APID may be set to be the same as the validity period of the ASS.

FIG. 34 is a diagram for describing an embodiment of an APID exchange procedure triggered by an audio controller to which the present disclosure is applicable.

In the example of FIG. 34, a music start request may be performed by a user input in the watch device. Accordingly, the music controller application may be executed on the watch device. In step S3410, the watch device may request an APID exchange for the MCS from the phone device. Steps S3420, S3430 and music audio streaming enabling are the same as steps S3210, S3220 and music audio streaming enabling in the example of FIG. 32, and thus overlapping descriptions will be omitted.

Next, a call may be received on the phone device. Step S3440, call controller start, step S3450, call audio stream enabling, incoming call reception acceptance, and call streaming continuation processes are the same as those of call streaming continuation from step S3230 of FIG. 32, and thus overlapping descriptions will be omitted.

Next, when the call reception is rejected or the call is terminated by a user input on the watch device, the watch device may request an APID exchange for the MCS from the phone device in step S3460. Step S3470, starting the music controller, step S3480, and enabling music audio streaming are the same as enabling music audio streaming from step S3250 in the example of FIG. 32, and thus redundant descriptions will be omitted.

FIG. 35 is a diagram for describing an additional example of an APID exchange procedure triggered by an audio controller to which the present disclosure is applicable.

FIG. 36 is a diagram for describing state transition of an APID exchange procedure triggered by an audio controller to which the present disclosure is applicable.

In the example of FIG. 35, the process from the music start request to the music audio stream enabling by the user input in the watch device is the same as the music start request to the music audio stream enabling in the example of FIG. 34, and thus a redundant description will be omitted.

Next, call transmitting may be performed by a user input from the watch device. Accordingly, the call controller can be started. Steps S3540, S3550, and call audio stream enabling are the same as S3440, S3450, and call audio stream enabling of the example of FIG. 34, and thus overlapping descriptions will be omitted.

Referring to FIG. 36, (1) when the user makes a call through the call application of the watch while listening to music, the watch starts a call controller, and (2) the watch exchanges the APID for CCS with the phone, (3) the phone changes the active profile to the profile/service related to the call, and makes a call, and (4) the phone and the earbud exchange APID2, and the phone and the watch exchange APID2, (5) CCS is initiated between the phone and the watch, and between the phone and the earbuds (additionally between the earbuds and the watch), so that (6) the call audio stream between the phone and the earbuds may be enabled.

Referring back to FIG. 35, a call termination may be performed by a user input from the watch device. Since step S3560 to enabling the music audio stream is the same as from step S3460 to enabling the music audio stream in the example of FIG. 34, a redundant description will be omitted.

FIG. 37 is a diagram illustrating a configuration of the first device and the second device to which the present disclosure is applicable.

The first device 3700 may include a processor 3710, an antenna unit 3720, a transceiver 3730, and a memory 3740.

The processor 3710 may perform baseband-related signal processing and may include a host processor 3711 and a controller processor 3715. The host processor 3711 and the controller processor 3715 may exchange information through HCI. The host processor 3711 may process operations such as L2CAP, ATT, GATT, GAP, and LE profile layers. The controller processor 3715 may process operations such as LL and PHY layers. The processor 3710 may control the overall operation of the first device 3700 in addition to performing baseband-related signal processing.

Antenna unit 3720 may include one or more physical antennas. The transceiver 3730 may include RF (Radio Frequency) transmitter and RF receiver. The memory 3740 may store information processed by the processor 3710 and software, an operating system, and an application related to the operation of the first device 3700, and may include components such as a buffer and the like.

The processor 3710 of the first device 3700 may be configured to implement an operation of the first device (or, the audio source device, or encoding device) in the embodiments described in the present disclosure.

For example, the host processor 3711 of the processor 3710 of the first device 3700 may include a metadata generator 3712.

The metadata generator 3712 may generate at least one metadata related to at least one audio data (e.g., at least one broadcast audio stream). One metadata for each audio data may be generated. The metadata may include information indicating a characteristic of an audio data related to the metadata.

One or more metadata generated by the metadata generator 3712 may be transmitted to the second device 3750 through the controller processor 3715.

At least one metadata is a first pointer packet transmitted on a first channel, and at least one metadata is transmitted on the second channel indicated by the first pointer packet, and at least one metadata indicates an audio packet comprising one or more audio data associated with one or more metadata, or the first channel through which the first pointer packet is transmitted, and the at least one metadata may be included in one or more of the second pointer packets transmitted on the third channel.

The first pointer packet and the audio packet may be transmitted based on a periodic advertisement procedure. The first pointer packet may be an AUX_ADV_IND packet, and the audio packet may be an AUX_SYNC_IND packet.

The second pointer packet, the first pointer packet, and the audio packet may be transmitted based on a periodic advertisement procedure. The second pointer packet may be an ADV_EXT_IND packet, the first pointer packet may be an AUX_ADV_IND packet, and the audio packet may be an AUX_SYNC_IND packet.

The metadata may include one or more of a language code, target-listener, or program information text of audio data associated with the metadata. The target-listener may include one or more of male, female, child or adult. Metadata may have a length, type, and value (LTV) structure. When a plurality of metadata is transmitted in one packet, the one packet may include a plurality of LTV structures.

The second device 3750 may include a processor 3760, an antenna unit 3770, transceiver 3780, and a memory 3790.

The processor 3760 may perform baseband-related signal processing and may include a host processor 3761 and a controller processor 3765. The host processor 3761 and the controller processor 3765 may exchange information through HCI. The host processor 3761 may process operations such as L2CAP, ATT, GATT, GAP, and LE profile layers. The controller processor 3765 may process operations of the LL layer, the PHY layer, and the like. The processor 3760 may control the overall operation of the second device 3760 in addition to performing baseband-related signal processing.

The antenna unit 3770 may include one or more physical antennas. The transceiver 3780 may include an RF transmitter and an RF receiver. The memory 3790 may store information processed by the processor 3760 and software, an operating system, and an application related to the operation of the second device 3750, and may include components such as a buffer and the like.

The processor 3760 of the second terminal device 3750 may be configured to implement the operation of the second device (or, audio sink device, or decoding device) in the embodiments described in the present disclosure.

For example, the host processor 3761 of the processor 3760 of the second device 3750 may include a metadata manager 3762.

The metadata manager 3762 may manage at least one metadata received from the first device 3700 through the controller processor 3765.

At least one metadata related to one or more audio data (e.g., one or more broadcast audio streams) may be managed. One metadata may be managed for each audio data. The metadata may include information indicating characteristics of audio data related to the metadata.

At least one metadata includes a first pointer packet received on a first channel, and the one or more metadata is received on a second channel indicated by the first pointer packet and an audio packet comprising one or more audio data associated with one or more metadata, or a first pointer packet indicating a first channel through which the packet is transmitted, and at least one metadata may be included in one or more of the second pointer packets received on the third channel.

The first pointer packet and the audio packet may be received based on a periodic advertisement procedure. The first pointer packet may be an AUX_ADV_IND packet, and the audio packet may be an AUX_SYNC_IND packet.

The second pointer packet, the first pointer packet, and the audio packet may be received based on a periodic advertisement procedure. The second pointer packet may be an ADV_EXT_IND packet, the first pointer packet may be an AUX_ADV_IND packet, and the audio packet may be an AUX_SYNC_IND packet.

The metadata may include one or more of a language code, target-listener, or program information text of audio data associated with the metadata. The target-listener may include one or more of male, female, child or adult. Metadata may have a length, type, and value (LTV) structure. When a plurality of metadata is received in one packet, the one packet may include a plurality of LTV structures.

Additionally, the metadata manager 3762 may determine (e.g., filter) whether to receive audio data related to each metadata based on each of the one or more metadata.

In the operation of the first device 3700 and the second device 3750, the descriptions of the source device and the sink device in the examples of the present invention may be equally applied, and overlapping descriptions will be omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium. The storage medium may include, but is not limited to, a high-speed random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor(s). The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/containers.

INDUSTRIAL APPLICABILITY

Embodiments of the present disclosure may be applied to various wireless communication systems to increase the performance of the wireless communication system.

The invention claimed is:

1. A method performed by a broadcast source in a wireless communication system, the method comprising:
   advertising a first pointer packet including at least one metadata on a first channel, wherein the first pointer packet includes advertising data without audio data; and
   broadcasting an audio packet including at least one broadcast audio data associated with the at least one metadata on a second channel indicated by the first pointer packet,
   wherein each of the at least one metadata includes information indicating a characteristic of one broadcast audio data associated with the each of the at least one metadata,
   wherein the advertising data includes a header field and an AdvData field, the AdvData field includes at least one AD structure, and an AD structure includes a length field, an AD type field, and an AD Data field, and
   wherein the advertising data includes the at least one metadata.

2. The method of claim 1, wherein:
   the at least one metadata includes at least one of a language code, a target-listener, or a program information text of the at least one broadcast audio data associated with the at least one metadata.

3. The method of claim 2, wherein:
   the target-listener is related to an age.

4. The method of claim 1, wherein:
   the at least one metadata has a length, type and value (LTV) structure.

5. The method of claim 4, wherein:
   based on the first pointer packet including a plurality of metadata, the first pointer packet includes a plurality of the LTV structures.

6. The method of claim 1, wherein:
   the first pointer packet and the audio packet are transmitted based on a periodic advertisement procedure.

7. The method of claim 6, wherein:

the first pointer packet is an AUX_ADV_IND packet, and the audio packet is received based on an AUX_SYNC_IND packet.

8. The method of claim 1, further comprising:

advertising, on a third channel, a second pointer packet indicating the first channel through which the first pointer packet is transmitted, before advertising the first pointer packet.

9. The method of claim 8, wherein:

the second pointer packet, the first pointer packet, and the audio packet are transmitted based on a periodic advertisement procedure.

10. The method of claim 9, wherein:

the second pointer packet is an ADV_EXT_IND packet, the first pointer packet is an AUX_ADV_IND packet, and the audio packet is received based on an AUX_SYNC_IND packet.

11. The method of claim 1, wherein:

the audio packet further includes the at least one metadata.

12. A method performed by a broadcast sink in a wireless communication system, the method comprising:

receiving a first pointer packet including at least one metadata on a first channel, wherein the first pointer packet includes advertising data without audio data; and receiving an audio packet including at least one broadcast audio data associated with the at least one metadata on a second channel indicated by the first pointer packet, wherein the audio packet is broadcast by a broadcast source,

wherein each of the at least one metadata includes information indicating a characteristic of one broadcast audio data associated with the each of the at least one metadata, wherein the advertising data includes a header field and an AdvData field, the AdvData field includes at least one AD structure, and an AD structure includes a length field, an AD type field, and an AD Data field, and wherein the advertising data includes the at least one metadata.

13. A device of a broadcast source in a wireless communication system, the device comprising:

a transceiver for performing signal transmission and reception with another device; and a processor for controlling the transceiver and the device, wherein the processor is configured to:

advertising, through the transceiver, a first pointer packet including at least one metadata on a first channel, wherein the first pointer packet includes advertising data without audio data; and broadcasting, through the transceiver, an audio packet including at least one broadcast audio data associated with the at least one metadata on a second channel indicated by the first pointer packet, wherein each of the at least one metadata includes information indicating a characteristic of one broadcast audio data associated with the each of the metadata, wherein the advertising data includes a header field and an AdvData field, the AdvData field includes at least one AD structure, and an AD structure includes a length field, an AD type field, and an AD Data field, and wherein the advertising data includes the at least one metadata.

* * * * *